(12) United States Patent
Ichikawa

(10) Patent No.: US 7,830,613 B2
(45) Date of Patent: Nov. 9, 2010

(54) ZOOM LENS AND AN IMAGING APPARATUS INCORPORATING THE SAME

(75) Inventor: Keisuke Ichikawa, Tama (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/456,460

(22) Filed: Jun. 16, 2009

(65) Prior Publication Data
US 2009/0316277 A1     Dec. 24, 2009

(30) Foreign Application Priority Data

Jun. 20, 2008   (JP)  ............................. 2008-161487
Jan. 13, 2009   (JP)  ............................. 2009-004334

(51) Int. Cl.
    G02B 5/14     (2006.01)
(52) U.S. Cl. .................. 359/687; 359/686; 348/335; 348/240.3
(58) Field of Classification Search ................ 359/676, 359/686, 687; 396/72–88; 348/240.99–240.3, 348/335–369
See application file for complete search history.

(56) References Cited

U.S. PATENT DOCUMENTS 5,231,540 A * 7/1993 Shibata .................. 359/684
7,675,690 B2   3/2010 Satori

FOREIGN PATENT DOCUMENTS

| CN | 101131466 A | 2/2008 |
|---|---|---|
| JP | 2003-315676 | 11/2003 |
| JP | 2005-331628 | 12/2005 |
| JP | 2008-102165 | 5/2008 |
| JP | 2008-102166 | 5/2008 |

* cited by examiner

Primary Examiner—Darryl J Collins
(74) Attorney, Agent, or Firm—Kenyon & Kenyon LLP

(57) ABSTRACT

The first lens group comprises a positive lens and a negative lens, and the total number of lenses in the first lens group is 2. The second lens group consists of, in order from the object side, a front unit of negative refracting power and a rear unit of positive refracting power. The third lens group consists of, in order from the object side, a front unit of positive refracting power and a rear unit of negative refracting power. The fourth lens group comprises a positive lens component, and the total number of lens components in the fourth lens group is 1. The front unit of the second lens group comprises a negative lens component, and the total number of lens components in the front unit of the second lens group is 1. The rear unit of the second lens group comprises, in order from the object side to the image side, a negative lens and a positive lens, and the total number of lenses in the rear unit of the second lens group is 2. The negative lens component in the front unit of the second lens group and the negative lens in the rear unit of the second lens group satisfy the following condition (1A):

$$2.9 < f_{2GN2}/f_{2GN1} < 30 \qquad (1A)$$

where $f_{2GN1}$ is the focal length of the negative lens component in the front unit of the second lens group, and
  $f_{2GN2}$ is the focal length of the negative lens in the rear unit of the second lens group.

39 Claims, 22 Drawing Sheets

Example 1

FIG.2 Example 2

Example 5

FIG.6 Example 1

Example 2

Example 3

Example 4

Example 5

Example 6

Example 7

Example 8

Example 9

Example 6

FIG.16
Example 7
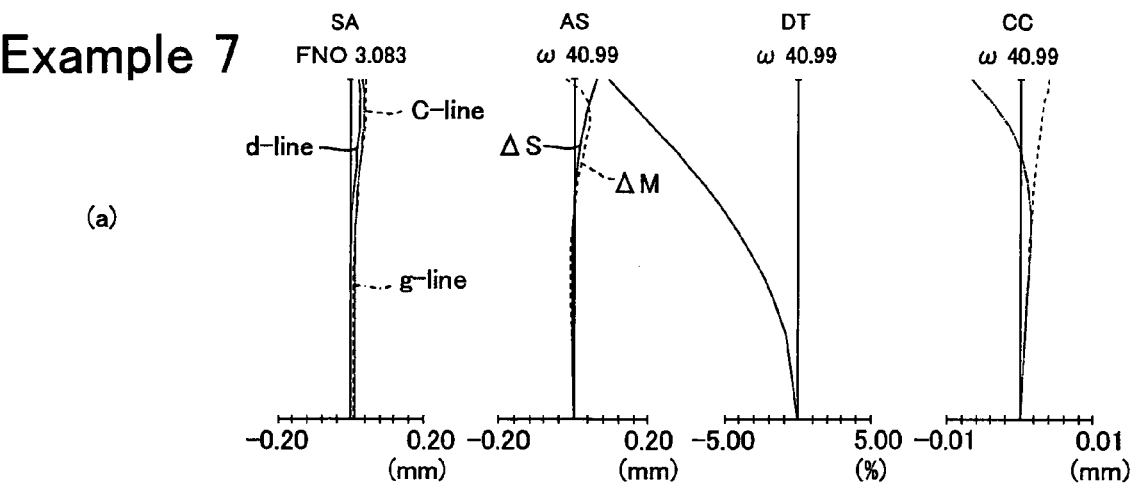
(a)
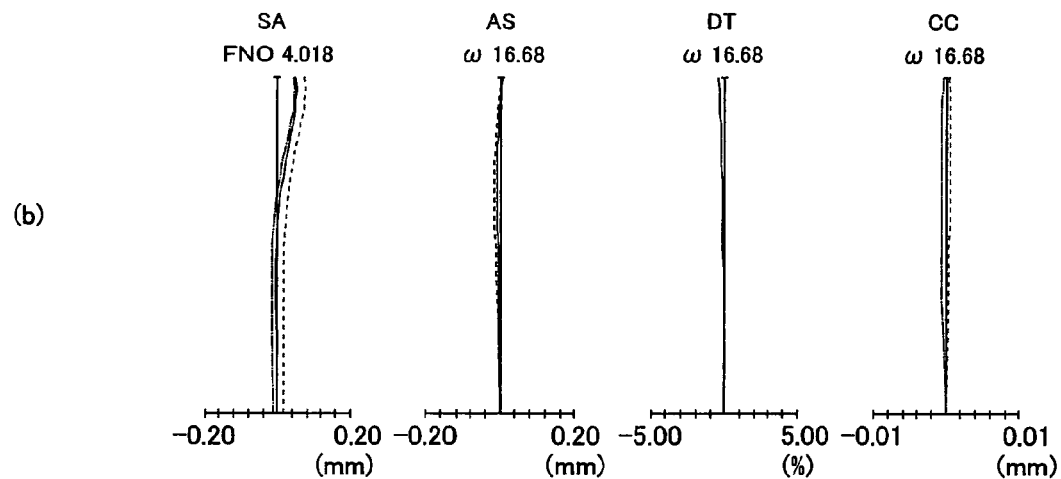
(b)
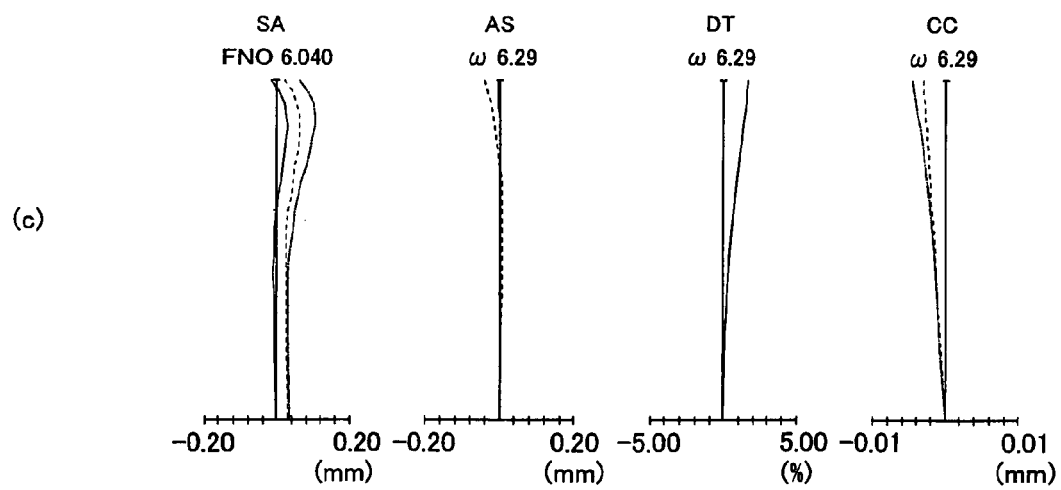
(c)

FIG.17
Example 8
(a)
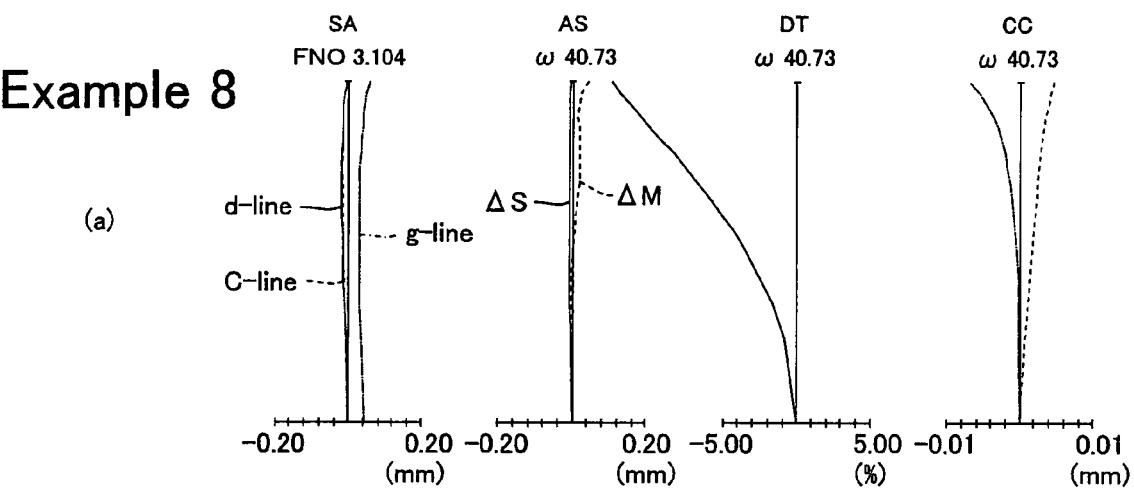
(b)
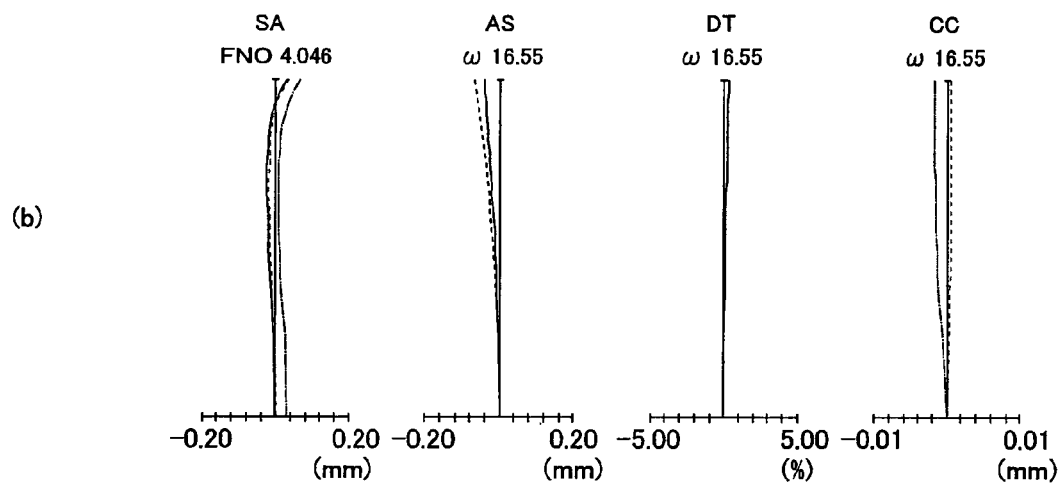
(c)
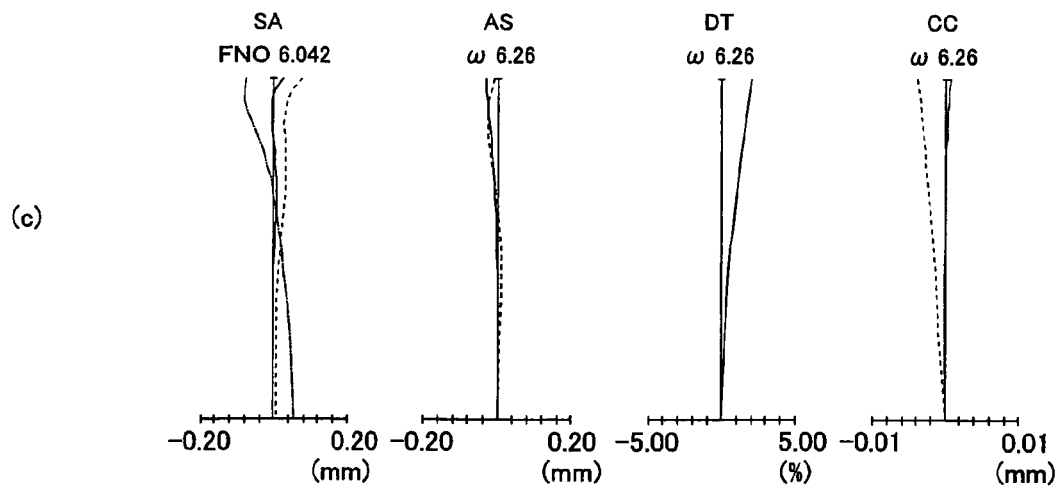

FIG.18
Example 9
(a)
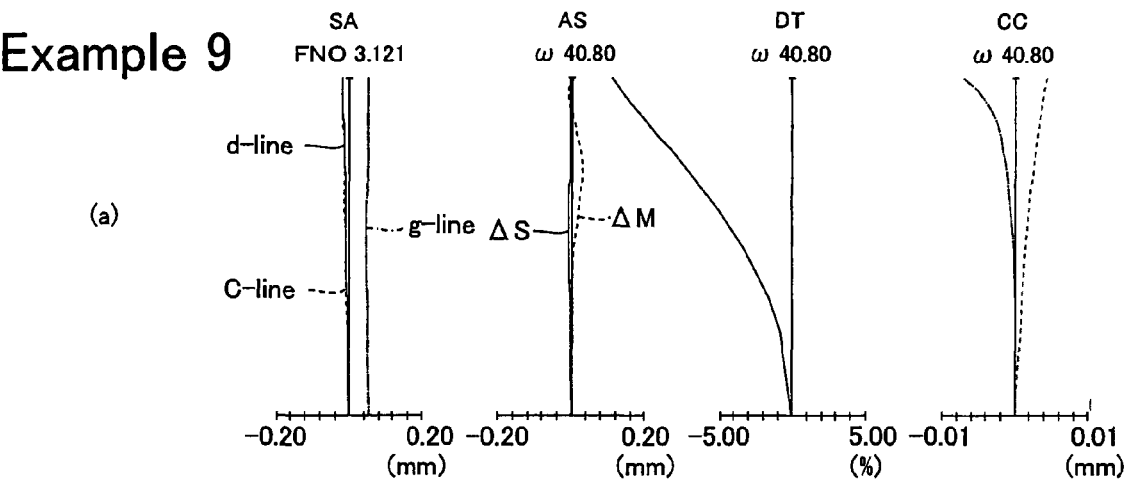
(b)
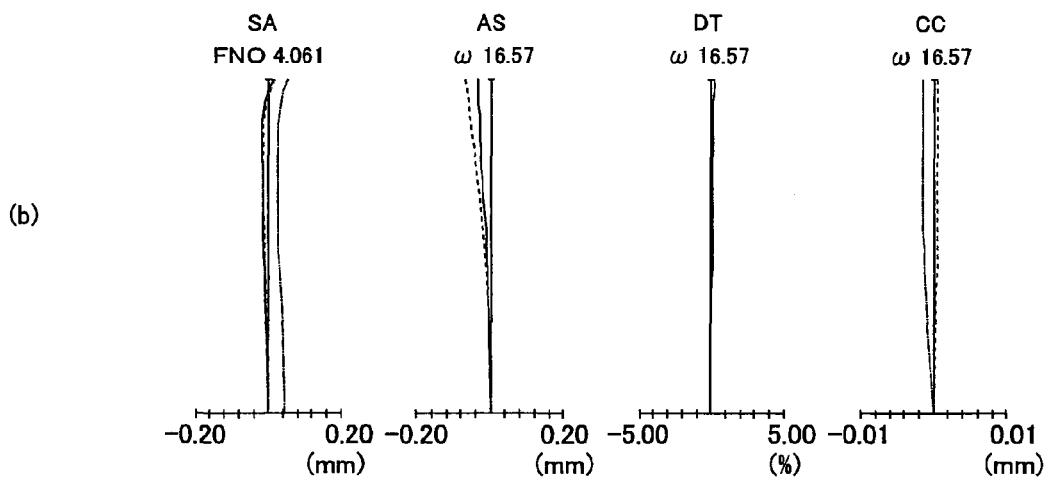
(c)
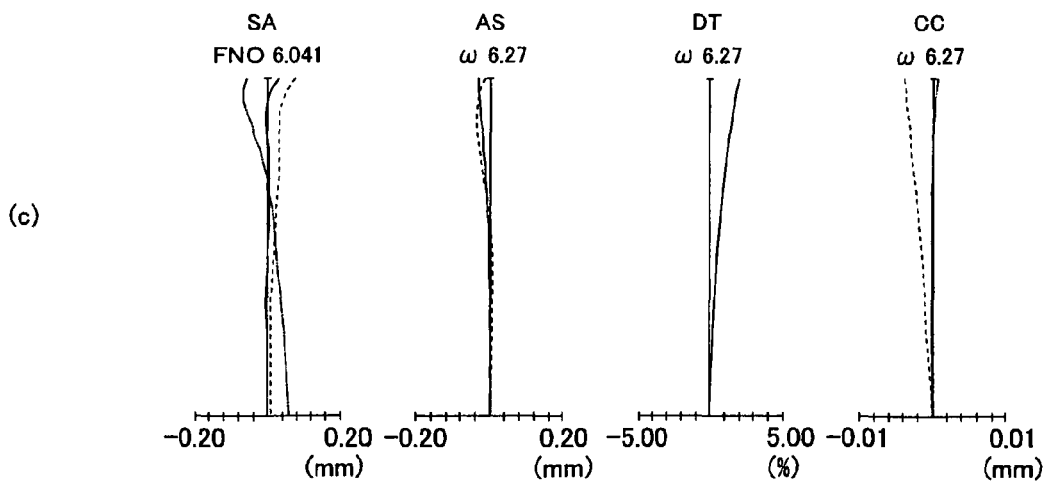

ZOOM LENS AND AN IMAGING APPARATUS INCORPORATING THE SAME

This application claims benefit of Japanese Application No. 2008-161487 filed in Japan on Jun. 20, 2008 and No. 2009-004334 filed in Japan on Jan. 13, 2009, the contents of which are incorporated by this reference.

BACKGROUND OF THE INVENTION

The present invention relates to a zoom lens and an imaging apparatus incorporating the same.

Instead of silver-halide film cameras, digital cameras designed to use such imaging devices as CCDs or CMOSs to take photographs of subjects have gone mainstream. Further, they now have a wide spectrum of categories from the commercial-use, multi-function type to the compact low-end type. In the invention, attention is paid to the low-end type category in particular.

Users of such low-end type digital cameras would enjoy snapping shots over a wide range of scenes anywhere at any time in a convenient fashion. For this reason, preference is given to digital cameras of the type that can well be put away in small-size articles such as the pockets or the like of clothing or bagging, are convenient to carry around, and are slimmed down in the thickness direction and, with this, there is mounting demand for taking lens systems much more reduced in size. There is also demand for wider-angle characteristics in photographic areas; there is increasing demand for zoom lenses that have high zoom ratios and achieve optical performance while getting hold of the angle of view at the wide-angle end.

Known from the following patent publications, there have been zoom lenses capable of helping maintain relatively high zoom ratios. Each of them comprises, in order from its object side, a first lens group of positive refracting power, a second lens group of negative refracting power, a third lens group of positive refracting power and a fourth lens group of positive refracting power, wherein the length of the space held between the adjacent lens groups is varied to obtain variable focal length.

Patent Publication 1: JP(A) 2003-315676
Patent Publication 2: JP(A) 2005-331628
Patent Publication 3: JP(A) 2008-102165
Patent Publication 4: JP(A) 2008-102166

However, although the inventions set forth in Patent Publications 1 to 4 are suitable for slimming down the zoom lens upon stowed away in a camera body, yet the orthogonal angle of view at the wide-angle end is barely about 65° at most.

SUMMARY OF THE INVENTION

Having been made with such problems in mind, the present invention has for its one object to provide a zoom lens that works for achieving size reductions and a wider-angle arrangement and for making sure the desired zoom ratio, and enables the image quality of taken images to be easily kept in good condition. Another object of the invention is to provide a zoom lens that can be fabricated at lower costs. Yet another object of the invention is to provide an imaging apparatus comprising such a zoom lens.

In view of the above objects, the invention provides a zoom lens comprising, in order from an object side toward an image side thereof, a first lens group having positive refracting power, a second lens group having negative refracting power, a third lens group having positive refracting power and a fourth lens group having positive refracting power, wherein an aperture stop is disposed on an image side with respect to the second lens group and on an object side with respect to a lens surface located in the third lens group and nearest to an image side thereof, and upon zooming from a wide-angle end to a telephoto end, a space between the first lens group and the second lens group grows wide, and a space between the second lens group and the third lens group becomes narrow, with a change in a space between the third lens group and the fourth lens group.

Such a zoom lens of the type having a +−++ power profile as viewed from the object side works for making sure the desired zoom ratio. The zoom lens also works for making sure excellent images when an electronic imaging device is used, because an exit pupil is easily kept away from an image plane.

The location of the aperture stop at the above position works for diameter reductions of the third lens group. Low heights of light rays incident onto the third lens group also favor correction of aberrations.

And in the zoom lens of the invention, the first lens group is made up of one positive lens and one negative lens. This works not only for size reductions of the first lens group in the thickness or diametrical direction but also for correction of various aberrations at the first lens group because the aberrations are canceled out at the respective lenses, making it easy to minimize aberrational fluctuations when the zoom lens is configured as a wide-angle arrangement having high zoom ratios.

And the second lens group is made up of, in order from the object side, a front unit of negative refracting power and a rear unit of positive refracting power. Likewise, the third lens group is made up of, in order from the object side, a front unit of positive refracting power and a rear unit of negative refracting power.

This allows a combined system of the first and second lens groups that come close together near the wide-angle end to have a symmetrical power profile of, in order from the object side, positive refracting power (the first lens group), negative refracting power (the front unit of the second lens group), and positive refracting power (the rear unit of the second lens group).

A combined system of the third and fourth lens groups, too, comes to have a symmetrical power profile of, in order from the object side, positive refracting power (the front unit of the third lens group), negative refracting power (the rear unit of the third lens group) and positive refracting power (the fourth lens group).

Likewise, a combined system of the second and third lens groups that come close together near the telephoto end comes to have a symmetrical profile of, in order from the object side, negative refracting power (the front unit of the second lens group), positive refracting power (the rear unit of the second lens group), positive refracting power (the front unit of the third lens group) and negative refracting power (the rear unit of the third lens group).

Accordingly, it is easy to make correction of Petzval sum, chromatic aberration of magnification and spherical aberrations near the wide-angle end, and Petzval sum, com and chromatic aberration of magnification near the telephoto end, thereby rendering it easy to set up a wide-angle arrangement having high zoom ratios. It is also easy to keep the principal points of the third lens group near an object, thereby facilitating making sure the desired zoom ratio.

Further, the fourth lens group is made up of one positive lens component, working for slimming down the zoom lens upon received in a collapsible lens mount. The fourth lens group takes a chief function of keeping the exit pupil away from the image plane, contributing to reductions of the positive refracting power. Thus, the above arrangement works for size and cost reductions.

It should be noted that the "lens component" here is defined as a lens body having only two refractive surfaces contacting air on the optical axis: an object-side refractive surface and an image-side refractive surface.

And the invention is characterized in that the front unit of the second lens group is made up of one negative lens component, the rear unit of the second lens group is made up of two lenses: a negative lens and a positive lens in order from an image side, and the negative lens component in the front unit of the second lens group and the negative lens in the rear unit of the second lens group satisfy the following condition (1A):

$$2.9 < f_{2GN2}/f_{2GN1} < 30 \tag{1A}$$

where $f_{2GN1}$ is the focal length of the negative lens component in the front unit of the second lens group, and $f_{2GN2}$ is the focal length of the negative lens in the rear unit of the second lens group.

When it is intended to make sure the angle of view at the wide-angle end, the negative refracting power of the second lens group is likely to grow large. Therefore, if the front and rear units of the second lens group are configured as described above, then it works for allowing the second lens group to have positive refracting power, reduced aberrations, and limited thickness.

As the object-side lens in the rear unit of the second lens group is configured as a negative lens, it works for gaining the desired zoom ratio, because the principal points of the second lens group are likely to draw near the third lens group at the telephoto end.

Condition (1A) defines the preferable power balance between the negative lens component and the negative lens in the second lens group.

The lower limit to Condition (1A) is set at no less than 2.9 thereby allowing the negative lens component in the front unit to have negative refracting power, and so working for keeping an entrance pupil shallow and making sure the angle of view. Further, the negative refracting power of the negative lens in the rear unit is kept so moderate that while the thickness of the rear unit is kept small, the rear unit is allowed to easily have positive refracting power, resulting in well balanced aberrations.

The upper limit to Condition (1A) is set at no greater than 30 to make sure the negative lens in the rear unit has negative refracting power, thereby easily gaining the effect of the negative lens on correction of aberrations.

At the wide-angle end, the first and second lens groups should preferably satisfy the following conditions (2A) and (3A):

$$-1.8 < fnw/fw < -0.5 \tag{2A}$$

$$5 < fp/fw < 500 \tag{3A}$$

where fnw is the focal length of the combined system of the first lens group and the front unit of the second lens group at the wide-angle end, fp is the focal length of the rear unit of the second lens group, and fw is the focal length of the whole zoom lens system at the wide-angle end.

Condition (2A) defines the preferable focal length of the combined system of the first and second lens groups, and Condition (3A) defines the preferable focal length of the rear unit of the second lens group.

An appropriate negative power is given to the combined system of the first lens group and the front unit of the second lens group at the wide-angle end and an appropriate positive power is given to the rear unit of the second lens group in such a way as to satisfy Conditions (2A) and (3A), thereby bringing the entrance pupil position near an object. This works for size reductions, because the size of the first lens group in the diametrical and thickness directions can be much more reduced.

As the lower limits to Conditions (2A) and (3A) are set at no less than −1.8 and 5, respectively, it works for a wide-angle arrangement and size reductions because it makes it easy to bring the entrance pupil position near the object.

As the upper limits to Conditions (2A) and (3A) are set at no greater than −0.5 and 500, respectively, it works for spherical aberration reductions at the telephoto end in particular. As the upper limit to Condition (2A) is set at no greater than −0.5, it facilitates holding back the negative refracting power of the negative lens component in the second lens group. This in turn facilitates making small a difference between the thickness of the center and the thickness of the edge of that negative lens component, lifting off design limitations due to lens processability.

Preferably, the negative lens in the rear unit of the second lens group should satisfy the following condition (4A):

$$2.38 < f_{2GN2}/f_{2G} < 30 \tag{4A}$$

where $f_{2G}$ is the focal length of the aforesaid second lens group.

Condition (4A) defines the preferable refracting power of the negative lens in the rear unit of the second lens group.

As the lower limit to Condition (4A) is set at no less than 2.38, it permits the negative lens to have a moderate refracting power. This in turn facilitates making sure the rear unit is slimmed down and has positive refracting power, and the front unit has negative power, working for a slimmed-down, wide-angle arrangement having optical performance.

As the upper limit to Condition (4A) is set at no greater than 30, it permits the negative lens to gain refracting power and the front unit to have a moderate negative power, working for aberration reductions on the telephoto side.

Preferably, the negative lens component in the front unit of the second lens group should satisfy the following condition (5A):

$$-1.23 < f_{2GN1}/fw < -0.1 \tag{5A}$$

where fw is the focal length of the whole zoom lens system at the wide-angle end.

Condition (5A) defines the preferable refracting power of the negative lens component in the front unit of the second lens group.

As the lower limit to Condition (5A) is set at no less than −1.23, it permits the negative lens component to have a moderate refracting power, working for a wide-angle arrangement, and size reductions of the first lens group.

As the upper limit to Condition (5A) is set at no greater than −0.1, it prevents the refracting power of the negative lens component from growing too strong, working for aberration reductions on the telephoto side.

Preferably, the positive lens in the rear unit of the second lens group should satisfy the following condition (6A):

$$-5 < f_{2GP}/f_{2G} < -0.2 \tag{6A}$$

where $f_{2GP}$ is the focal length of the positive lens in the rear unit of the second lens group, and $f_{2G}$ is the focal length of the second lens group.

Condition (6A) defines the preferable refracting power of the positive lens in the rear unit of the second lens group.

As the lower limit to Condition (6A) is set at no less than −5, it permits the positive lens to have positive refracting power, facilitating taking hold of the function of canceling out aberrations within the second lens group.

As the upper limit to Condition (6A) is set at no greater than −0.2, it permits the positive refracting power of the positive lens to be prevented from going excessive. This in turn makes it easy to diminish the refracting power of the adjacent negative lens at the same time, thereby slimming down the second lens group with well balanced aberrations.

Preferably, the aperture stop should be located between the second lens group and the third lens group.

This facilitates reducing the on-axis thickness of the third lens group. This also makes it easy to bring the entrance pupil position near the object, working more for size reductions of the zoom lens.

Upon zooming from the wide-angle end to the telephoto end, the third lens group should preferably move together with the aperture stop.

This works for reducing the size of the third lens group and permitting the third lens group to have refracting power, thereby making sure the desired zoom ratio.

Preferably, the first lens group should be made up of two lenses: a negative lens and a positive lens in order from the object side, wherein the negative lens in the first lens group has an image-side surface having an absolute value of paraxial curvature lager than that of an object-side surface, and the positive lens in the first lens group has an object-side surface having an absolute value of paraxial curvature larger than that of an image-side surface.

By increasing the absolute values of the paraxial curvatures of the opposite refractive surfaces of the negative and positive lenses, it is easy to cancel out aberrations. With the opposite refractive surfaces concave on their entrance pupil side, higher-order aberrations are easily held back.

Preferably, the negative lens component in the front unit of the second lens group should be in a meniscus form convex on its object side, and the negative lens in the rear unit of the second lens group should be in a double-concave form and have an aspheric surface.

By configuring the negative lens component in the front unit into a meniscus form, it is easy to shallow the angle of incidence of off-axis light rays near the wide-angle end where they are incident onto the negative lens component; so the occurrence of excessive distortion can easily be held back. As the negative lens in the rear unit is configured into a double-concave form, it cooperates with the negative lens component to make sure the second lens group has negative refracting power while axial aberrations are balanced against off-axis aberrations. Further, the incorporation of the aspheric surface into the negative lens in the rear unit works much more for correction of off-axis aberrations near the wide-angle end.

If a single lens is used as the negative lens in the front unit of the second lens group, then it works more for thickness and cost reductions of the second lens group.

Preferably, the negative lens component in the front unit of the second lens group should be configured in such a way as to satisfy the following condition (7A):

$$0.8 < (R_{2GN1f} + R_{2GN1r})/(R_{2GN1f} - R_{2GN1r}) < 1.5 \quad (7A)$$

where $R_{2GN1f}$ is the paraxial radius of curvature of the object-side surface of the aforesaid negative lens component in the front unit of the aforesaid second lens group, and $R_{2GN1r}$ is the paraxial radius of curvature of the image-side surface of the aforesaid negative lens component in the front unit of the aforesaid second lens group.

Condition (7A) defines the preferable shape of the negative lens component in the front unit of the second lens group.

As the lower limit to Condition (7A) is set at no less than 0.8, it makes it easy to shallow the angle of incidence of off-axis light rays near the wide-angle end where they are incident onto the negative lens component, working for correction of aberrations on the wide-angle side.

As the upper limit to Condition (7A) is set at no greater than 1.5, it makes it easy to diminish the curvature of the image-side concave surface of the negative lens component, working for correction of spherical aberrations near the telephoto end.

The negative lens in the rear unit of the second lens group serves well to keep refracting power small and has lenses located before and after it. Therefore, even if the negative lens is formed of a plastic material, it is less susceptible to temperature and humidity changes. It is also easily processed into an aspheric lens.

When at least either one of the object- and image-side surfaces of that negative lens is configured into an aspheric surface, that aspheric surface should preferably be such that negative refracting power grows strong with a distance from the optical axis, because both axial aberrations and off-axis aberrations are well corrected.

As both the object- and image-side surfaces of that negative lens are aspheric, it works for the function of the negative lens that corrects aberrations.

Preferably, the negative lens in the rear unit of the second lens group should is in a double-concave form that satisfies the following condition (12A):

$$-0.8 < (R_{2GN2f} + R_{2GN2r})/(R_{2GN2f} - R_{2GN2r}) < 0.9 \quad (12A)$$

where $R_{2GN2f}$ is the paraxial radius of curvature of the object-side surface of the aforesaid negative lens in the rear unit of the aforesaid second lens group, and $R_{2GN2r}$ is the paraxial radius of curvature of the image-side surface of the aforesaid negative lens in the rear unit of the aforesaid second lens group.

Condition (12A) defines the preferable shape of the negative lens in the rear unit of the second lens group.

As the lower limit to Condition (12A) is set at no less than −0.8, it helps shallow the angle of incidence of off-axis light beams onto the negative lens near the wide-angle end, working for correction of aberrations on the wide-angle side.

As the upper limit to Condition (12A) is set at no greater than 0.9, it enables the negative refracting power to be shared by both lens surfaces of the negative lens, working for correction of spherical aberrations near the telephoto end.

Preferably, the negative and the positive lens in the rear unit of the second lens group should each be a single lens; the image-side surface of the negative lens should be in a concave form; and the object-side surface of the positive lens should be in a convex form having a paraxial radius of curvature smaller than that of the image-side surface of the negative lens.

This makes it possible to reduce the refracting power of the negative lens and permit the positive lens to have a function of correction of aberrations, and makes it easy to correct off-axis aberrations while the rear unit remains slimmed down.

Further, as the positive lens in the rear unit of the second lens group is configured into a meniscus form, it works more for reductions of aberrations on the wide-angle side and slimming-down of the rear unit of the second lens group.

Preferably, the front unit of the third lens group should be made up of one positive lens component and the rear unit of the third lens group should be made up of one negative lens component. This is preferable for size reductions of the third lens group.

Here if the positive lens component in the front unit of the third lens group is configured into a double-convex form, then it works for reductions of spherical aberrations, because the positive refracting power of the positive lens component can be shared by multiple lens surfaces. This also permits axial light beams diverging from the second lens group to converge, working for size reductions of the third lens group.

Further, if both the object- and image-side surfaces of the positive lens component in the front unit of the third lens group are configured as aspheric ones, then it works more for reductions of spherical aberrations.

Preferably, the surface located in the rear unit of the third lens group and nearest to the image side should be in an aspheric concave form.

This concave surface functions to cancel out spherical aberrations, etc. likely to occur at the third lens group. It can easily have another function of refracting off-axis light beams in a direction away from the optical axis to gain the height of light rays incident onto the fourth lens group, thereby improving the telecentric capability of the zoom lens toward the image side.

Configuring that concave surface as an aspheric surface works more for correction of off-axis aberrations.

Preferably, the rear unit of the third lens group should be a negative lens component of meniscus shape convex on its object side and concave on its image side, and satisfy the following condition (8A):

$$-0.6<(R_{3GNf}-R_{3GNr})/(R_{3GNf}+R_{3GNr})<0.8 \tag{8A}$$

where $R_{3GNf}$ is the paraxial radius of curvature of the object-side surface of the aforesaid negative lens component in the rear unit of the aforesaid third lens group, and $R_{3GNr}$ is the paraxial radius of curvature of the image-side surface of the aforesaid negative lens component in the rear unit of the aforesaid third lens group.

Such arrangement helps bring the principal points of the third lens group near the object side. This in turn helps bring the principal points of the third lens group near the second lens group of negative refracting power at the telephoto end, working for making sure the desired zoom ratio.

If the object-side surface of the negative lens component is configured into a concave form, it cooperates with the front unit of the third lens group to converge light beams diverging from the second lens group, working more for size reductions of the third lens group in the diametrical direction.

And if the image-side surface of the negative lens component is configured into a concave form, it helps cancel out spherical aberrations, etc. likely to occur at the third lens group. It also helps make sure the height of light rays incident onto the fourth lens group, favoring the telecentric capability of the zoom lens.

Condition (8A) is the reciprocal of the shape factor of the negative lens component of meniscus shape.

As the lower limit to Condition (8A) is set at no less than −0.6, it makes sure the image-side surface has negative refracting power, helping cancel out aberrations at the third lens group.

As the upper limit to Condition (8A) is set at no greater than 0.8, it makes sure the object-side surface of the negative lens component has positive refracting power to gain the effect on bringing the principal points of the third lens group near the object and the effect on the positive refracting power sharing of the third lens group, working for size reductions and higher zoom ratios. Otherwise, it prevents the negative refracting power of the image-side surface of the negative lens component from growing too strong, helping reducing coma and astigmatism.

Preferably, the aforesaid third lens group should comprise a negative lens that satisfies the following condition (9A):

$$15<v3n<35 \tag{9A}$$

where $v3n$ is the Abbe constant of any negative lens in the aforesaid third lens group.

Condition (9A) defines the preferable condition for the material of the negative lens in the third lens group.

As the lower limit to Condition (9A) is set at no less than 15, it reduces an increase in the anomalous dispersion of the material of the negative lens, helping prevent the function of correcting chromatic aberrations from going excessive.

As the upper limit to Condition (9A) is set at no greater than 35, it makes sure the dispersion of the negative lens, working for correction of chromatic aberrations within the third lens group.

Preferably, the third lens group should satisfy the following condition (10A):

$$10<v3p_{ave}-v3n_{ave}<70 \tag{10A}$$

where $v3 p_{ave}$ is the average of the Abbe constants of all positive lenses in the aforesaid third lens group, and $v3n_{ave}$ is the average of the Abbe constants of all negative lenses in the aforesaid third lens group.

Condition (10A) defines the preferable condition for the material of the lenses forming the third lens group.

As the lower limit to Condition (10A) is set at no less than 10, there is an Abbe constant difference gained between the two lenses: positive lens and negative lens, which helps reduce the occurrence of chromatic aberrations at the third lens group thereby helping keep chromatic aberrations from occurring all over the zoom range.

As the upper limit to Condition (10A) is set at no greater than 70, it enables low-cost lens materials to be used, and facilitates lens processing.

Preferably, the positive lens component in the fourth lens group should be in a meniscus form convex on its object side.

The use of the aforesaid shape enables the principal points of the fourth lens group to be brought near the object so that the fourth lens group can draw near the image plane.

This in turn makes it possible to slash the amount of the fourth lens group let out of the collapsible lens mount, working for size reductions of the whole apparatus including a drive mechanism.

Here, to reduce off-axis aberrations at the object-side convex surface in the fourth lens group, that surface should preferably be in an aspheric form.

Alternatively, the fourth lens group may be made up of one meniscus single lens having an aspheric surface. This works for size reductions and making sure performance.

Upon focusing from a far object on a nearby object, the fourth lens group may be designed to move toward the object side.

The fourth lens group is susceptible of size and weight reductions; so it should preferably be constructed as a focusing lens group in view of the location of the focusing mechanism.

Preferably, the first lens group should be positioned more on the object side at the telephoto end than at the wide-angle end; the space between the third and the fourth lens group should grow wider at the telephoto end than at the wide-angle end; and the second and the fourth lens group should move upon zooming from the wide-angle end to the telephoto end.

As the total length of the zoom lens on the wide-angle side is curtailed, it works for size reductions and a wide-angle arrangement, helping the second and the third lens group to have a zooming function. If the second and the fourth lens group are designed to move upon zooming, too, then it makes image plane position adjustment easy while reducing aberrational fluctuations.

Preferably, the zoom lens should satisfy the following condition (11A):

$$4 < ft/fw \tag{11A}$$

where fw is the focal length of the whole zoom lens system at the wide-angle end, and ft is the focal length of the whole zoom lens system at the telephoto end.

Condition (11A) defines the preferable zoom ratio of the zoom lens.

As the lower limit to Condition (11A) is set at no less than 4, it makes sure the desired zoom ratio, and so makes the extent of photographic representation wide.

The invention also provides an imaging apparatus comprising a zoom lens and an imaging device having an imaging plane located on an image side thereof and adapted to convert an optical image formed on the imaging plane through the zoom lens into electrical signals, wherein any one of the aforesaid zoom lenses is used as the zoom lens.

It is thus possible to provide an imaging apparatus comprising a zoom lens that, albeit compact, works for making sure the desired zoom ratio and angle of view as well as optical performance.

Preferably, the inventive imaging apparatus should comprise a signal processing circuit adapted to process image data obtained at the imaging device to produce out image data having transformed shape, and satisfy the following condition (13A) where the zoom lens is in focus on the farthest distance at the wide-angle end.

$$0.7 < y_{07}/(f_w \cdot \tan \omega_{07w}) < 1.0 \tag{13A}$$

Here $f_w$ is the focal length of the whole zoom lens system at the wide-angle end; $y_{07}$ is defined as $y_{07} = 0.7 \times y_{10}$ where $y_{10}$ is a distance from the center to the farthest point in an effective imaging area of the imaging device, and when the effective imaging area changes from the wide-angle end to the telephoto end, $y_{10}$ is the greatest possible value; and $\omega_{07w}$ is an angle between the optical axis and an incident light ray in an object space for a chief light ray that is incident from the center on the imaging plane at the wide-angle end onto an image position where an image height becomes $y_{07}$.

With such a zoom lens as contemplated herein, there is likely a tradeoff between correction of astigmatism and correction of barrel distortion, which means that some distortion is so acceptable that image shape distortion may be corrected by virtue of the image processing function included in the imaging apparatus using the inventive zoom lens, as detailed just below.

Assume now that an object at infinity is imaged through a distortion-free optical system. In this case, there is none of distortion in the formed image so that $$f = y/\tan \omega \tag{A}$$

Here y is the height of an image point from an optical axis, f is the focal length of the imaging system, and ω is an angle with the optical axis of the direction of an object point corresponding to an object point that is formed at a position of y from the center on the imaging plane.

On the other hand, when there is barrel distortion acceptable in the optical system only near the wide-angle end, $$f > y/\tan \omega \tag{B}$$

It follows that given the constant values of ω and y, the longer the focal length f at the wide-angle end, the better, and so design with reduced aberrations is achievable that much.

A lens group corresponding to the object-side lens group is usually composed of two or more lenses for the reason of offering a sensible tradeoff between distortion and astigmatism, which is not necessary for the invention. This works for correction of astigmatism.

With the inventive imaging apparatus, therefore, the image data obtained at the imaging device are processed by image processing by which the image data (image shape) are transformed just as barrel distortion is corrected. The eventually obtained image data are going to provide image data having a shape substantially similar to the object. On the basis of the image data, an object image may better be produced out to a CRT or printer.

When correction of such image data is implemented, the effective imaging area at the wide-angle end comes to have a barrel form. And the image data of the barrel form of effective imaging area are transformed into rectangular image data.

Condition (13A) defines the degree of barrel distortion at the wide-angle end upon zooming. If Condition (13A) is satisfied, it is then possible to make reasonable correction of astigmatism. Note here that an image with barrel distortion is subjected to photoelectric transformation, yielding image data with barrel distortion. However, electrical processing equivalent to image transformation is applied to the image data with barrel distortion by an image processing means that is a signal processing system in the electronic imaging apparatus. This would yield an image that is corrected for distortion and substantially similar to the subject's shape even when the image data eventually produced out of the image processing means are reproduced on a display device.

Here, as the lower limit to Condition (13A) is set at no less than 0.7, it prevents distortion from occurring from the zoom lens. So, when image distortion resulting from distortion of the zoom lens is corrected at the signal processing circuit, it is possible to minimize the enlargement of the edge of the post-correction image in the radial direction, helping prevent deterioration in the sharpness of that edge.

As the upper limit to Condition (13A) is set at no greater than 1.0, it allows for distortion of the zoom lens, working for correction of the zoom lens for astigmatism and the slimming-down of the zoom lens.

While the effective imaging area at the wide-angle end may be determined in such a way as to make perfect correction of distortion, it is understood that in consideration of perspective influences and deterioration in images' edges, some amount, e.g., about −3% or about −5%, of barrel distortion may be left behind, thereby altering the image data.

When the aforesaid zoom lens has a focusing function, each of the aforesaid conditions is going to have a value upon focusing on the farthest object.

Preferably, multiple said inventions should be satisfied arbitrarily and at the same time.

More preferably, the aforesaid respective conditions should be reduced down as follows.

More preferably, the lower limit to Condition (1A) should be set at 2.8, especially 2.75.

More preferably, the upper limit to Condition (1A) should be set at 25, especially 20, and more especially 5.

More preferably, the lower limit to Condition (2A) should be set at −1.75, especially −1.7.

More preferably, the upper limit to Condition (2A) should be set at −0.8, especially −1.1.

More preferably, the lower limit to Condition (3A) should be set at 6, especially 7, and more especially 9.

More preferably, the upper limit to Condition (3A) should be set at 460, especially 440.

More preferably, the lower limit to Condition (4A) should be set at 2.39, especially 2.40.

More preferably, the upper limit to Condition (4A) should be set at 25, especially 20.

More preferably, the lower limit to Condition (5A) should be set at −1.2, especially −1.17.

More preferably, the upper limit to Condition (5A) should be set at −0.5, especially −0.8.

More preferably, the lower limit to Condition (6A) should be set at −4, especially −3.

More preferably, the upper limit to Condition (6A) should be set at −0.21, especially −0.22, and more especially −1.0 or −2.0.

More preferably, the lower limit to Condition (7A) should be set at 0.9, especially 1.01.

More preferably, the upper limit to Condition (7A) should be set at 1.4, especially 1.3.

More preferably, the lower limit to Condition (8A) should be set at −0.6, especially −0.4.

More preferably, the upper limit to Condition (8A) should be set at 0.6, especially 0.4.

More preferably, the lower limit to Condition (9A) should be set at 15.5, especially 16.

More preferably, the upper limit to Condition (9A) should be set at 34, especially 33.

More preferably, the lower limit to Condition (10A) should be set at 15, especially 18.

More preferably, the upper limit to Condition (10A) should be set at 68, especially 66.

More preferably, the lower limit to Condition (11A) should be set at 4.5, especially 5.

Preferably, there should be the upper limit of no greater than 10 provided to Condition (11A), because the total length of the zoom lens can be slashed down with reduced aberrational fluctuations.

More preferably, the lower limit to Condition (12A) should be set at −0.7, especially −0.5 or −0.3.

More preferably, the upper limit to Condition (12A) should be set 0.7, especially 0.5.

More preferably, the lower limit to Condition (13A) should be set at 0.75, especially 0.8.

More preferably, the upper limit to Condition (13A) should be set at 0.99, especially 0.98.

The zoom lens of the invention may be configured as a four-group zoom lens. The smaller lens count works for size reductions such as when the zoom lens is put away in the apparatus body.

On the image side of the fourth lens group, there may be a fifth lens group located that remains fixed in position during zooming and focusing, and has an aspheric surface. At the fifth lens group, the position of an off-axis chief ray changes during zooming and focusing. Making use of this, the aspheric surface should be applied to the fifth lens group such that aberrational fluctuations during zooming and focusing are reduced at the fifth lens group. The refracting power of the fifth lens group may be either positive or negative.

Preferably in this case, the fifth lens group should have a positive refracting power smaller than that of the fourth lens group, and consist of one lens concave on its object side. This works for size reductions of the fifth lens group while the function of correcting aberrations is given to the fifth lens group.

To accomplish the aforesaid objects, the invention also provides a zoom lens comprising, in order from an object side toward an image side thereof, a first lens group having positive refracting power, a second lens group having negative refracting power, a third lens group having positive refracting power and a fourth lens group having positive refracting power, wherein an aperture stop is disposed on an image side with respect to the second lens group and on an object side with respect to a lens surface located in the third lens group and nearest to an image side thereof, and upon zooming from a wide-angle end to a telephoto end, a space between the first lens group and the second lens group grows wide, and a space between the second lens group and the third lens group becomes narrow, with a fluctuation in a space between the third lens group and the fourth lens group.

Such a zoom lens of the type having a +−++ power profile works for making sure the desired zoom ratio. The zoom lens also works for making sure excellent images when an electronic imaging device is used, because an exit pupil is easily kept away from an image plane.

The location of the aperture stop at the above position works for diameter reductions of the third lens group. Low heights of light rays incident onto the third lens group also favor correction of aberrations.

And in the zoom lens of the invention, the first lens group is made up of two lenses: a negative lens and a positive lens. This works not only for size reductions of the first lens group in the thickness or diametrical direction but also for correction of various aberrations at the first lens group because the aberrations are canceled out at the respective lenses, making it easy to minimize aberrational fluctuations when the zoom lens is configured as a wide-angle arrangement having high zoom ratios.

And the second lens group comprises a negative meniscus lens component that is convex on its object side and concave on its image side, and located nearest to the object side. In addition, the third lens group consists of, in order from the object side, two lenses: a positive lens and a negative lens. It should be noted that the lens component here is defined as a lens body having only two refractive surfaces contacting air on the optical axis: an object-side refractive surface and an image-side refractive surface.

A reduced lens count is effective for size reductions of the zoom lens upon put away in a collapsible lens mount. Configuring the third lens group as described above works for size reductions of the third lens group, and bringing the principal points of the third lens group near the second lens group works for making sure the desired zoom ratio.

And to keep off-axis aberrations from occurring in association with a wide-angle arrangement while making sure the second lens group has sufficient negative refracting power, the lens component located in the second lens group and nearest to the object side is configured as the aforesaid negative meniscus lens. When the zoom lens is set up as a wide-angle arrangement, this helps shallow the angle of incidence of off-axis light rays onto that negative lens component, working for reductions of off-axis aberrations.

And as the fourth lens group is made up of one positive lens component, it works more for size reductions of the zoom lens upon received in a collapsible lens mount.

More preferably for the above invention, one or more of the following requirements and conditions should be satisfied at the same time.

Preferably, the first lens group should be positioned more on the object side at the telephoto end than at the wide-angle end.

This helps make sure the second lens group has a zooming function.

Preferably, the negative lens in the first lens group should be positioned more on the object side than the positive lens in the first lens group, wherein the negative lens in the first lens group has an image-side surface having an absolute value of the paraxial radius of curvature lager than that of an object-side surface, and the positive lens in the first lens group has an image-side surface having an absolute value of the paraxial radius of curvature larger than that of an object-side surface.

This works for reductions of aberrations while keeping the first lens group axially thin. More preferably, the negative and the positive lens in the first lens group should each be a meniscus lens convex on its object side.

This makes it possible to shallow the angle of incidence of off-axis light rays onto the respective lens surfaces in the first lens group near the wide-angle end, working for reductions of aberrations when the zoom lens is configured as a wide-angle arrangement.

More preferably, the positive and the negative lens should be cemented together because of a decreased relative decentration of both.

Preferably, the second lens group should comprise a positive lens and a negative lens located on the image side with respect to the negative meniscus lens component.

This helps make sure the second lens group has sufficient negative refracting power while minimizing aberrations of the second lens group, working for a wide-angle arrangement. In addition, making sure the second lens group has refracting power means that the load of the third lens group on zooming is lifted off, working for reductions of aberrational fluctuations during zooming.

More preferably for the purpose of size reductions, the second lens group should be made up of a negative meniscus lens component and the aforesaid negative and positive lenses.

More preferably, the second lens group should be made up of a negative meniscus lens component and a rear lens unit located on the image side with respect to that negative meniscus lens component and having positive refracting power, wherein the rear lens unit comprises the aforesaid positive and negative lenses.

This brings the principal points of the second lens group near the object side, working for size reductions of the second lens group in the diametrical direction: it works for size reductions of the zoom lens when it is configured as a wide-angle arrangement.

In addition, near the wide-angle end, a combined system of the first and the second lens group is going to have a symmetrical profile of positive refracting power (the first lens group), negative refracting power (the negative meniscus lens component) and positive refracting power (the rear lens unit). Near the telephoto end, on the other hand, a combined system of the second and the third lens group is going to have a symmetrical profile of negative refracting power (the negative meniscus lens component), positive refracting power (the rear lens unit), positive refracting power (the positive lens in the third lens group) and negative refracting power (the negative lens in the third lens group).

Thus, there is a symmetrical refracting power profile obtained that is convenient for correction of aberrations at both the wide-angle and the telephoto ends.

Near the wide-angle end, Petzval sum, coma and chromatic aberration of magnification are mutually canceled out within the combined system of the first and the second lens group, working for getting hold of the angle of view and performance. Near the telephoto end, on the other hand, Petzval sum, coma and chromatic aberration of magnification are mutually canceled out within the combined system of the second and the third lens group, working for making sure the zoom lens has optical performance when it is designed to have high zoom ratios.

Preferably, the second lens group should comprise a negative lens located on the image side of the negative meniscus lens component and having an aspheric surface.

The use of the aspheric surface for the lens surface of this negative lens helps make the second lens group thin while balancing axial aberrations against off-axis aberrations, working for making sure a wide-angle arrangement and zoom ratios.

Preferably, an aspheric plastic lens should be used for the aforesaid negative lens in the second lens group.

The incorporation of another negative lens in the second lens group allows it to cooperate with the negative meniscus lens component, working for making sure the second lens group has negative refracting power while balancing axial aberrations against off-axis aberrations.

The application of the aspheric surface to the negative lens in the rear unit works more for correction of off-axis aberrations near the wide-angle end while keeping the second lens group thin. The aspheric surface, if formed of a plastic material, can be fabricated with ease.

Preferably, the third lens group should be positioned more on the object side at the telephoto end than at the wide-angle end.

This helps the third lens group to have a zooming function.

It is then preferable that the aperture stop moves in unison with the third lens group.

As the aperture stop moves more towards the object side at the telephoto end than at the wide-angle end, it helps make sure the range of movement of the third lens group. It also allows the aperture stop to draw near the third lens group at both the wide-angle and the telephoto end, working for size and thickness reductions of the third lens group.

Preferably, the positive lens in the third lens group should be in a double-concave form, and the negative lens should be in a meniscus form convex on its object-side surface and concave on its image-side surface.

This helps bring the principal points of the third lens group near the object side, and the principal points of the third lens group at the telephoto end near the second lens group of negative refracting power, working for making sure the desired zoom ratio. It also permits the two convex surfaces of the positive lens and the object-side convex surface of the negative lens component to lie back-to-back along the optical axis so that axial light beams divergent from the second lens group can be converged, working more for size reductions of the third lens group in the diametrical direction. And it allows the concave surface of the negative lens to cancel out aberrations produced at the respective convex surfaces in the third lens group or refract off-axis light beams in the direction away from the optical axis, thereby making sure the height of light rays incident onto the fourth lens group. It is thus possible to improve the telecentric capability of the zoom lens toward the image side.

Preferably, the object- and image-side surfaces of the positive lens in the third lens group should each be an aspheric surface.

This works just only for correction of spherical aberrations and coma, but also for making sure optical performance even with two lenses incorporated in the third lens group.

Preferably, the image-side surface of the negative lens in the third lens group should be an aspheric surface.

The application of the aspheric surface to the surface located in the third lens group and nearest to the image side keeps off-axis aberrations in good condition.

Preferably, the fourth lens group should move toward the object side for focusing from a far object to a nearby object.

The fourth lens group is susceptible of weight reductions and limited focusing sensitivity; so it is preferable to move that lens group for focusing, because of making sure focusing precision.

The function of the fourth lens group is nothing else but to adjust the exit pupil; the positive refracting power can be weakened that much. Thus, if the fourth lens group is made up of one positive lens, then it works for size reductions and lower costs.

Here, as that positive lens is configured as a meniscus lens having an aspheric surface, it favors correction of off-axis aberrations. This is particularly effective for the zoom lens wherein the fourth lens group is located nearest to the image side.

If the lens groups included in the zoom lens are only four: the first, the second, the third, and the fourth lens group, then it favors size reductions.

Alternatively, there may be the fifth lens group provided that is located on the image side of the fourth lens group and has a curved refractive surface. This works for correction of field curvature or making sure telecentric capability.

Further, as the fifth lens group remains fixed during zooming from the wide-angle end to the telephoto end, it helps simplify the mechanics involved.

Yet further, as the lens groups included in the zoom lens are only five: the first, the second, the third, the fourth, and the fifth lens group, it works for size reductions.

Set out below are the more preferable values of the conditions for the aforesaid respective inventive zoom lenses.

Preferably, the first lens group should satisfy the following condition (1B):

$$-3 < (R_{1f}+R_{1r})/(R_{1f}-R_{1r}) < -1 \quad (1B)$$

where $R_{1f}$ is the paraxial radius of curvature of the lens surface located in the aforesaid first lens group and nearest to the object side, and $R_{1r}$ is the paraxial radius of curvature of the lens surface located in the aforesaid first lens group and nearest to the image side.

Condition (1B) defines the preferable shape of the first lens group. As there is no deviation from the lower and upper limits to Condition (1B), it helps prevent field curvature from becoming over or under in association with the wide-angle arrangement. In addition, it works for correction of chromatic aberration of magnification at the telephoto end.

Preferably, the negative meniscus lens component in the second lens group should satisfy the following condition (2B):

$$1 < (R_{2nf}+R_{2nr})/(R_{2nf}-R_{2nr}) < 1.4 \quad (2B)$$

where $R_{2nf}$ is the paraxial radius of curvature of the object-side surface of the negative meniscus lens component in the second lens group, and $R_{2nr}$ is the paraxial radius of curvature of the image-side surface of the negative meniscus lens component in the second lens group.

Condition (2B) defines the preferable shape of the negative meniscus lens located in the second lens group and nearest to the object side. As the upper limit to Condition (2B) is set at no greater than 1.4 or the object-side surface is configured as a convex surface, it helps shallow the angle of incidence of off-axis light beams onto that negative meniscus lens component near the wide-angle end, working for correction of aberrations on the wide-angle side. As the lower limit to Condition (2B) is set at no less than 1 or the image-side surface of the negative meniscus lens component is kept small, it works for correction of spherical aberrations near the telephoto end.

Preferably, the first lens group, and the negative meniscus lens component in the second lens group should satisfy the following condition (3B):

$$-0.3 < f_{2n}/f_1 < -0.15 \quad (3B)$$

where $f_{2n}$ is the focal length of the negative meniscus lens in the second lens group, and $f_1$ is the focal length of the first lens group.

Condition (3B) defines the preferable refracting power ratio between the first lens group and the negative meniscus lens component in the second lens group. As the lower limit to Condition (3B) is set at no less than −0.3, it makes sure a combined system of the first lens group and the negative meniscus lens has sufficient negative refracting power, working for offering a sensible tradeoff between achieving size reductions and making sure the angle of view. As the upper limit to Condition (3B) is set at no greater than −0.15 to make sure the first lens group has positive refracting power, it works for correction of field curvature.

Preferably, the negative lens in the third lens group should satisfy the following condition (4B):

$$1 < (R_{3nf}+R_{3nr})/(R_{3nf}-R_{3nr}) < 6 \quad (4B)$$

where $R_{3nf}$ is the paraxial radius of curvature of the object-side surface of the negative lens in the third lens group, and $R_{3nr}$ is the paraxial radius of curvature of the image-side surface of the negative lens in the third lens group.

Condition (4B) defines the preferable shape of the negative lens in the third lens group. As the lower limit to Condition (4B) is set at no less than 1 to give positive refracting power to the object-side surface of the negative lens, it makes sure the effect on bringing the principal points of the third lens group near the object and the effect on the positive refracting power sharing of the third lens group, working for achieving size reductions and high zoom ratios. It also makes sure the image-side surface has negative refracting power, helping cancel out aberrations at the third lens group. As the upper limit to Condition (4B) is set at no greater than 6 to avoid the negative refracting power of the image-side surface of the negative lens growing too strong, it helps reduce coma and astigmatism.

Preferably, the negative lens in the third lens group should satisfy the following condition (5B):

$$15 < v_{3n} < 35 \quad (5B)$$

where $v_{3n}$ is the Abbe constant of the negative lens in the third lens group.

Condition (5B) defines the Abbe constant of the material of the negative lens in the third lens group. As the lower limit to Condition (5B) is set at no less than 15, it prevents the anomalous dispersion of the negative lens material from growing large, helping prevent the function of correcting chromatic aberrations from going excessive. As the upper limit to Condition (5B) is set at no greater than 35, it makes sure the negative lens has dispersion, working for correction of chromatic aberrations within the third lens group.

Preferably, the positive and the negative lens in the third lens group should satisfy the following condition (6B):

$$5 < \nu_{3p} - \nu_{3n} < 70 \tag{6B}$$

where $\nu_{3p}$ is the Abbe constant of the positive lens in the third lens group, and $\nu_{3n}$ is the Abbe constant of the negative lens in the third lens group.

Condition (6B) defines the preferable Abbe constant difference between the positive and the negative lens in the third lens group. As the lower limit to Condition (6B) is set at no less than 5, it makes sure the two lenses have an Abbe constant difference, helping keep chromatic aberrations from occurring within the third lens group and chromatic aberrations from occurring all over the zoom range. As the upper limit to Condition (6B) is set at no greater than 70, it makes sure low-cost material is used for the lens used, and gets hold of ease of lens processing.

Preferably, the zoom lens should satisfy the following condition (7B):

$$4 < ft/fw \tag{7B}$$

where fw is the focal length of the whole zoom lens system at the wide-angle end, and ft is the focal length of the whole zoom lens system at the telephoto end.

Condition (7B) defines the preferable zoom ratio of the whole zoom lens system. It is preferable to set the lower limit to Condition (7B) at no less than 4, because the desired zoom ratio is ensured so as to address a variety of photographic scenes.

The invention also provides an imaging apparatus comprising a zoom lens and an imaging device having an imaging plane located on an image side thereof and adapted to convert an optical image formed on the imaging plane through the zoom lens into electrical signals, wherein any one of the aforesaid zoom lenses is used as the zoom lens.

It is thus possible to provide an imaging apparatus comprising a zoom lens that, albeit compact, works for making sure the desired zoom ratio and angle of view as well as optical performance.

Preferably, the inventive imaging apparatus should comprise a signal processing circuit adapted to process image data obtained at the imaging device to produce out image data having transformed shape, and satisfy the following condition (8B) where the zoom lens is in focus on the farthest distance at the wide-angle end.

$$0.65 < y_{07}/(f_w \cdot \tan \omega_{07w}) < 0.99 \tag{8B}$$

Here $f_w$ is the focal length of the whole zoom lens system at the wide-angle end, and $y_{07}$ is defined as $y_{07} = 0.7 \times y_{10}$ where $y_{10}$ is a distance from the center of an effective imaging area to the farthest point in the effective imaging plane, and when the effective imaging area changes from the wide-angle end to the telephoto end, $y_{10}$ is the greatest possible value, and $\omega_{07w}$ is an angle between the optical axis and an incident light ray in an object space for a chief light ray that is incident from the center on the imaging plane at the wide-angle end onto an image position where an image height becomes $y_{07}$.

With such a zoom lens as contemplated herein, there is likely a tradeoff between correction of astigmatism and correction of barrel distortion, which means that some distortion is so acceptable that image shape distortion may be corrected by virtue of the image processing function included in the imaging apparatus using the inventive zoom lens, as detailed just below.

Assume now that an object at infinity is imaged through a distortion-free optical system. In this case, there is none of distortion in the formed image so that $$f = y/\tan \omega \tag{A}$$

Here y is the height of an image point from an optical axis, f is the focal length of the imaging system, and $\omega$ is an angle with the optical axis of the direction of an object point corresponding to an object point that is formed at a position of y from the center on the imaging plane.

On the other hand, when there is barrel distortion acceptable in the optical system only near the wide-angle end, $$f > y/\tan \omega \tag{B}$$

It follows that given the constant values of $\omega$ and y, the longer the focal length f at the wide-angle end, the better, and so design with reduced aberrations (astigmatism in particular) is achievable that much.

With the inventive imaging apparatus, therefore, the image data obtained at the imaging device are processed by image processing by which the image data (image shape) are transformed just as barrel distortion is corrected. The eventually obtained image data are going to provide image data having a shape substantially similar to the object. On the basis of the image data, an object image may better be produced out to a CRT or printer.

When correction of such image data is implemented, the effective imaging area at the wide-angle end comes to have a barrel form. And the image data of the barrel form of effective imaging area are transformed into rectangular image data.

Condition (8B) defines the degree of barrel distortion at the wide-angle end. If Condition (8B) is satisfied, it is then possible to make reasonable correction of astigmatism. Note here that an image with barrel distortion is subjected to photoelectric transformation, yielding image data with barrel distortion. However, electrical processing equivalent to image transformation is applied to the image data with barrel distortion by an image processing means that is a signal processing system in the electronic imaging apparatus. This would yield an image that is corrected for distortion and substantially similar to the subject's shape even when the image data eventually produced out of the image processing means is reproduced on a display device.

Here, as the lower limit to Condition (8B) is set at no less than 0.65, it prevents distortion from occurring from the zoom lens. So, when image distortion resulting from distortion of the zoom lens is corrected at the signal processing circuit, it is possible to minimize the enlargement of the edge of the post-correction image in the radial direction, helping prevent deterioration in the sharpness of that edge.

As the upper limit to Condition (8B) is set at no greater than 0.99, it allows for distortion of the zoom lens, working for correction of the zoom lens for astigmatism and the slimming-down of the zoom lens.

While the effective imaging area at the wide-angle end may be determined in such a way as to make perfect correction of distortion, it is understood that in consideration of perspective influences and deterioration in images' edges, some amount, e.g., about −3% or about −5%, of barrel distortion may be left behind, thereby altering the image data.

If the amount of distortion to be corrected is adjusted for each color signal (for instance, R (red), G (green), and B (blue)), chromatic aberration of magnification can then be corrected too.

When the aforesaid zoom lens has a focusing function, each of the aforesaid conditions is going to have a value upon focusing on the farthest object.

Preferably, multiple said inventions should be satisfied arbitrarily and at the same time.

More preferably, the aforesaid respective conditions should be reduced down as follows.

More preferably, the lower limit to Condition (1B) should be set at −2, especially −1.7, and more preferably, the upper limit to Condition (1B) should be set at −1.1, especially −1.2, and more especially −1.3.

More preferably, the lower limit to Condition (2B) should be set at 1.05, especially 1.1, and more preferably, the upper limit to Condition (2B) should be set at 1.3, especially 1.2.

More preferably, the lower limit to Condition (3B) should be set at −0.25, especially −0.22, and more preferably the upper limit to Condition (3B) should be set at −0.15, especially −0.17.

More preferably, the lower limit to Condition (4B) should be set at 1.5, especially 2, and more preferably, the upper limit to Condition (4B) should be set at 5.5, especially 5.

More preferably, the lower limit to Condition (5B) should be set at 15.5, especially 16, and more preferably, the upper limit to Condition (5B) should be set at 30, especially 25.

More preferably, the lower limit to Condition (6B) should be set at 15, especially 40 and more especially 55, and more preferably, the upper limit to Condition (6B) should be set at 68, especially 66.

More preferably, the lower limit to Condition (7B) should be set at 5, especially 6. More preferably, there should be an upper limit set at no greater than 10, because the total length can be slashed and aberrational fluctuations are minimized.

More preferably, the lower limit to Condition (8B) should be set at 0.7, especially 0.75, and more preferably, the upper limit to Condition (8B) should be set at 0.98, especially 0.95 and more especially 0.92.

As can be seen from the foregoing explanation, the present invention can successfully provide a zoom lens that works for making sure size reductions, a wide-angle arrangement and the desired zoom ratio, and makes it easy to keep the image quality of taken images in good condition. The invention can also provide a zoom lens at lower costs. Furthermore, the invention can provide an imaging apparatus comprising such a zoom lens.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 16 is an aberration diagram for Example 7 upon focusing on an object point at infinity.

FIG. 17 is an aberration diagram for Example 8 upon focusing on an object point at infinity.

FIG. 18 is an aberration diagram for Example 9 upon focusing on an object point at infinity.

DESCRIPTION OF EXEMPLARY EMBODIMENTS

Figure 1:
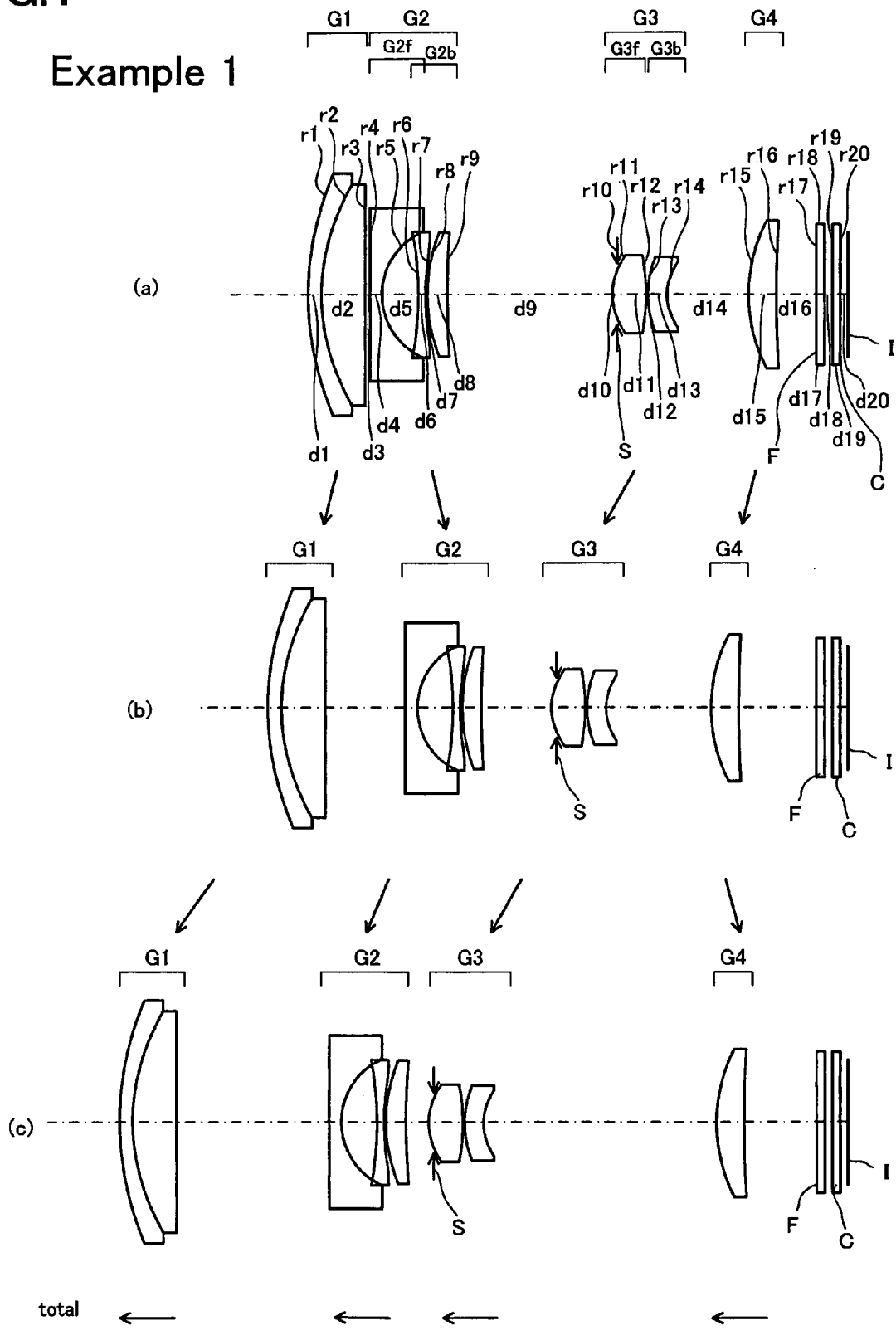
FIG. 1 is illustrative in lens arrangement section of Example 1 of the inventive zoom lens (a) at the wide-angle end, (b) in a transient state, and (c) at the telephoto end upon focusing on an object point at infinity.

The present invention is now explained with reference to Examples 1 to 5 of the inventive zoom lens. FIGS. 1 to 5 are illustrative in lens arrangement section of Examples 1 to 5 (a) at the wide-angle end, (b) in a transient state, and (c) at the telephoto end upon focusing on an object point at infinity. In the drawings, G1 stands for the first lens group, G2 the second lens group, S an aperture stop, G3 the third lens group, G4 the fourth lens group, F an optical low-pass filter, C the cover glass of a CCD that is an electronic imaging device, and I the image plane of the CCD. Note here that for a near infrared sharp cut coating, for instance, the optical low-pass filter F may be directly applied with the coating or, alternatively, there may be another infrared cut absorption filter provided.

As shown in FIG. 1, the zoom lens of Example 1 is made up of, in order from its object side, the first lens group G1 of positive refracting power, the second lens group G2 of negative refracting power, the aperture stop S, the third lens group G3 of positive refracting power and the fourth lens group G4 of positive refracting power.

How the lens groups move upon zooming from the wide-angle end to the telephoto end is now explained.

From the wide-angle end to the telephoto end, the first lens group G1 moves toward the object side.

From the wide-angle end to the transient state, the second lens group G2 moves toward the image plane side while the space between the first lens group G1 and it grows wide and the space between it and the third lens group G3 becomes narrow, and from the transient state to the telephoto end, it moves toward the object side while the space between the first lens group G1 and it grows wide and the space between it and the third lens group G3 becomes narrow. At the telephoto end, it is positioned more on the object side than at the wide-angle end.

From the wide-angle-end to the telephoto end, the aperture stop S and the third lens group G3 move in unison toward the object side.

From the wide-angle end to the transient state, the fourth lens group G4 moves toward the object side while the space between the third lens group G3 and it grows wide, and from the transient state to the telephoto end, it moves a bit toward the image plane side while the space between the third lens group G3 and it grows wide. At the telephoto end, it is positioned more on the object side than at the wide-angle end.

The first lens group G1 is made up of a cemented lens in which a negative meniscus lens convex on its object side and a double-convex positive lens are cemented together in order from the object side. The second lens group G2 is made up of, in order from the object side, a front unit G2$f$ and a rear unit G2$b$ wherein the front unit G2$f$ is made up of a negative meniscus lens convex on its object side and the rear unit G2$b$ is made up of a double-concave negative lens and a positive meniscus lens convex on its object side. The third lens group G3 is made up of, in order from the object side, a front unit G3$f$ and a rear unit G3$b$ wherein the front unit G3$f$ is made up of a double-convex positive lens and the rear unit G3$b$ is made up of a negative meniscus lens convex on its object side. The fourth lens group G4 is made up of a positive meniscus lens convex on its object side.

Five aspheric surfaces are used: two at both surfaces of the double-concave negative lens in the rear unit G2$b$ of the second lens group, two at both surfaces of the double-convex positive lens in the front unit G3$f$ of the third lens group, and one at the image-side surface of the negative meniscus lens in the rear unit G3$b$ of the third lens group.

Figure 2:
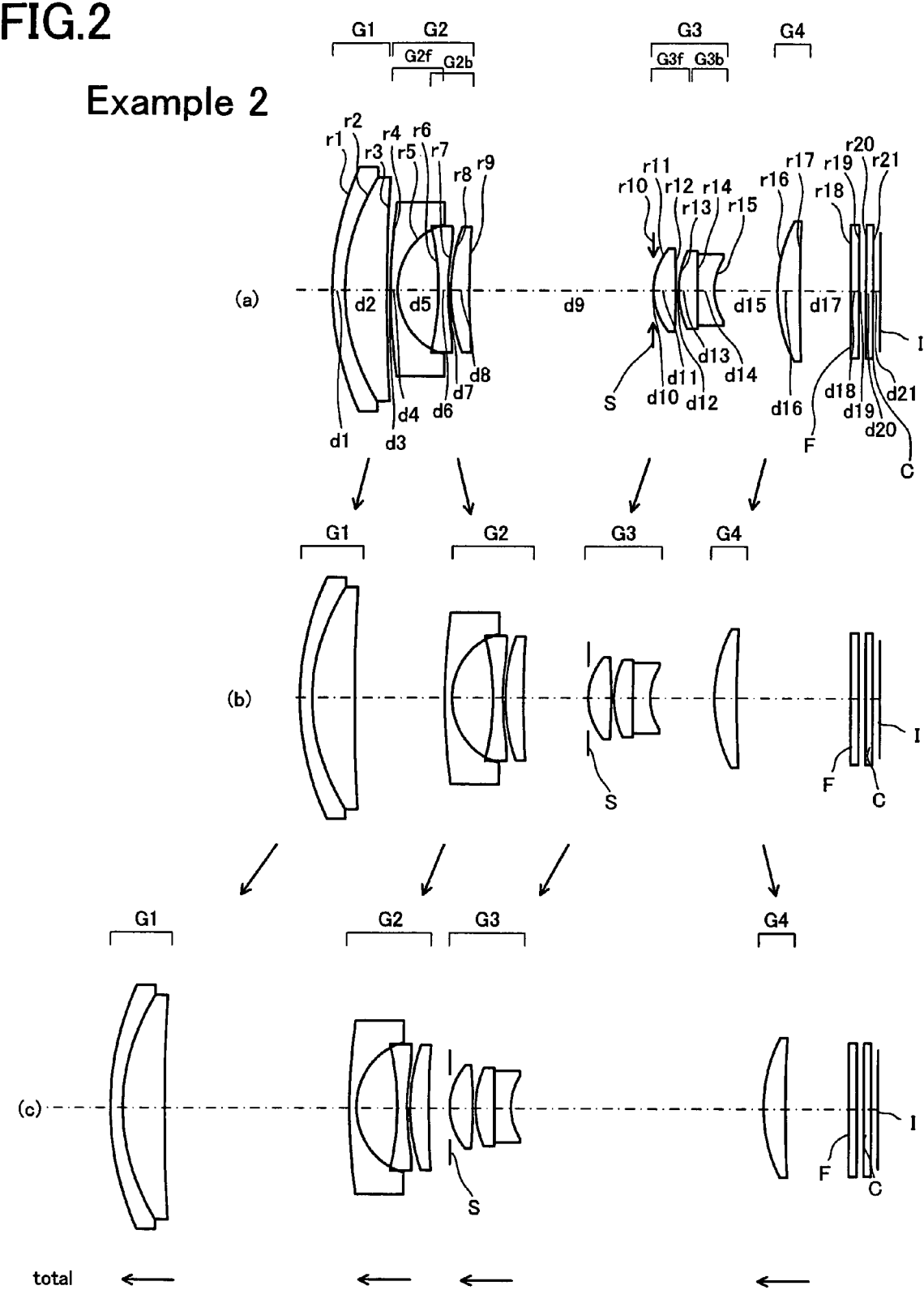
FIG. 2 is illustrative, as in FIG. 1, of Example 2 of the inventive zoom lens.

As shown in FIG. 2, the zoom lens of Example 2 is made up of, in order from its object side, the first lens group G1 of positive refracting power, the second lens group G2 of negative refracting power, the aperture stop S, the third lens group G3 of positive refracting power and the fourth lens group G4 of positive refracting power.

How the lens groups move upon zooming from the wide-angle end to the telephoto end is now explained.

From the wide-angle end to the telephoto end, the first lens group G1 moves toward the object side.

From the wide-angle end to the transient state, the second lens group G2 moves toward the image plane side while the space between the first lens group G1 and it grows wide and the space between it and the third lens group G3 becomes narrow, and from the transient state to the telephoto end, it moves toward the object side while the space between the first lens group G1 and it grows wide and the space between it and the third lens group G3 becomes narrow. At the telephoto end, it is positioned more on the object side than at the wide-angle end.

From the wide-angle end to the telephoto end, the aperture stop S and the third lens group G3 move in unison toward the object side.

From the wide-angle end to the transient state, the fourth lens group G4 moves toward the object side while the space between the third lens group G3 and it grows wide, and from the transient state to the telephoto end, it moves toward the image plane side while the space between the third lens group G3 and it grows wide. At the telephoto end, it is positioned more on the object side than at the wide-angle end.

The first lens group G1 is made up of a cemented lens in which a negative meniscus lens convex on its object side and a positive meniscus lens convex on its object side are cemented together in order from the object side. The second lens group G2 is made up of, in order from the object side, a front unit G2$f$ and a rear unit G2$b$ wherein the front unit G2$f$ is made up of a negative meniscus lens convex on its object side and the rear unit G2$b$ is made up of a double-concave negative lens and a positive meniscus lens convex on its object side. The third lens group G3 is made up of, in order from the object side, a front unit G3$f$ and a rear unit G3$b$ wherein the front unit G3$f$ is made up of a double-convex positive lens and the rear unit G3$b$ is made up of a cemented lens of a positive meniscus lens convex on its object side and a negative meniscus lens convex on its object side. The fourth lens group G4 is made up of one positive meniscus lens convex on its object side.

Six aspheric surfaces are used: two at both surfaces of the double-concave negative lens in the rear unit G2$b$ of the second lens group, two at both surfaces of the double-convex positive lens in the front unit G3$f$ of the third lens group, one at the surface of the cemented lens in the rear unit G3$b$ of the third lens group and nearest to the image plane side, and one at the object-side surface of the positive meniscus lens in the fourth lens group G4.

Figure 3:
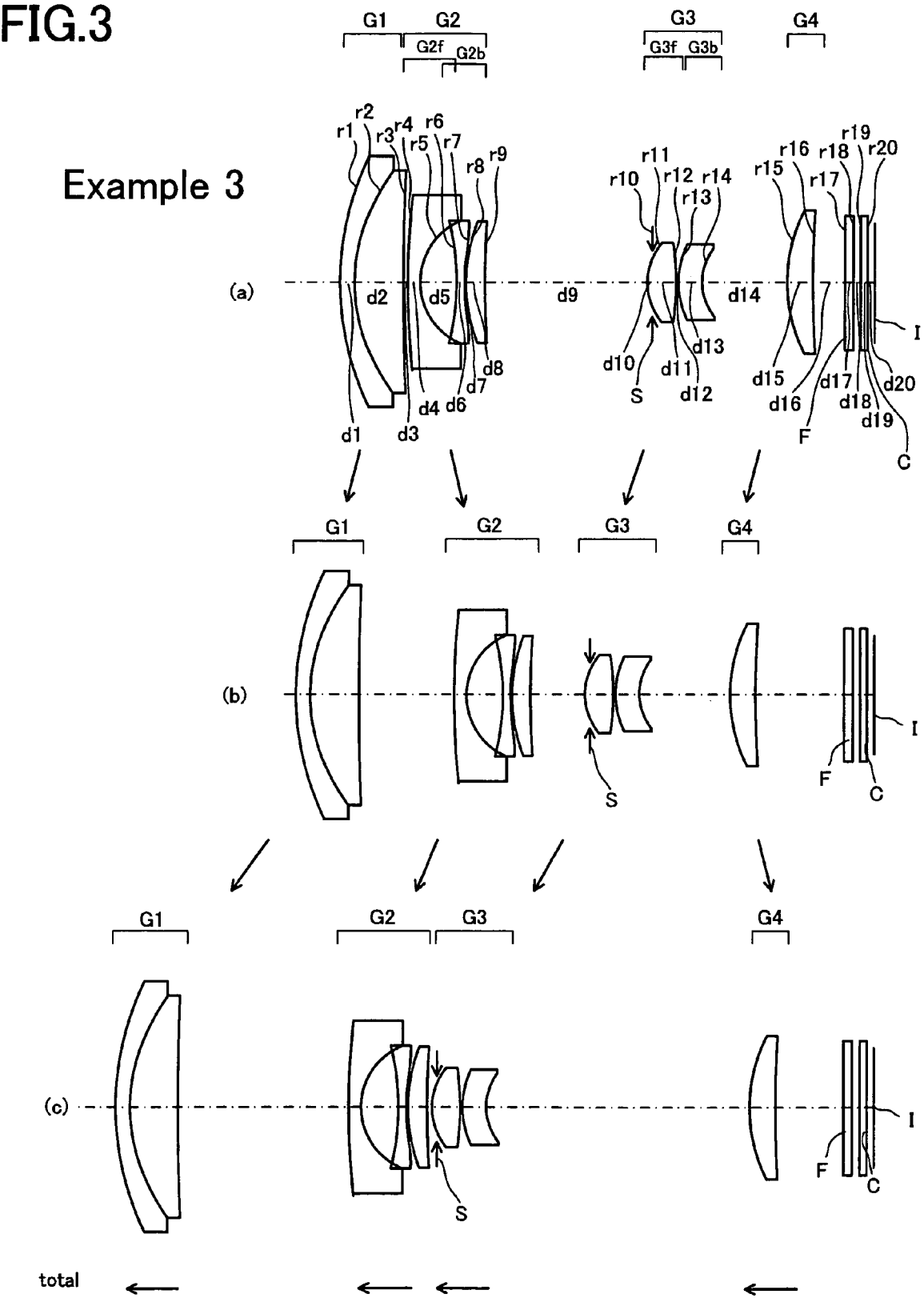
FIG. 3 is illustrative, as in FIG. 1, of Example 3 of the inventive zoom lens.

As shown in FIG. 3, the zoom lens of Example 3 is made up of, in order from its object side, the first lens group G1 of positive refracting power, the second lens group G2 of negative refracting power, the aperture stop S, the third lens group G3 of positive refracting power and the fourth lens group G4 of positive refracting power.

How the lens groups move upon zooming from the wide-angle end to the telephoto end is now explained.

From the wide-angle end to the telephoto end, the first lens group G1 moves toward the object side.

From the wide-angle end to the transient state, the second lens group G2 moves toward the image plane side while the space between the first lens group G1 and it grows wide and the space between it and the third lens group G3 becomes narrow, and from the transient state to the telephoto end, it moves toward the object side while the space between the first lens group G1 and it grows wide and the space between it and the third lens group G3 becomes narrow. At the telephoto end, it is positioned more on the object side than at the wide-angle end.

From the wide-angle end to the telephoto end, the aperture stop S and the third lens group G3 move in unison toward the object side.

From the wide-angle end to the transient state, the fourth lens group G4 moves toward the object side while the space between the third lens group G3 and it grows wide, and from the transient state to the telephoto end, it moves a bit toward the image plane side while the space between the third lens group G3 and it grows wide. At the telephoto end, it is positioned more on the object side than at the wide-angle end.

The first lens group G1 is made up of a cemented lens in which a negative meniscus lens convex on its object side and a positive meniscus lens convex on its object side are cemented together in order from the object side. The second lens group G2 is made up of, in order from the object side, a front unit G2$f$ and a rear unit G2$b$ wherein the front unit G2$f$ is made up of a negative meniscus lens convex on its object side and the rear unit G2$b$ is made up of a double-concave negative lens and a positive meniscus lens convex on its object side. The third lens group G3 is made up of, in order from the object side, a front unit G3f and a rear unit G3b wherein the front unit G3f is made up of a double-convex positive lens and the rear unit G3b is made up of a negative meniscus lens convex on its object side. The fourth lens group G4 is made up of one positive meniscus lens convex on its object side.

Six aspheric surfaces are used: two at both surfaces of the double-concave negative lens in the rear unit G2b of the second lens group, two at both surfaces of the double-convex positive lens in the front unit G3f of the third lens group, one at the image-plane-side surface of the negative meniscus lens in the rear unit G3b of the third lens group, and one at the object-side surface of the positive meniscus lens in the fourth lens group G4.

Figure 4:
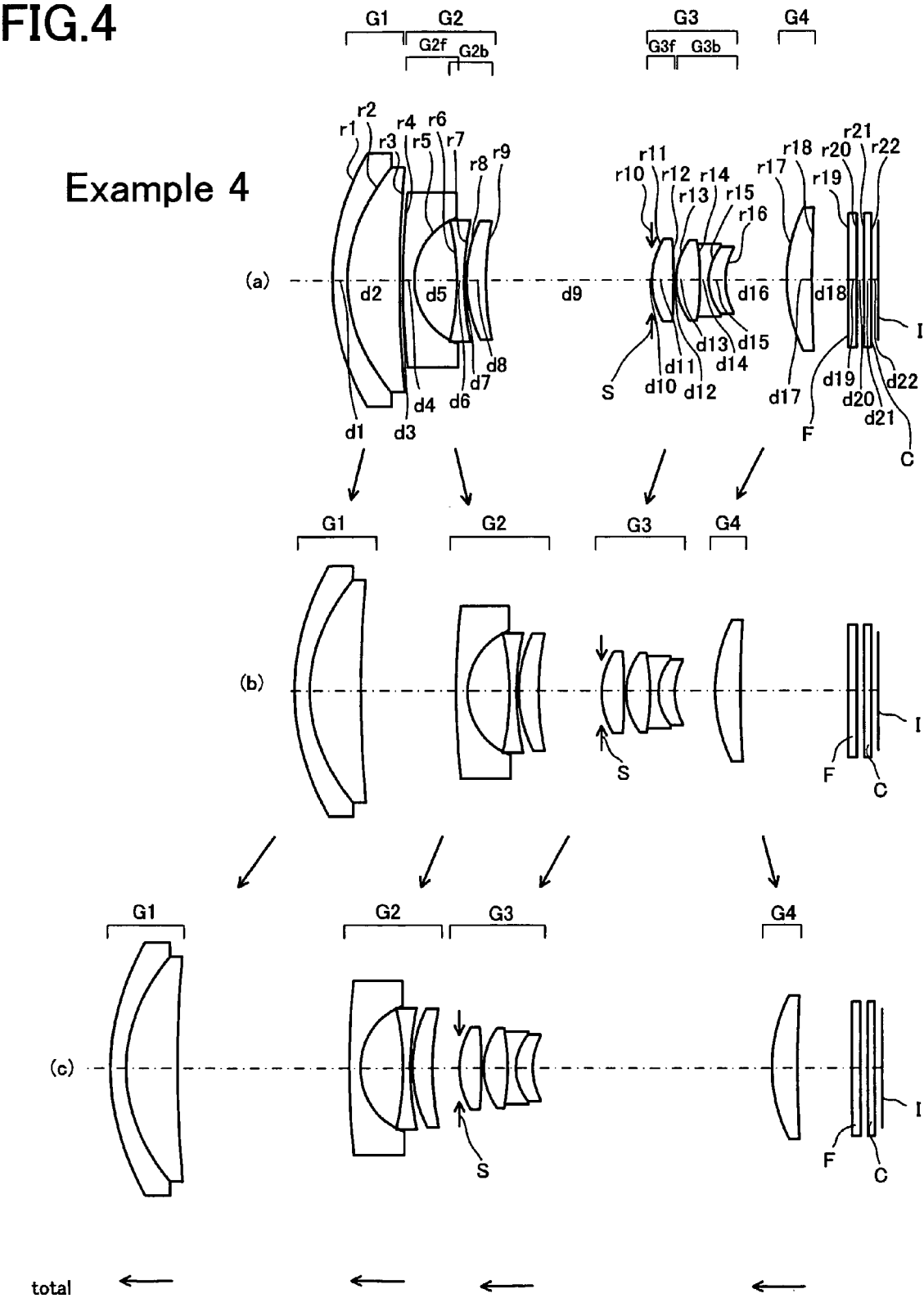
FIG. 4 is illustrative, as in FIG. 1, of Example 4 of the inventive zoom lens.

As shown in FIG. 4, the zoom lens of Example 4 is made up of, in order from its object side, the first lens group G1 of positive refracting power, the second lens group G2 of negative refracting power, the aperture stop S, the third lens group G3 of positive refracting power and the fourth lens group G4 of positive refracting power.

How the lens groups move upon zooming from the wide-angle end to the telephoto end is now explained.

From the wide-angle end to the telephoto end, the first lens group G1 moves toward the object side.

From the wide-angle end to the transient state, the second lens group G2 moves toward the image plane side while the space between the first lens group G1 and it grows wide and the space between it and the third lens group G3 becomes narrow, and from the transient state to the telephoto end, it moves toward the object side while the space between the first lens group G1 and it grows wide and the space between it and the third lens group G3 becomes narrow. At the telephoto end, it is positioned more on the object side than at the wide-angle end.

From the wide-angle end to the telephoto end, the aperture stop S and the third lens group G3 move in unison toward the object side.

From the wide-angle end to the transient state, the fourth lens group G4 moves toward the object side while the space between the third lens group G3 and it becomes narrow, and from the transient state to the telephoto end, it moves toward the image plane side while the space between the third lens group G3 and it becomes narrow. At the telephoto end, it is positioned more on the object side than at the wide-angle end.

The first lens group G1 is made up of a cemented lens in which a negative meniscus lens convex on its object side and a positive meniscus lens convex on its object side are cemented together in order from the object side. The second lens group G2 is made up of, in order from the object side, a front unit G2f and a rear unit G2b wherein the front unit G2f is made up of a negative meniscus lens convex on its object side and the rear unit G2b is made up of a double-concave negative lens and a positive meniscus lens convex on its object side. The third lens group G3 is made up of, in order from the object side, a front unit G3f and a rear unit G3b wherein the front unit G3f is made up of a double-convex positive lens and the rear unit G3b is made up of a cemented lens of a double-convex positive lens, a double-concave negative lens and a positive meniscus lens convex on its object side. The fourth lens group G4 is made up of one positive meniscus lens convex on its object side.

Six aspheric surfaces are used: two at both surfaces of the double-concave negative lens in the rear unit G2b of the second lens group, two at both surfaces of the double-convex positive lens in the front unit G3f of the third lens group, one at the surface of the cemented lens in the rear unit G3b of the third lens group and nearest to the image plane side, and one at the object-side surface of the positive meniscus lens in the fourth lens group G4.

Figure 5:
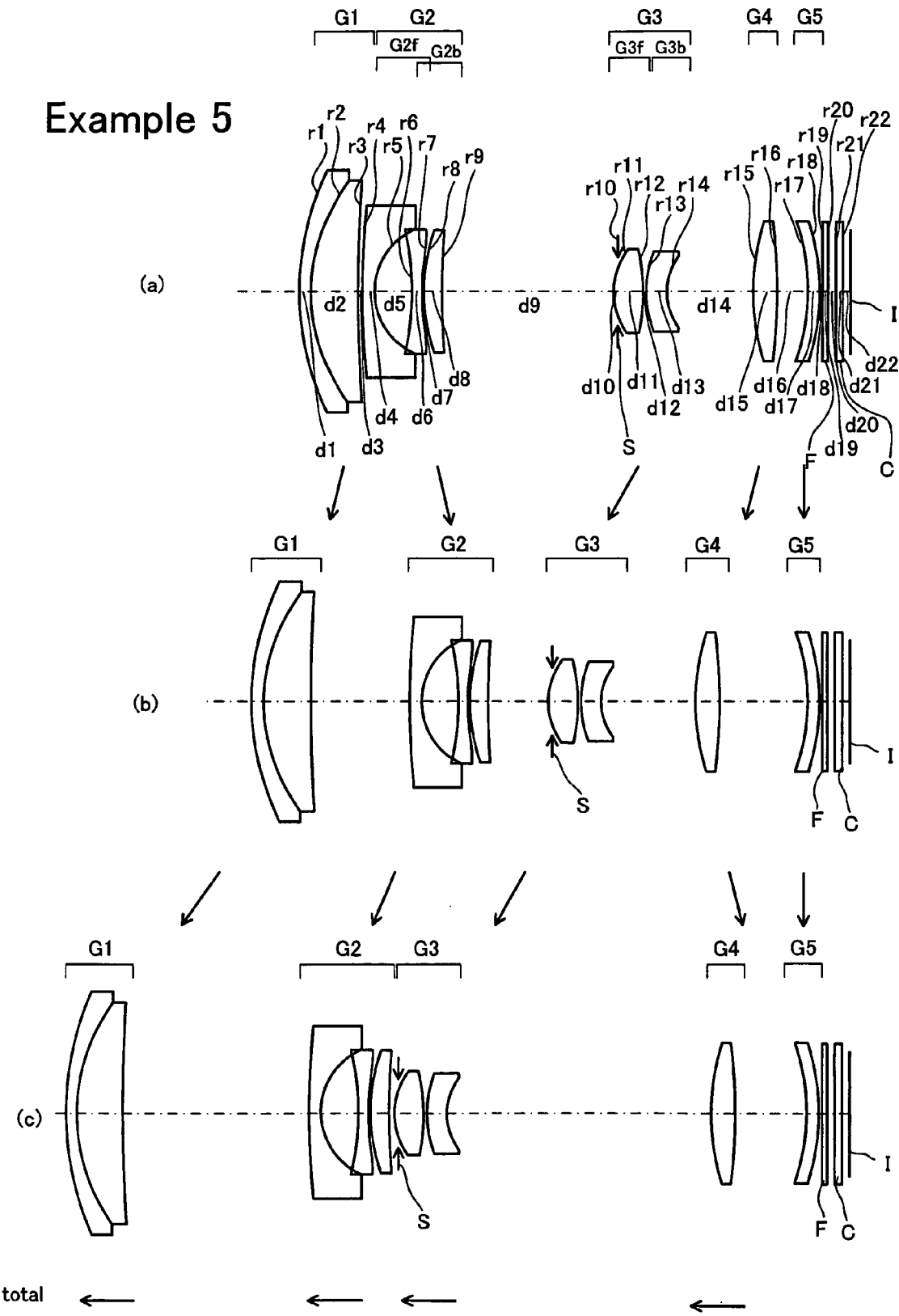
FIG. 5 is illustrative, as in FIG. 1, of Example 5 of the inventive zoom lens.

As shown in FIG. 5, the zoom lens of Example 5 is made up of, in order from its object side, the first lens group G1 of positive refracting power, the second lens group G2 of negative refracting power, the aperture stop S, the third lens group G3 of positive refracting power, the fourth lens group G4 of positive refracting power and the fifth lens group G5 of positive refracting power.

How the lens groups move upon zooming from the wide-angle end to the telephoto end is now explained.

From the wide-angle end to the telephoto end, the first lens group G1 moves toward the object side.

From the wide-angle end to the transient state, the second lens group G2 moves toward the image plane side while the space between the first lens group G1 and it grows wide and the space between it and the third lens group G3 becomes narrow, and from the transient state to the telephoto end, it moves toward the object side while the space between the first lens group G1 and it grows wide and the space between it and the third lens group G3 becomes narrow. At the telephoto end, it is positioned more on the object side than at the wide-angle end.

From the wide-angle end to the telephoto end, the aperture stop S and the third lens group G3 move in unison toward the object side.

From the wide-angle end to the transient state, the fourth lens group G4 moves toward the object side while the space between the third lens group G3 and it grows wide, and from the transient state to the telephoto end, it moves a bit toward the image plane side while the space between the third lens group G3 and it grows wide. At the telephoto end, it is positioned more on the object side than at the wide-angle end.

The fifth lens group G5 is kept against movement.

The first lens group G1 is made up of a cemented lens in which a negative meniscus lens convex on its object side and a double-convex positive lens are cemented together in order from the object side. The second lens group G2 is made up of, in order from the object side, a front unit G2f and a rear unit G2b wherein the front unit G2f is made up of a negative meniscus lens convex on its object side and the rear unit G2b is made up of a double-concave negative lens and a positive meniscus lens convex on its object side. The third lens group G3 is made up of, in order from the object side, a front unit G3f and a rear unit G3b wherein the front unit G3f is made up of a double-convex positive lens and the rear unit G3b is made up of a negative meniscus lens convex on its object side. The fourth lens group G4 is made up of one positive meniscus lens convex on its object side. The fifth lens group G5 is made up of one positive meniscus lens convex on its image plane side.

Aspheric surfaces are used: two at both surfaces of the double-concave negative lens in the rear unit G2b of the second lens group, two at both surfaces of the double-convex positive lens in the front unit G3f of the third lens group, one at the image-plane-side surface of the negative meniscus lens in the rear unit G3b of the third lens group, one at the object-side surface of the positive meniscus lens in the fourth lens group G4, and one at the object-side surface of the positive meniscus lens in the fifth lens group G5.

It should be noted that aspheric configuration is given by the following equation provided that x is an optical axis where the direction of travel of light is positive, and y is a direction orthogonal to the optical axis.

$$x=(y^2/r)/[1+\{1-(K+1)(y/r)^2\}^{1/2}]A_4y^4+A_6y^6+A_8y^8+A_{10}y^{10}$$

Wherein r is a paraxial radius of curvature, K is a conic coefficient, and $A^4$, $A^6$, $A^8$ and $A^{10}$ are the fourth-, sixth- eighth- and tenth-aspheric coefficients, respectively.

Numerical Example 1
Unit mm

Surface Data

| Surface No. | r | d | nd | vd |
|---|---|---|---|---|
| 1 | 20.184 | 0.90 | 1.84666 | 23.78 |
| 2 | 14.448 | 2.80 | 1.72916 | 54.68 |
| 3 | 1073.037 | Variable | | |
| 4 | 427.844 | 0.80 | 1.88300 | 40.76 |
| 5 | 4.572 | 2.24 | | |
| 6 (Aspheric Surface) | −39.093 | 0.50 | 1.52542 | 55.78 |
| 7 (Aspheric Surface) | 14.533 | 0.10 | | |
| 8 | 10.744 | 1.27 | 1.94595 | 17.98 |
| 9 | 48.064 | Variable | | |
| 10 (Stop) | ∞ | −0.30 | | |
| 11 (Aspheric Surface) | 4.104 | 2.18 | 1.49700 | 81.61 |
| 12 (Aspheric Surface) | −13.761 | 0.10 | | |
| 13 | 6.192 | 1.22 | 2.10225 | 16.80 |
| 14 (Aspheric Surface) | 3.854 | Variable | | |
| 15 | 10.500 | 1.80 | 1.52542 | 55.78 |
| 16 | 110.541 | Variable | | |
| 17 | ∞ | 0.50 | 1.54771 | 62.84 |
| 18 | ∞ | 0.50 | | |
| 19 | ∞ | 0.50 | 1.51633 | 64.14 |
| 20 | ∞ | 0.50 | | |
| Image Plane | ∞ | | | |

Aspheric Data

6th Surface

K = −60.536, A4 = −6.40505E−04, A6 = 3.95672E−05,
A8 = −1.36935E−06
7th Surface

K = 0.000, A4 = −1.03560E−03, A6 = 3.59861E−05,
A8 = −2.60735E−06
11th Surface

K = −0.520, A4 = −4.04394E−04, A6 = −3.22695E−05
12th Surface

K = 0.000, A4 = −3.22817E−04, A6 = 2.06984E−05
14th Surface

K = −0.840, A4 = 3.45125E−03, A6 = 1.54943E−04, A8 = 1.54344E−05

Zoom Data

| | Wide-Angle | Transient | Telephoto |
|---|---|---|---|
| Focal Length | 5.07 | 10.99 | 24.56 |
| F-Number | 3.30 | 4.15 | 5.81 |
| Angle of View | 81.92 | 38.36 | 17.55 |
| Image Height | 3.84 | 3.84 | 3.84 |
| d3 | 0.30 | 5.14 | 9.87 |
| d9 | 11.00 | 4.79 | 1.80 |
| d14 | 5.28 | 6.71 | 15.08 |
| d16 | 2.59 | 5.08 | 4.64 |
| BF | 4.25 | 6.74 | 6.29 |
| Total Lens Length | 34.43 | 37.00 | 46.65 |

Zoom Lens Group Data

| Group | Start Surface | Focal Length |
|---|---|---|
| 1 | 1 | 29.98 |
| 2 | 4 | −6.17 |
| 3 | 11 | 8.90 |
| 4 | 15 | 21.95 |

-continued

Numerical Example 1
Unit mm

Zoom Data (at the time of electrical correction of distortion)

| | Wide-Angle | Transient | Telephoto |
|---|---|---|---|
| Focal Length | 5.07 | 10.99 | 24.56 |
| F-Number | 3.30 | 4.15 | 5.81 |
| Angle of View | 74.34 | 38.36 | 17.55 |
| Image Height | 3.42 | 3.82 | 3.82 |

Numerical Example 2
Unit mm

Surface Data

| Surface No. | r | d | nd | vd |
|---|---|---|---|---|
| 1 | 20.667 | 0.80 | 1.92286 | 18.90 |
| 2 | 13.650 | 2.70 | 1.88300 | 40.76 |
| 3 | 108.221 | Variable | | |
| 4 | 41.801 | 0.50 | 1.88300 | 40.76 |
| 5 | 4.572 | 2.24 | | |
| 6 (Aspheric Surface) | −17.515 | 0.60 | 1.52542 | 55.78 |
| 7 (Aspheric Surface) | 22.203 | 0.10 | | |
| 8 | 11.240 | 1.24 | 1.94595 | 17.98 |
| 9 | 39.538 | Variable | | |
| 10 (Stop) | ∞ | 0.00 | | |
| 11 (Aspheric Surface) | 4.024 | 1.52 | 1.49700 | 81.61 |
| 12 (Aspheric Surface) | −42.083 | 0.10 | | |
| 13 | 5.941 | 1.26 | 1.51633 | 64.14 |
| 14 | 46272.511 | 1.16 | 1.90366 | 31.31 |
| 15 (Aspheric Surface) | 5.093 | Variable | | |
| 16 (Aspheric Surface) | 10.769 | 1.50 | 1.52542 | 55.78 |
| 17 | 94.150 | Variable | | |
| 18 | ∞ | 0.50 | 1.54771 | 62.84 |
| 19 | ∞ | 0.50 | | |
| 20 | ∞ | 0.50 | 1.51633 | 64.14 |
| 21 | ∞ | 0.50 | | |
| Image Plane | ∞ | | | |

Aspheric Data

6th Surface

K = −0.241, A4 = 3.40994E−04, A6 = −2.98980E−05
7th Surface

K = 0.000, A4 = 4.41548E−05, A6 = −4.31616E−05
11th Surface

K = −0.888, A4 = 8.00164E−04, A6 = 1.05486E−05
12th Surface

K = 0.000, A4 = −1.00264E−03, A6 = 4.03978E−05
15th Surface

K = 2.278, A4 = 1.99710E−03, A6 = 5.04698E−05
16th Surface

K = 0.000, A4 = 4.52537E−06, A6 = 2.70564E−07

Zoom Data

| | Wide-Angle | Transient | Telephoto |
|---|---|---|---|
| Focal Length | 5.00 | 12.70 | 33.80 |
| F-Number | 3.16 | 4.13 | 6.04 |
| Angle of View | 80.26 | 33.21 | 12.73 |
| Image Height | 3.84 | 3.84 | 3.84 |
| d3 | 0.25 | 5.91 | 12.00 |
| d9 | 12.00 | 4.25 | 1.40 |
| d15 | 4.06 | 4.19 | 16.41 |

Numerical Example 2
Unit mm

|  |  |  |  |
|---|---|---|---|
| d17 | 3.27 | 7.27 | 4.04 |
| BF | 4.92 | 8.92 | 5.69 |
| Total Lens Length | 35.39 | 37.43 | 49.65 |

Zoom Lens Group Data

| Group | Start Surface | Focal Length |
|---|---|---|
| 1 | 1 | 29.18 |
| 2 | 4 | −6.20 |
| 3 | 11 | 9.16 |
| 4 | 15 | 23.00 |

Zoom Data (at the time of electrical correction of distortion)

|  | Wide-Angle | Transient | Telephoto |
|---|---|---|---|
| Focal Length | 5.00 | 12.70 | 33.80 |
| F-Number | 3.16 | 4.13 | 6.04 |
| Angle of View | 75.19 | 33.21 | 12.73 |
| Image Height | 3.52 | 3.84 | 3.84 |

Numerical Example 3
Unit mm

Surface Data

| Surface No. | r | d | nd | vd |
|---|---|---|---|---|
| 1 | 19.180 | 0.90 | 1.84666 | 23.78 |
| 2 | 11.930 | 3.17 | 1.80400 | 46.57 |
| 3 | 134.442 | Variable |  |  |
| 4 | 71.138 | 0.80 | 1.88300 | 40.76 |
| 5 | 4.506 | 2.35 |  |  |
| 6 (Aspheric Surface) | −40.694 | 0.50 | 1.74320 | 49.34 |
| 7 (Aspheric Surface) | 14.333 | 0.10 |  |  |
| 8 | 11.089 | 1.31 | 1.92286 | 18.90 |
| 9 | 143.834 | Variable |  |  |
| 10 (Stop) | ∞ | −0.30 |  |  |
| 11 (Aspheric Surface) | 3.950 | 1.87 | 1.49700 | 81.61 |
| 12 (Aspheric Surface) | −14.607 | 0.10 |  |  |
| 13 | 6.677 | 1.50 | 2.10225 | 16.80 |
| 14 (Aspheric Surface) | 3.941 | Variable |  |  |
| 15 (Aspheric Surface) | 10.000 | 1.64 | 1.52542 | 55.78 |
| 16 | 98.516 | Variable |  |  |
| 17 | ∞ | 0.50 | 1.54771 | 62.84 |
| 18 | ∞ | 0.50 |  |  |
| 19 | ∞ | 0.50 | 1.51633 | 64.14 |
| 20 | ∞ | 0.50 |  |  |
| Image Plane | ∞ |  |  |  |

Aspheric Data

6th Surface $K = 93.493, A4 = -1.62861E-03, A6 = 1.21652E-04,$
$A8 = -3.51498E-06$ 7th Surface $K = 0.000, A4 = -2.01098E-03, A6 = 1.23307E-04,$
$A8 = -4.96995E-06, A10 = 1.81378E-08$ 11th Surface $K = -0.840, A4 = 5.07059E-04, A6 = -2.84461E-05$ 12th Surface $K = 0.000, A4 = 7.51952E-06, A6 = -2.48970E-05$ 14th Surface $K = -0.756, A4 = 3.57507E-03, A6 = 1.87747E-04, A8 = 4.40623E-05$

Numerical Example 3
Unit mm

15th Surface $K = 0.000, A4 = -3.33826E-05$

Zoom Data

|  | Wide-Angle | Transient | Telephoto |
|---|---|---|---|
| Focal Length | 5.06 | 12.86 | 34.24 |
| F-Number | 3.17 | 4.03 | 6.11 |
| Angle of View | 81.11 | 33.00 | 12.59 |
| Image Height | 3.84 | 3.84 | 3.84 |
| d3 | 0.25 | 6.12 | 11.00 |
| d9 | 10.80 | 3.76 | 0.60 |
| d14 | 5.56 | 5.93 | 17.16 |
| d16 | 2.00 | 5.63 | 4.28 |
| BF | 3.65 | 7.28 | 5.94 |
| Total Lens Length | 34.20 | 37.04 | 48.65 |

Zoom Lens Group Data

| Group | Start Surface | Focal Length |
|---|---|---|
| 1 | 1 | 28.39 |
| 2 | 4 | −5.88 |
| 3 | 11 | 8.49 |
| 4 | 15 | 21.05 |

Zoom Data (at the time of electrical correction of distortion)

|  | Wide-Angle | Transient | Telephoto |
|---|---|---|---|
| Focal Length | 5.06 | 12.86 | 34.24 |
| F-Number | 3.17 | 4.03 | 6.11 |
| Angle of View | 74.34 | 33.00 | 12.59 |
| Image Height | 3.45 | 3.84 | 3.84 |

Numerical Example 4
Unit mm

Surface Data

| Surface No. | r | d | nd | vd |
|---|---|---|---|---|
| 1 | 17.289 | 0.90 | 1.84666 | 23.78 |
| 2 | 10.848 | 3.34 | 1.78800 | 47.37 |
| 3 | 84.961 | Variable |  |  |
| 4 | 50.541 | 0.70 | 1.88300 | 40.76 |
| 5 | 4.432 | 2.75 |  |  |
| 6 (Aspheric Surface) | −14.354 | 0.50 | 1.52542 | 55.78 |
| 7 (Aspheric Surface) | 22.468 | 0.10 |  |  |
| 8 | 9.152 | 1.30 | 1.94595 | 17.98 |
| 9 | 21.000 | Variable |  |  |
| 10 (Stop) | ∞ | 0.00 |  |  |
| 11 (Aspheric Surface) | 5.298 | 1.47 | 1.58313 | 59.38 |
| 12 (Aspheric Surface) | −44.231 | 0.10 |  |  |
| 13 | 4.321 | 1.60 | 1.51633 | 64.14 |
| 14 | −15.000 | 0.50 | 1.90366 | 31.31 |
| 15 | 3.500 | 1.11 | 1.68893 | 31.07 |
| 16 (Aspheric Surface) | 6.162 | Variable |  |  |
| 17 (Aspheric Surface) | 10.500 | 1.69 | 1.52542 | 55.78 |
| 18 | 75.647 | Variable |  |  |
| 19 | ∞ | 0.50 | 1.54771 | 62.84 |
| 20 | ∞ | 0.50 |  |  |
| 21 | ∞ | 0.50 | 1.51633 | 64.14 |
| 22 | ∞ | 0.50 |  |  |
| Image Plane | ∞ |  |  |  |

-continued

Numerical Example 4
Unit mm

Aspheric Data

6th Surface

K = −18.466, A4 = 1.55007E−04, A6 = −1.83466E−05
7th Surface

K = 0.000, A4 = 7.83716E−04, A6 = −4.73526E−05
11th Surface

K = −0.939, A4 = 6.11342E−04, A6 = 2.85705E−05
12th Surface

K = 0.000, A4 = −5.68675E−04, A6 = 3.14012E−05
16th Surface

K = −0.686, A4 = 5.57140E−03, A6 = 1.49217E−0, A8 = 3.11230E−05
17th Surface

K = 0.000, A4 = 2.41648E−05, A6 = 1.36418E−07

Zoom Data

|  | Wide-Angle | Transient | Telephoto |
|---|---|---|---|
| Focal Length | 5.07 | 12.88 | 34.27 |
| F-Number | 3.13 | 4.00 | 6.10 |
| Angle of View | 81.34 | 32.61 | 12.54 |
| Image Height | 3.84 | 3.84 | 3.84 |
| d3 | 0.25 | 6.12 | 11.26 |
| d9 | 10.75 | 4.11 | 1.70 |
| d16 | 3.95 | 2.55 | 15.50 |
| d18 | 2.32 | 6.98 | 3.50 |
| BF | 3.97 | 8.63 | 5.15 |
| Total Lens Length | 34.96 | 37.44 | 49.65 |

Zoom Lens Group Data

| Group | Start Surface | Focal Length |
|---|---|---|
| 1 | 1 | 28.25 |
| 2 | 4 | −5.50 |
| 3 | 11 | 8.24 |
| 4 | 15 | 23.00 |

Zoom Data (at the time of electrical correction of distortion)

|  | Wide-Angle | Transient | Telephoto |
|---|---|---|---|
| Focal Length | 5.07 | 12.88 | 34.27 |
| F-Number | 3.13 | 4.00 | 6.10 |
| Angle of View | 81.34 | 32.61 | 12.54 |
| Image Height | 3.44 | 3.84 | 3.84 |

Numerical Example 5
Unit mm

Surface Data

| Surface No. | r | d | nd | νd |
|---|---|---|---|---|
| 1 | 17.912 | 0.80 | 1.84666 | 23.78 |
| 2 | 12.037 | 2.98 | 1.77250 | 49.60 |
| 3 | 85.075 | Variable |  |  |
| 4 | 52.269 | 0.75 | 1.88300 | 40.76 |
| 5 | 4.500 | 2.41 |  |  |
| 6 (Aspheric Surface) | −30.820 | 0.60 | 1.58313 | 59.38 |
| 7 (Aspheric Surface) | 14.570 | 0.10 |  |  |
| 8 | 10.821 | 1.24 | 1.94595 | 17.98 |
| 9 | 42.997 | Variable |  |  |
| 10 (Stop) | ∞ | −0.30 |  |  |
| 11 (Aspheric Surface) | 4.174 | 1.89 | 1.49700 | 81.61 |
| 12 (Aspheric Surface) | −12.814 | 0.10 |  |  |
| 13 | 6.462 | 1.35 | 2.10225 | 16.80 |
| 14 (Aspheric Surface) | 3.994 | Variable |  |  |
| 15 (Aspheric Surface) | 15.000 | 1.48 | 1.52542 | 55.78 |
| 16 | −60.061 | Variable |  |  |
| 17 (Aspheric Surface) | −15.000 | 0.80 | 1.52542 | 55.78 |
| 18 | −14.474 | 0.10 |  |  |
| 19 | ∞ | 0.30 | 1.51633 | 64.14 |
| 20 | ∞ | 0.50 |  |  |
| 21 | ∞ | 0.50 | 1.51633 | 64.14 |
| 22 | ∞ | 0.50 |  |  |
| Image Plane | ∞ |  |  |  |

Aspheric Data

6th Surface

K = 7.548, A4 = −7.20453E−04, A6 = 4.60250E−06
7th Surface

K = −19.224, A4 = −3.45511E−04, A6 = −1.38155E−05
11th Surface

K = −0.986, A4 = 7.82686E−04, A6 = −9.16230E−05
12th Surface

K = −4.094, A4 = 1.33854E−04, A6 = −1.75238E−04,
A8 = 1.11412E−05
14th Surface

K = −0.696, A4 = 2.85239E−03, A6 = 2.68798E−04
15th Surface

K = 0.000, A4 = 4.22970E−05, A6 = −4.51175E−06
16th Surface

K = 0.000, A4 = −5.73220E−04, A6 = 2.60520E−05

Zoom Data

|  | Wide-Angle | Transient | Telephoto |
|---|---|---|---|
| Focal Length | 5.06 | 12.86 | 34.09 |
| F-Number | 3.14 | 4.03 | 6.04 |
| Angle of View | 81.51 | 32.86 | 12.55 |
| Image Height | 3.84 | 3.84 | 3.84 |
| d3 | 0.25 | 6.34 | 11.70 |
| d9 | 11.22 | 3.94 | 0.70 |
| d14 | 5.53 | 6.01 | 16.90 |
| d16 | 1.96 | 5.69 | 4.59 |
| BF | 1.63 | 1.63 | 1.63 |
| Total Lens Length | 34.79 | 37.82 | 49.73 |

Zoom Lens Group Data

| Group | Start Surface | Focal Length |
|---|---|---|
| 1 | 1 | 30.33 |
| 2 | 4 | −5.99 |
| 3 | 11 | 8.60 |
| 4 | 15 | 23.00 |
| 5 | 17 | 515.19 |

Zoom Data (at the time of electrical correction of distortion)

|  | Wide-Angle | Transient | Telephoto |
|---|---|---|---|
| Focal Length | 5.06 | 12.86 | 34.09 |
| F-Number | 3.14 | 4.03 | 6.04 |
| Angle of View | 81.51 | 32.86 | 12.55 |
| Image Height | 3.44 | 3.84 | 3.84 |

The aberrational diagrams for Examples 1 to 5 upon focusing on an object point at infinity are presented in FIGS. 6 to 10. In these aberrational diagrams, (a), (b) and (c) are indicative of spherical aberrations, astigmatism, distortion and chromatic aberration at the wide-angle end, in the transient state, and at the telephoto end, respectively, with "FII" standing for a half angle of view.

The values of Conditions (1A) to (13A) in Examples 1 to 5 are tabulated below.

| Condition | Example 1 | Example 2 | Example 3 | Example 4 | Example 5 |
|---|---|---|---|---|---|
| (1A) | 3.837 | 3.221 | 2.593 | 2.995 | 3.005 |
| (2A) | −1.426 | −1.632 | −1.569 | −1.619 | −1.579 |
| (3A) | 10.123 | 25.600 | 26.584 | 434.769 | 26.498 |
| (4A) | 3.259 | 2.991 | 2.415 | 3.018 | 2.818 |
| (5A) | −1.034 | −1.151 | −1.082 | −1.093 | −1.109 |
| (6A) | −2.341 | −2.623 | −2.203 | −2.961 | −2.505 |
| (7A) | 1.022 | 1.242 | 1.135 | 1.192 | 1.188 |
| (8A) | 0.233 | 0.077 | 0.258 | −0.176 | 0.236 |
| (9A) | 16.80 | 31.31 | 16.80 | 31.31 | 16.80 |
| (10A) | 64.81 | 41.57 | 64.81 | 20.22 | 64.81 |
| (11A) | 4.85 | 6.76 | 6.76 | 6.76 | 6.74 |
| (12A) | 0.458 | −0.118 | 0.479 | −0.220 | 0.358 |
| (13A) | 0.926 | 0.939 | 0.930 | 0.929 | 0.987 |

Any one of the inventive embodiments given below allows the aforesaid requirements to correlate with one another, providing a zoom lens that gets hold of a zoom ratio of the order of 7, and albeit being a wide-angle arrangement, comprises a reduced number of lenses and works for compactness at the time of being received in a collapsible lens mount. In addition, the zoom lens helps get hold of optical performance.

The zoom lens of the invention is now explained with reference to Examples 6 to 10. FIGS. 11 to 14 are illustrative in lens arrangement section of Examples 6 to 9 (a) at the wide-angle end, (b) in the transient state, and (c) at the telephoto end upon focusing on an object point at infinity. Example 10, because of being much the same as Example 5, is shown in FIG. 5.

In the drawings, G1 stands for the first lens group, G2 the second lens group, S an aperture stop, G3 the third lens group, G4 the fourth lens group, F an optical low-pass filter with an IR cut coating applied to it, C the cover glass of a CCD that is an electronic imaging device, and I the image plane of the CCD. Note here that for the IR cut coating, for instance, the optical low-pass filter F may be directly applied with the coating or, alternatively, there may be another infrared cut absorption filter provided.

Each example is designed such that focusing from a far object to a nearby object is implemented by letting out the fourth lens group G4.

The aperture stop S is of fixed opening size, and the convex surface on the object side of the third lens group G3 is inserted into the opening in the aperture stop S.

Further, exposure adjustment at the image-taking time is implemented by the insertion or de-insertion of a light quantity adjustment filter (not shown) that moves in unison with the third lens group G3 in an optical path just after the image side of the third lens group G3 and by means of a mechanical shutter (not shown).

Plastic lenses are used for the fourth lens group G4 in Example 6, 7; for the double-concave lens in the second lens group G2 and the fourth lens group G4 as well in Example 8, 9; and for the fourth and fifth lens groups G4 and G5 in Example 10.

Figure 6:
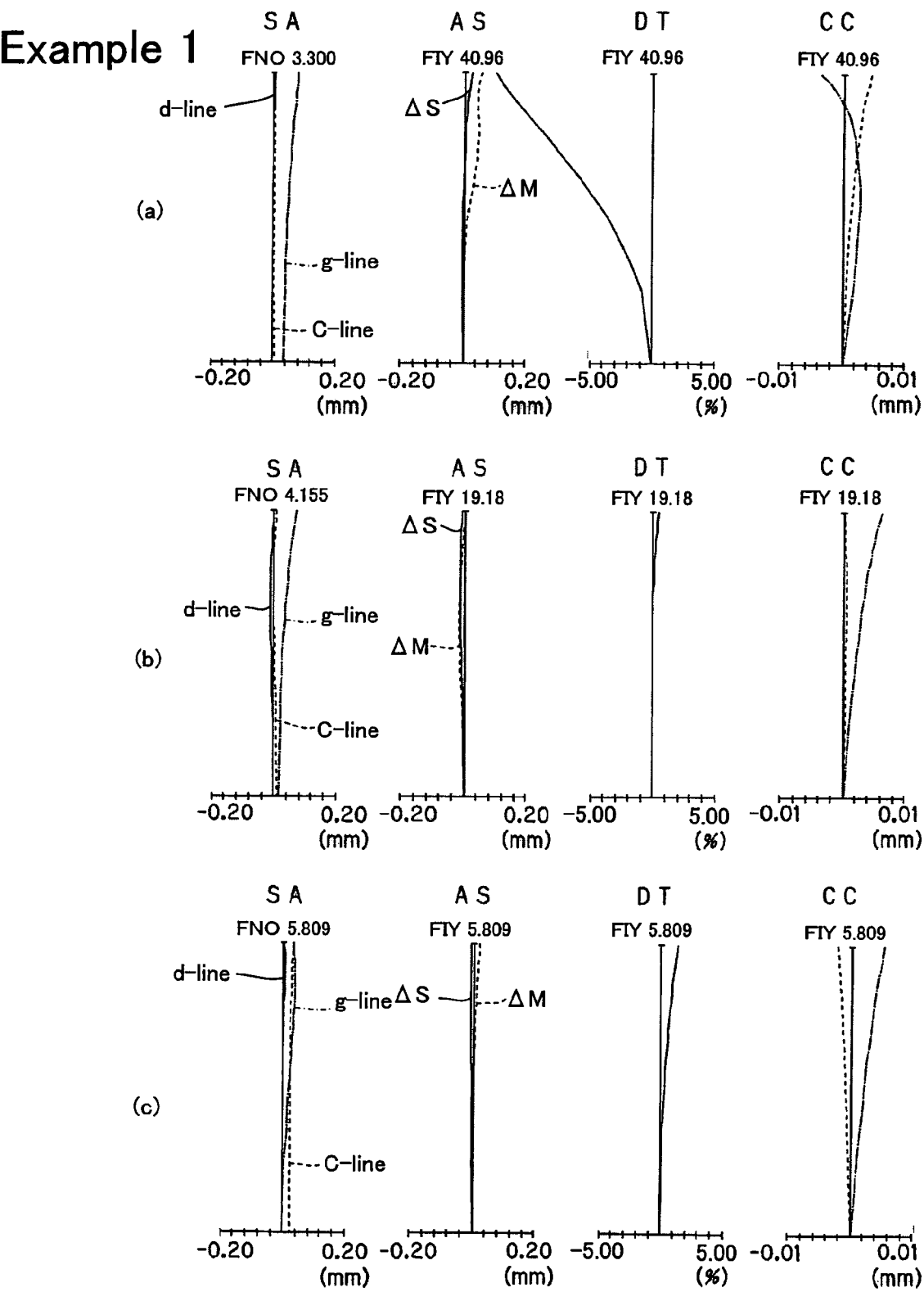
FIG. 6 is an aberration diagram for Example 1 upon focusing on an object point at infinity.

As shown in FIG. 6, the zoom lens of Example 6 is made up of, in order from its object side, the first lens group G1 of positive refracting power, the second lens group G2 of negative refracting power, the aperture stop S, the third lens group G3 of positive refracting power and the fourth lens group G4 of positive refracting power.

How the lens groups move upon zooming from the wide-angle end to the telephoto end is now explained.

From the wide-angle end to the telephoto end, the first lens group G1 moves toward the object side.

From the wide-angle end to the transient state, the second lens group G2 moves toward the image plane side while the space between the first lens group G1 and it grows wide and the space between it and the third lens group G3 becomes narrow, and from the transient state to the telephoto end, it moves toward the object side while the space between the first lens group G1 and it grows wide and the space between it and the third lens group G3 becomes narrow. At the telephoto end, it is positioned more on the object side than at the wide-angle end.

From the wide-angle end to the telephoto end, the aperture stop S and the third lens group G3 move toward the object side while the space between the second lens group G2 and them becomes narrow and the space between them and the fourth lens group G4 grows wide.

From the wide-angle end to the transient state, the fourth lens group G4 moves toward the object side while the space between the third lens group G3 and it grows wide and the space between it and the image plane I grows wide, and from the transient state to the telephoto end, it moves toward the image plane side while the space between the third lens group G3 and it grows wide and the space between it and the image plane I becomes narrow. At the telephoto end, it is positioned more on the object side than at the wide-angle end.

In order from the object side, the first lens group G1 is made up of a cemented lens in which a negative meniscus lens convex on its object side and a double-convex positive lens are cemented together; the second lens group G2 is made up of a negative meniscus lens convex on its object side, a double-concave negative lens and a positive meniscus lens convex on its object side; the third lens group G3 is made up of the aperture stop S, a double-convex positive lens and a negative meniscus lens convex on its object side; and the fourth lens group G4 is made up of one positive meniscus lens convex on its object side.

Six aspheric surfaces are used: two at both surfaces of the double-concave negative lens in the second lens group G2, two at both surfaces of the double-convex positive lens in the third lens group G3, one at the image-side surface of the negative meniscus lens in the third lens group G3, and one at the object-side surface of the positive meniscus lens in the fourth lens group G4.

Figure 7:
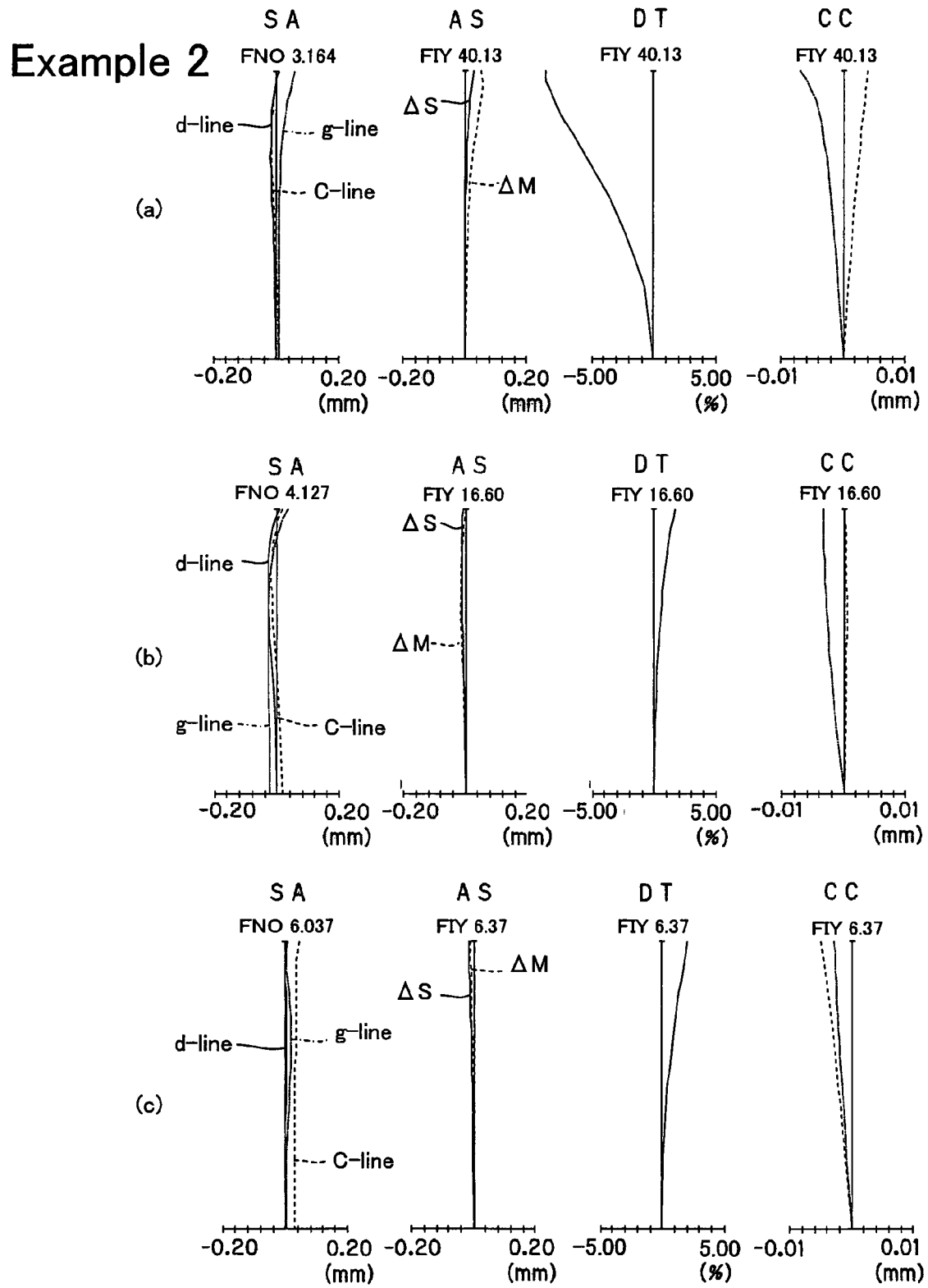
FIG. 7 is an aberration diagram for Example 2 upon focusing on an object point at infinity.

As shown in FIG. 7, the zoom lens of Example 7 is made up of, in order from its object side, the first lens group G1 of positive refracting power, the second lens group G2 of negative refracting power, the aperture stop S, the third lens group G3 of positive refracting power and the fourth lens group G4 of positive refracting power.

How the lens groups move upon zooming from the wide-angle end to the telephoto end is now explained.

From the wide-angle end to the telephoto end, the first lens group G1 moves toward the object side.

From the wide-angle end to the transient state, the second lens group G2 moves toward the image side while the space between the first lens group G1 and it grows wide and the space between it and the third lens group G3 becomes narrow, and from the transient state to the telephoto end, it moves toward the object side while the space between the first lens group G1 and it grows wide and the space between it and the third lens group G3 becomes narrow. At the telephoto end, it is positioned more on the object side than at the wide-angle end.

From the wide-angle end to the telephoto end, the aperture stop S and the third lens group G3 move toward the object side while the space between the second lens group G2 and them becomes narrow and the space between them and the fourth lens group G4 grows wide.

From the wide-angle end to the transient state, the fourth lens group G4 moves toward the object side while the space between the third lens group G3 and it grows wide and the space between it and the image plane I grows wide, and from the transient state to the telephoto end, it moves toward the image side while the space between the third lens group G3 and it grows wide and the space between it and the image plane I becomes narrow. At the telephoto end, it is positioned more on the object side than at the wide-angle end.

In order from the object side, the first lens group G1 is made up of a cemented lens in which a negative meniscus lens convex on its object side and a positive meniscus lens convex on its object side are cemented together; the second lens group G2 is made up of a negative meniscus lens convex on its object side, a positive meniscus lens convex on its image side and a negative meniscus lens convex on its image side; the third lens group G3 is made up of the aperture stop S, a double-convex positive lens and a negative meniscus lens convex on its object side; and the fourth lens group G4 is made up of one positive meniscus lens convex on its object side.

Five aspheric surfaces are used: one at the image-side surface of the image-side negative meniscus lens in the second lens group G2, two at both surfaces of the double-convex positive lens in the third lens group G3, one at the image-side surface of the negative meniscus lens in the third lens group G3, and one at the image-side surface of the positive meniscus lens in the fourth lens group G4.

Figure 8:
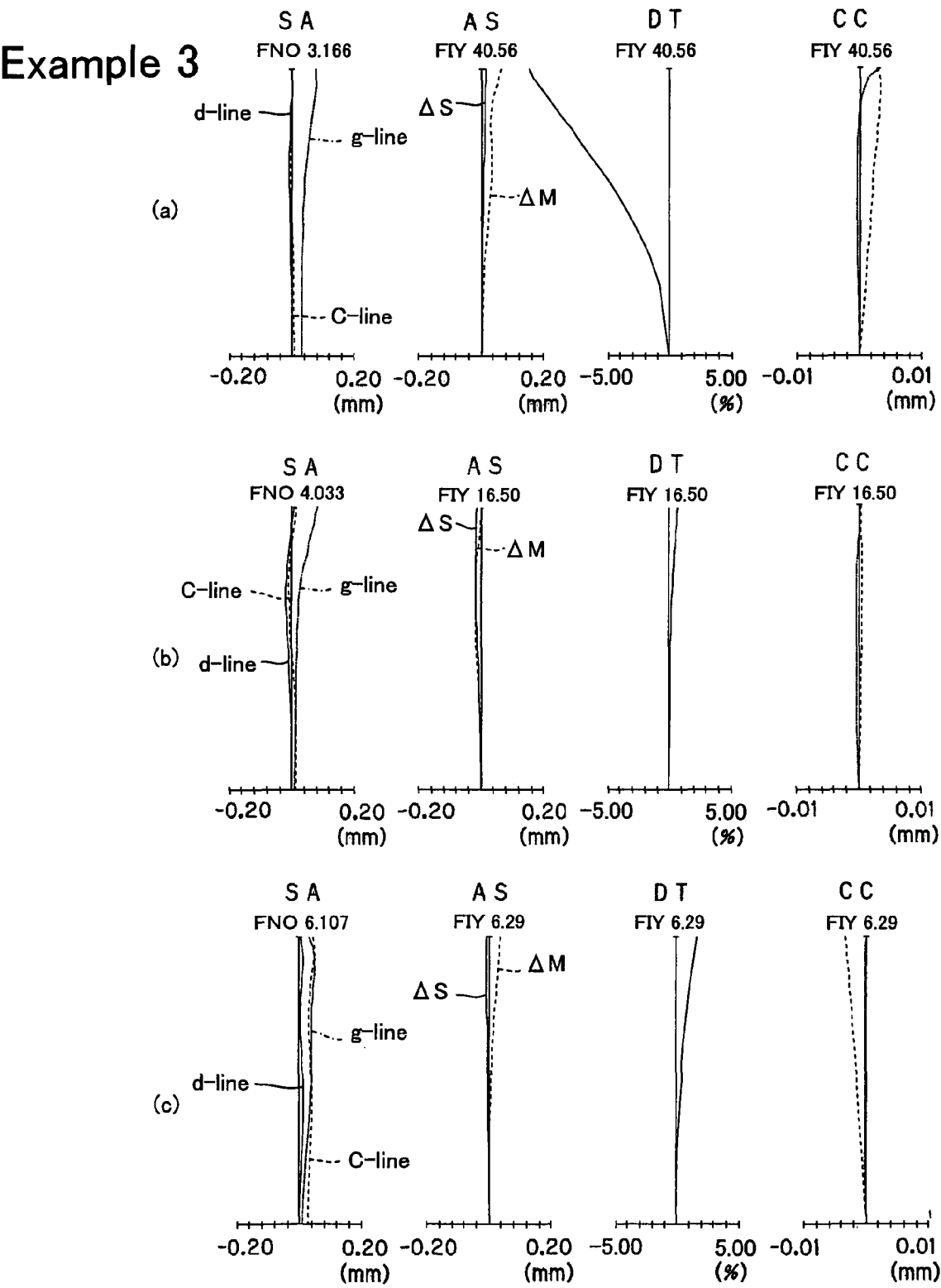
FIG. 8 is an aberration diagram for Example 3 upon focusing on an object point at infinity.

As shown in FIG. 8, the zoom lens of Example 8 is made up of, in order from its object side, the first lens group G1 of positive refracting power, the second lens group G2 of negative refracting power, the aperture stop S, the third lens group G3 of positive refracting power and the fourth lens group G4 of positive refracting power.

How the lens groups move upon zooming from the wide-angle end to the telephoto end is now explained.

From the wide-angle end to the telephoto end, the first lens group G1 moves toward the object side.

From the wide-angle end to the transient state, the second lens group G2 moves toward the image side while the space between the first lens group G1 and it grows wide and the space between it and the third lens group G3 becomes narrow, and from the transient state to the telephoto end, it moves toward the object side while the space between the first lens group G1 and it grows wide and the space between it and the third lens group G3 becomes narrow. At the telephoto end, it is positioned more on the object side than at the wide-angle end.

From the wide-angle end to the telephoto end, the aperture stop S and the third lens group G3 move toward the object side while the space between the second lens group G2 and them becomes narrow and the space between them and the fourth lens group G4 grows wide.

From the wide-angle end to the transient state, the fourth lens group G4 moves toward the object side while the space between the third lens group G3 and it grows wide and the space between it and the image plane I grows wide, and from the transient state to the telephoto end, it moves toward the image side while the space between the third lens group G3 and it grows wide and the space between it and the image plane I becomes narrow. At the telephoto end, it is positioned more on the object side than at the wide-angle end.

In order from the object side, the first lens group G1 is made up of a cemented lens in which a negative meniscus lens convex on its object side and a positive meniscus lens convex on its object side are cemented together; the second lens group G2 is made up of a negative meniscus lens convex on its object side, a double-concave negative lens and a positive meniscus lens convex on its object side; the third lens group G3 is made up of the aperture stop S, a double-convex positive lens and a negative meniscus lens convex on its object side; and the fourth lens group G4 is made up of one positive meniscus lens convex on its object side.

Five aspheric surfaces are used: one at the image-side surface of the double-concave negative lens in the second lens group G2, two at both surfaces of the double-convex positive lens in the third lens group G3, one at the image-side surface of the negative meniscus lens in the third lens group G3, and one at the image-side surface of the positive meniscus lens in the fourth lens group G4.

Figure 9:
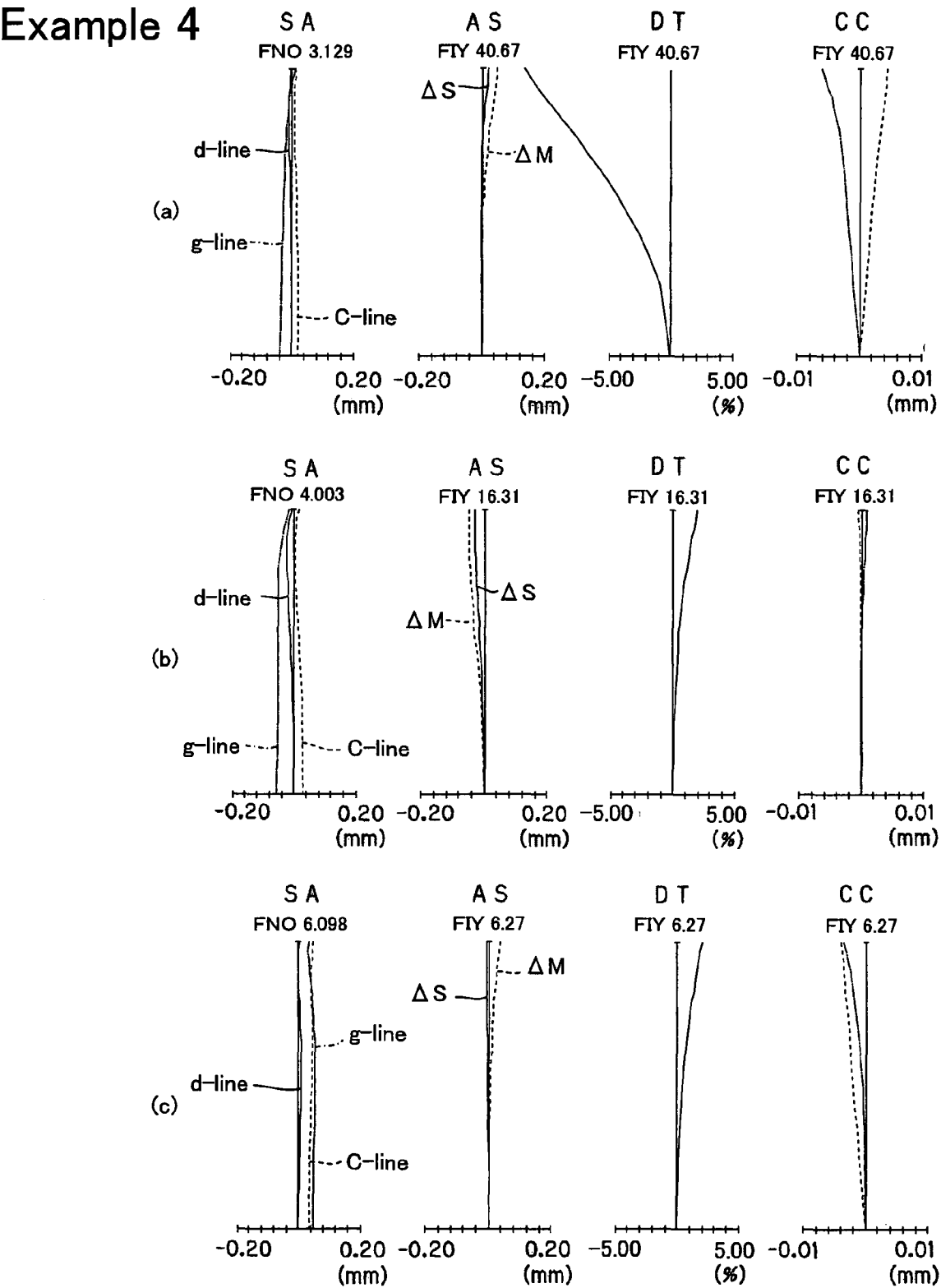
FIG. 9 is an aberration diagram for Example 4 upon focusing on an object point at infinity.
Figure 10:
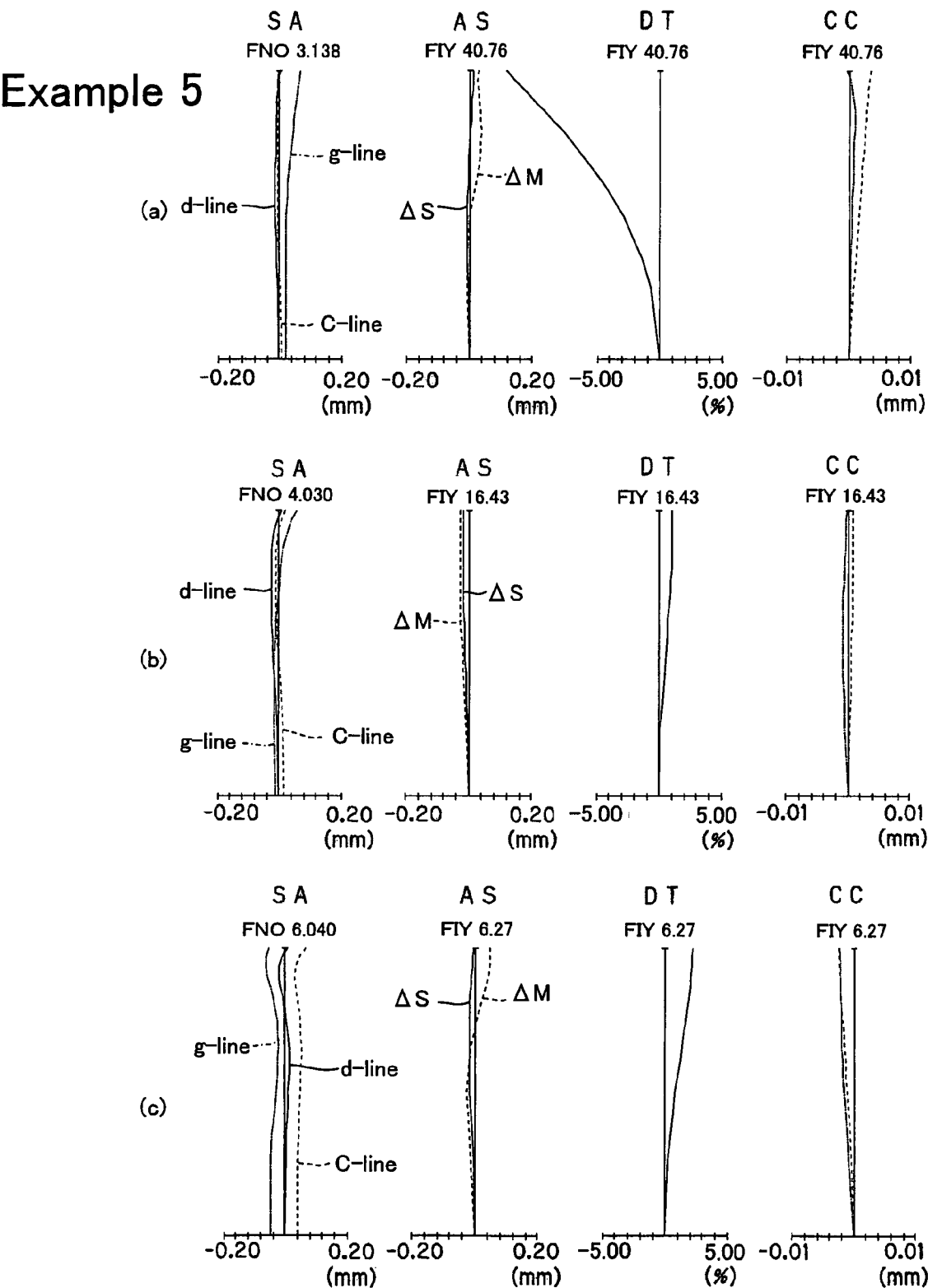
FIG. 10 is an aberration diagram for Example 5 upon focusing on an object point at infinity.
Figure 11:
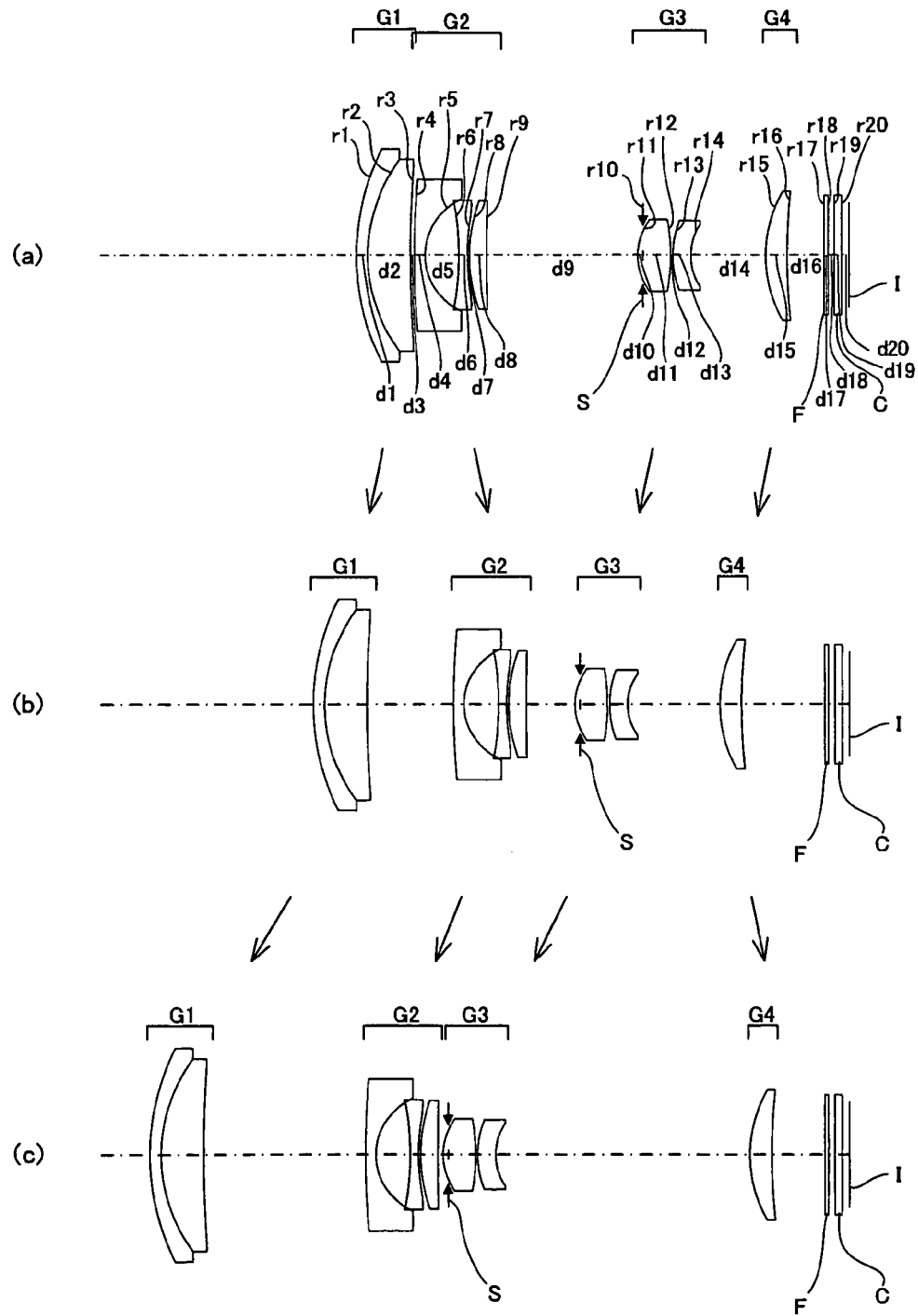
FIG. 11 is illustrative, as in FIG. 1, of Example 6 of the inventive zoom lens.
Figure 12:
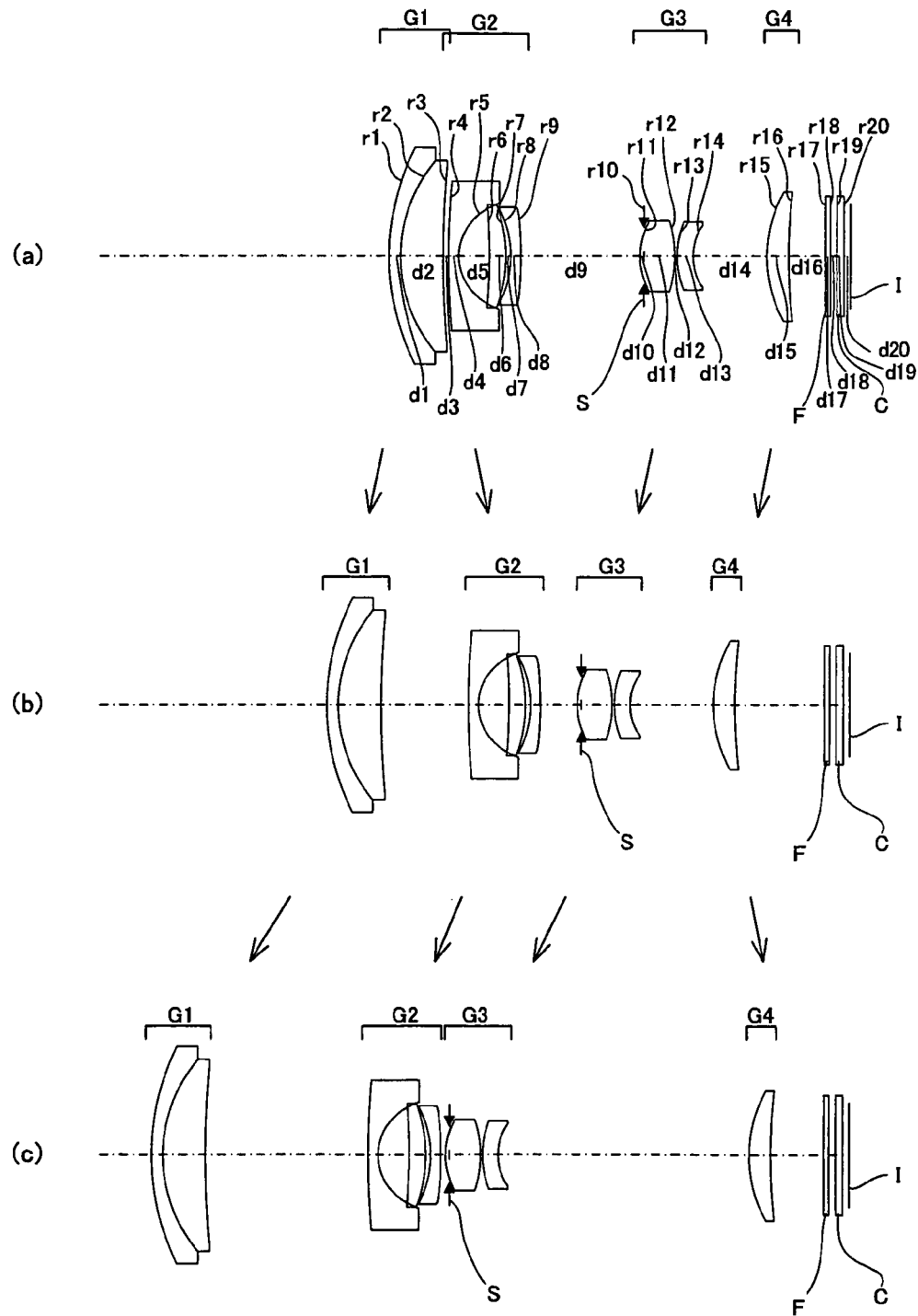
FIG. 12 is illustrative, as in FIG. 1, of Example 7 of the inventive zoom lens.
Figure 13:
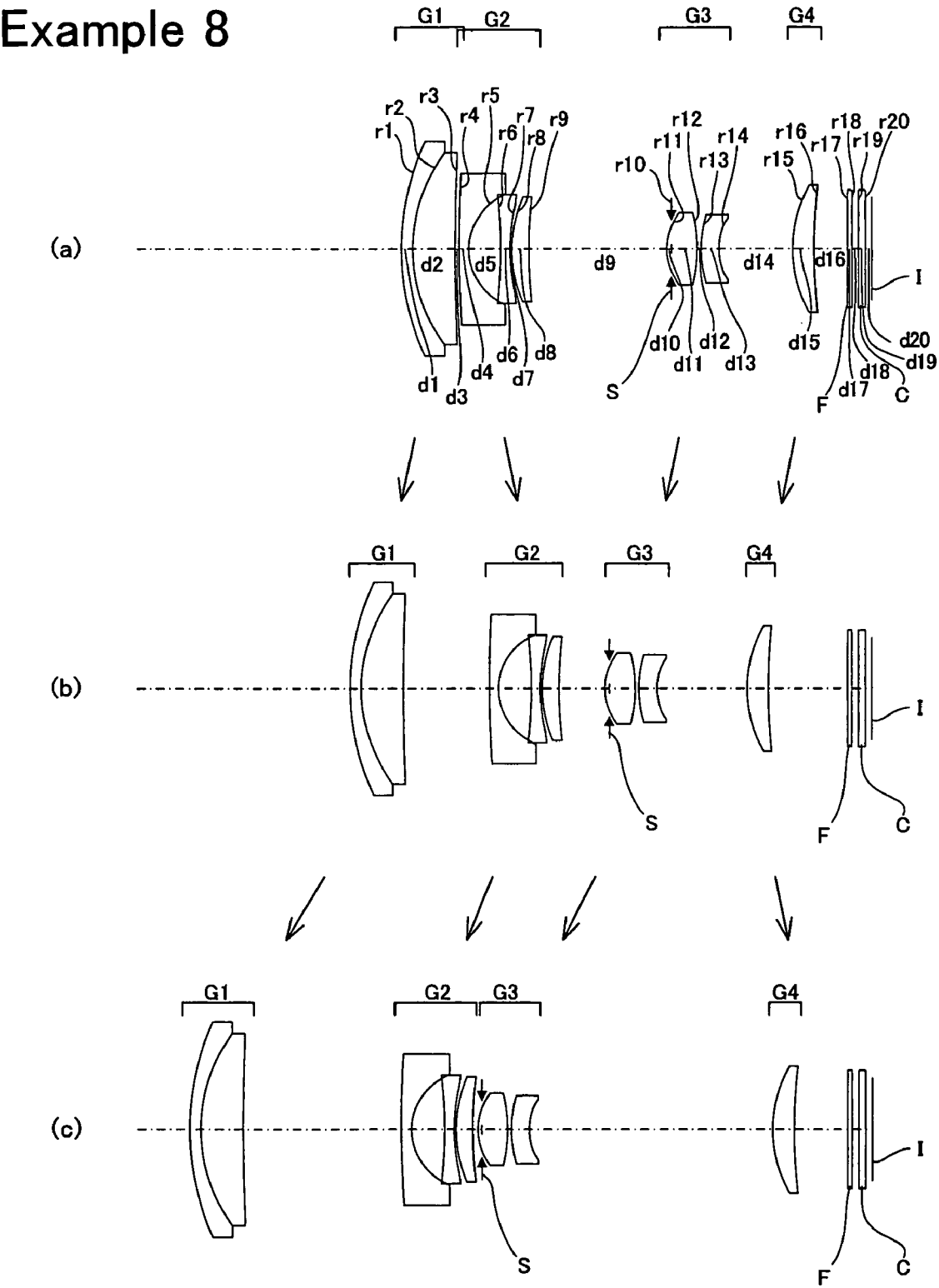
FIG. 13 is illustrative, as in FIG. 1, of Example 8 of the inventive zoom lens.
Figure 14:
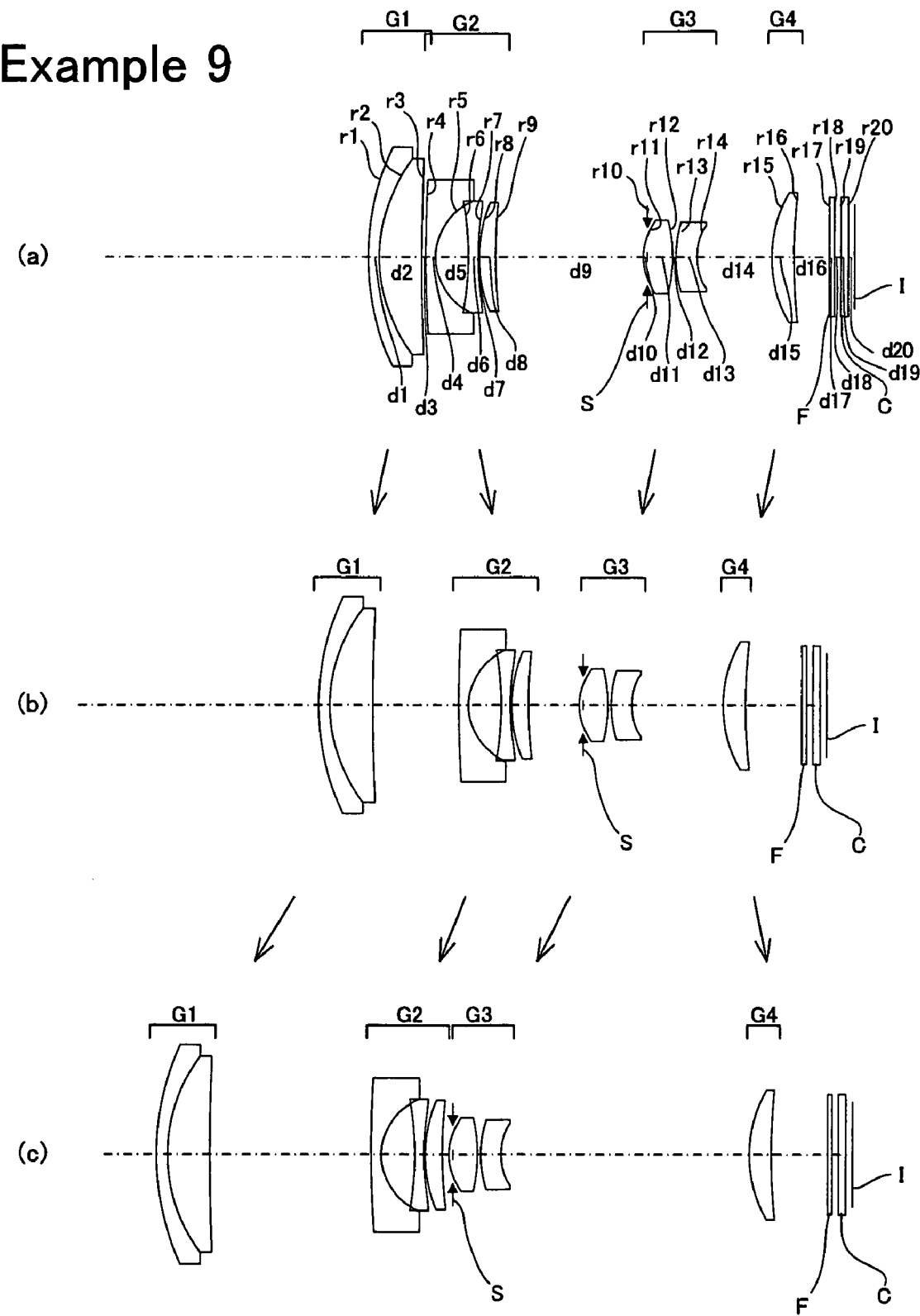
FIG. 14 is illustrative, as in FIG. 1, of Example 9 of the inventive zoom lens.
Figure 15:
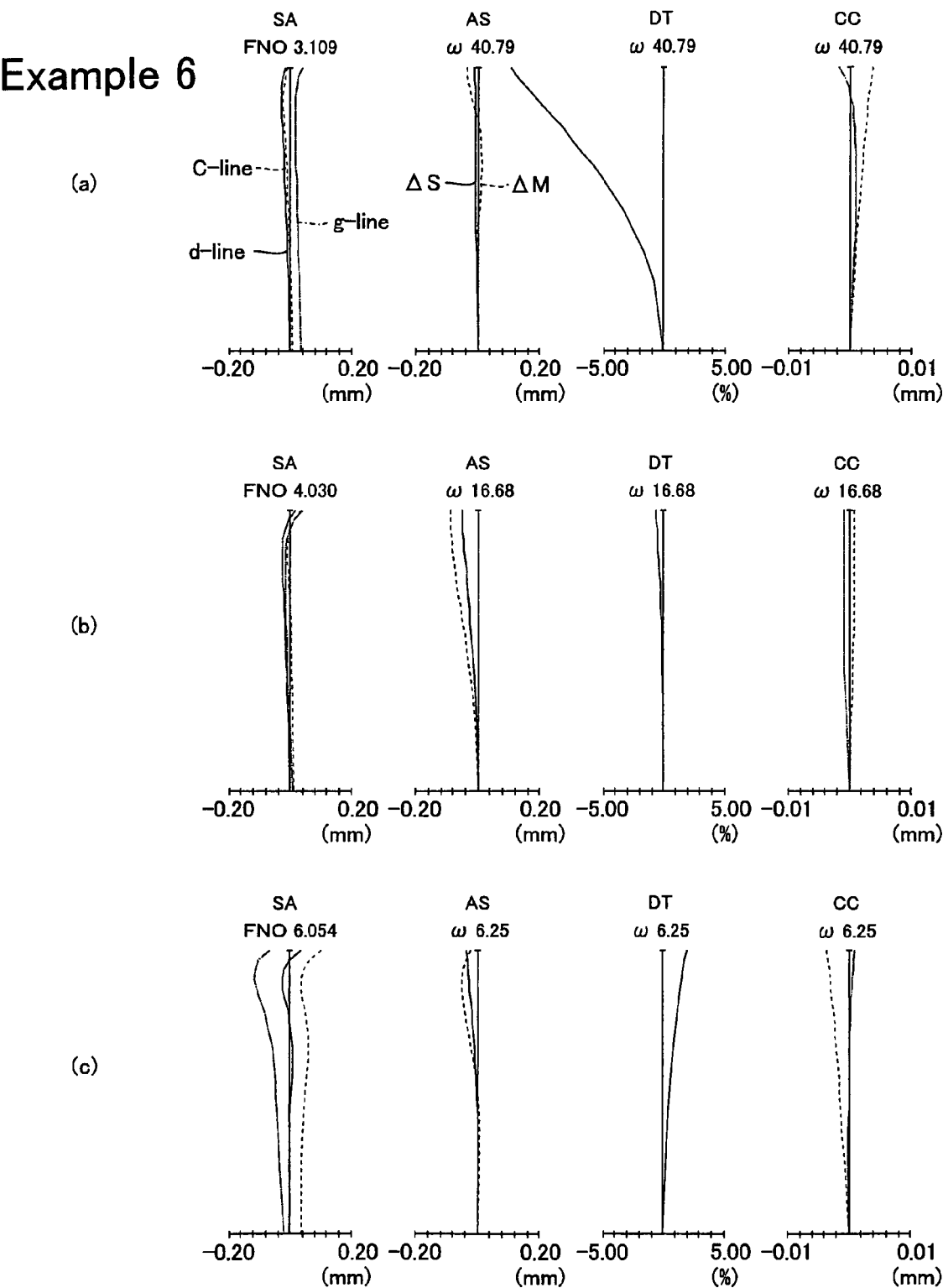
FIG. 15 is an aberration diagram for Example 6 upon focusing on an object point at infinity.

As shown in FIG. 9, the zoom lens of Example 9 is made up of, in order from its object side, the first lens group G1 of positive refracting power, the second lens group G2 of negative refracting power, the aperture stop S, the third lens group G3 of positive refracting power and the fourth lens group G4 of positive refracting power.

How the lens groups move upon zooming from the wide-angle end to the telephoto end is now explained.

From the wide-angle end to the telephoto end, the first lens group G1 moves toward the object side.

From the wide-angle end to the transient state, the second lens group G2 moves toward the image side while the space between the first lens group G1 and it grows wide and the space between it and the third lens group G3 becomes narrow, and from the transient state to the telephoto end, it moves toward the object side while the space between the first lens group G1 and it grows wide and the space between it and the third lens group G3 becomes narrow. At the telephoto end, it is positioned more on the object side than at the wide-angle end.

From the wide-angle end to the telephoto end, the aperture stop S and the third lens group G3 move toward the object side while the space between the second lens group G2 and them becomes narrow and the space between them and the fourth lens group G4 grows wide.

From the wide-angle end to the transient state, the fourth lens group G4 moves toward the object side while the space between the third lens group G3 and it grows wide and the space between it and the image plane I grows wide, and from the transient state to the telephoto end, it moves toward the image side while the space between the third lens group G3 and it grows wide and the space between it and the image plane I becomes narrow. At the telephoto end, it is positioned more on the object side than at the wide-angle end.

In order from the object side, the first lens group G1 is made up of a cemented lens in which a negative meniscus lens convex on its object side and a positive meniscus lens convex on its object side are cemented together; the second lens group G2 is made up of a negative meniscus lens convex on its object side, a double-concave negative lens and a positive meniscus lens convex on its object side; the third lens group G3 is made up of the aperture stop S, a double-convex positive lens and a negative meniscus lens convex on its object side; and the fourth lens group G4 is made up of one positive meniscus lens convex on its object side.

Five aspheric surfaces are used: one at the image-side surface of the double-concave negative lens in the second lens group G2, two at both surfaces of the double-convex positive lens in the third lens group G3, one at the image-side surface of the negative meniscus lens in the third lens group G3, and one at the image-side surface of the positive meniscus lens in the fourth lens group G4.

The zoom lens of Example 10 is much the same as in Example 5.

Set out below are the numerical lens data in Examples 6 to 9.

Numerical Example 6
Unit mm

Surface Data

| Surface No. | r | d | nd | vd |
|---|---|---|---|---|
| 1 | 17.791 | 0.81 | 1.84666 | 23.78 |
| 2 | 12.005 | 3.08 | 1.77250 | 49.60 |
| 3 | 86.709 | Variable | | |
| 4 | 66.506 | 0.75 | 1.88300 | 40.76 |
| 5 | 4.480 | 2.46 | | |
| 6 (Aspheric Surface) | −31.306 | 0.65 | 1.58313 | 59.38 |
| 7 (Aspheric Surface) | 13.781 | 0.10 | | |
| 8 | 12.506 | 1.29 | 1.92286 | 18.90 |
| 9 | 315.181 | Variable | | |
| 10 (Stop) | ∞ | −0.40 | | |
| 11 (Aspheric Surface) | 4.358 | 2.44 | 1.49700 | 81.61 |
| 12 (Aspheric Surface) | −12.005 | 0.10 | | |
| 13 | 7.191 | 1.31 | 2.10225 | 16.80 |
| 14 (Aspheric Surface) | 4.388 | Variable | | |
| 15 (Aspheric Surface) | 9.676 | 1.58 | 1.52542 | 55.78 |
| 16 | 45.813 | Variable | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.50 | | |
| Image Plane | ∞ | | | |

Aspheric Data

6th Surface $K = 0.000, A4 = -8.08347E-04, A6 = 3.75656E-05, A8 = -8.70154E-07, A10 = -2.10000E-08$ 7th Surface $K = 0.000, A4 = -1.28371E-03, A6 = 4.25827E-05, A8 = -2.31366E-06$ 11th Surface $K = -0.740, A4 = 3.67824E-04, A6 = -2.24188E-05, A8 = 1.19854E-06$ 12th Surface $K = -5.083, A4 = 1.16962E-03, A6 = -2.27613E-04, A8 = 1.88604E-05$ 14th Surface $K = -3.443, A4 = 5.43899E-03, A6 = 1.19187E-04$ 15th Surface $K = 0.361, A4 = -1.48739E-04, A6 = 3.33684E-06, A8 = -1.10231E-07, A10 = -3.35750E-10$

Zoom Data (Image Height set at a constant 3.83)

| | Wide-Angle | Transient | Telephoto |
|---|---|---|---|
| Focal Length | 5.07 | 12.87 | 34.28 |
| F-Number | 3.11 | 4.03 | 6.05 |
| Angle of View | 81.57 | 33.35 | 12.50 |
| d3 | 0.30 | 6.25 | 11.70 |
| d9 | 11.13 | 3.86 | 0.70 |
| d14 | 5.45 | 6.59 | 18.30 |

-continued

Numerical Example 6
Unit mm

| | | | |
|---|---|---|---|
| d16 | 2.65 | 5.99 | 3.78 |
| BF | 4.19 | 7.54 | 5.35 |
| Total Lens Length | 35.24 | 38.40 | 50.21 |

Zoom Lens Group Data

| Group | Start Surface | Focal Length |
|---|---|---|
| 1 | 1 | 29.89 |
| 2 | 4 | −6.08 |
| 3 | 11 | 8.95 |
| 4 | 15 | 23.00 |

Zoom Data (at the time of electrical correction of distortion)

| | Wide-Angle | Transient | Telephoto |
|---|---|---|---|
| Focal Length | 5.07 | 12.87 | 34.28 |
| F-Number | 3.11 | 4.03 | 6.05 |
| Angle of View | 75.77 | 33.35 | 12.50 |
| Image Height | 3.51 | 3.83 | 3.83 |

Numerical Example 7
Unit mm

Surface Data

| Surface No. | r | d | nd | vd |
|---|---|---|---|---|
| 1 | 18.084 | 0.81 | 1.84666 | 23.78 |
| 2 | 11.051 | 3.10 | 1.81600 | 46.62 |
| 3 | 75.670 | Variable | | |
| 4 | 57.210 | 0.75 | 1.81600 | 46.62 |
| 5 | 4.021 | 2.19 | | |
| 6 | −59.513 | 1.21 | 1.93067 | 19.09 |
| 7 | −10.809 | 0.37 | | |
| 8 | −7.550 | 0.70 | 1.58313 | 59.38 |
| 9 (Aspheric Surface) | −84.807 | Variable | | |
| 10 (Stop) | ∞ | −0.30 | | |
| 11 (Aspheric Surface) | 4.636 | 2.56 | 1.49700 | 81.61 |
| 12 (Aspheric Surface) | −8.016 | 0.10 | | |
| 13 | 6.444 | 1.18 | 2.10225 | 16.80 |
| 14 (Aspheric Surface) | 4.080 | Variable | | |
| 15 | 9.893 | 1.60 | 1.52542 | 55.78 |
| 16 (Aspheric Surface) | 52.976 | Variable | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.50 | | |
| Image Plane | ∞ | | | |

Aspheric Data

9th Surface $K = 516.240, A4 = -9.02519E-04, A6 = -2.11145E-05$

11th Surface $K = -3.042, A4 = 2.08503E-03, A6 = -1.44832E-04$

12th Surface $K = 1.146, A4 = 9.60208E-04, A6 = -9.14080E-05$

14th Surface $K = -0.544, A4 = 1.26081E-03, A6 = 1.76501E-04, A8 = 5.49600E-07$

16th Surface $K = 0.000, A4 = 6.63364E-05, A6 = -1.83062E-06$

Numerical Example 7
Unit mm

Zoom Data (Image Height set at a constant 3.83)

|  | Wide-Angle | Transient | Telephoto |
|---|---|---|---|
| Focal Length | 5.06 | 12.84 | 34.18 |
| F-Number | 3.08 | 4.02 | 6.04 |
| Angle of View | 81.97 | 33.35 | 12.57 |
| d3 | 0.30 | 6.18 | 11.70 |
| d9 | 8.93 | 2.97 | 0.60 |
| d14 | 5.30 | 5.92 | 18.08 |
| d16 | 2.60 | 6.44 | 3.80 |
| BF | 4.11 | 7.97 | 5.33 |
| Total Lens Length | 32.90 | 37.31 | 49.98 |

Zoom Lens Group Data

| Group | Start Surface | Focal Length |
|---|---|---|
| 1 | 1 | 29.12 |
| 2 | 4 | −5.36 |
| 3 | 11 | 8.11 |
| 4 | 15 | 22.86 |

Zoom Data (at the time of electrical correction of distortion)

|  | Wide-Angle | Transient | Telephoto |
|---|---|---|---|
| Focal Length | 5.06 | 12.84 | 34.18 |
| F-Number | 3.08 | 4.02 | 6.04 |
| Angle of View | 75.98 | 33.35 | 12.57 |
| Image Height | 3.50 | 3.83 | 3.83 |

Numerical Example 8
Unit mm

Surface Data

| Surface No. | r | d | nd | vd |
|---|---|---|---|---|
| 1 | 20.001 | 0.81 | 1.84666 | 23.78 |
| 2 | 12.364 | 3.07 | 1.81600 | 46.62 |
| 3 | 124.634 | Variable | | |
| 4 | 94.246 | 0.75 | 1.88300 | 40.76 |
| 5 | 4.500 | 2.36 | | |
| 6 | −34.701 | 0.70 | 1.52542 | 55.78 |
| 7 (Aspheric Surface) | 12.915 | 0.10 | | |
| 8 | 9.855 | 1.24 | 1.94595 | 17.98 |
| 9 | 31.445 | Variable | | |
| 10 (Stop) | ∞ | −0.30 | | |
| 11 (Aspheric Surface) | 4.101 | 2.21 | 1.49700 | 81.61 |
| 12 (Aspheric Surface) | −10.543 | 0.30 | | |
| 13 | 9.216 | 1.34 | 2.00170 | 19.30 |
| 14 (Aspheric Surface) | 4.773 | Variable | | |
| 15 | 9.600 | 1.59 | 1.52542 | 55.78 |
| 16 (Aspheric Surface) | 44.033 | Variable | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.50 | | |
| Image Plane | ∞ | | | |

Aspheric Data

7th Surface

K = 0.095, A4 = −4.32632E−04, A6 = −2.55053E−06, A8 = −1.11152E−06

11th Surface

K = −1.078, A4 = 1.00474E−03, A6 = −5.56504E−05

12th Surface

K = 0.000, A4 = 1.45394E−03, A6 = −2.47470E−04, A8 = 1.52715E−05

14th Surface

K = −1.142, A4 = 2.30205E−03, A6 = 3.35770E−04

16th Surface

K = 0.000, A4 = 1.16219E−04, A6 = −5.73103E−06, A8 = 1.27697E−07

Zoom Data (Image Height set at a constant 3.83)

|  | Wide-Angle | Transient | Telephoto |
|---|---|---|---|
| Focal Length | 5.08 | 12.86 | 34.21 |
| F-Number | 3.10 | 4.05 | 6.04 |
| Angle of View | 81.47 | 33.09 | 12.53 |
| d3 | 0.30 | 6.22 | 11.70 |
| d9 | 10.48 | 3.72 | 0.70 |
| d14 | 5.36 | 6.57 | 17.85 |
| d16 | 2.47 | 5.82 | 3.93 |
| BF | 4.00 | 7.35 | 5.46 |
| Total Lens Length | 34.30 | 38.02 | 49.87 |

Zoom Lens Group Data

| Group | Start Surface | Focal Length |
|---|---|---|
| 1 | 1 | 29.49 |
| 2 | 4 | −5.89 |
| 3 | 11 | 8.62 |
| 4 | 15 | 23.00 |

Zoom Data (at the time of electrical correction of distortion)

|  | Wide-Angle | Transient | Telephoto |
|---|---|---|---|
| Focal Length | 5.08 | 12.86 | 34.21 |
| F-Number | 3.10 | 4.05 | 6.04 |
| Angle of View | 75.69 | 33.09 | 12.53 |
| Image Height | 3.51 | 3.83 | 3.83 |

Numerical Example 9
Unit mm

Surface Data

| Surface No. | r | d | nd | vd |
|---|---|---|---|---|
| 1 | 19.436 | 0.81 | 1.84666 | 23.78 |
| 2 | 12.179 | 3.01 | 1.80400 | 46.57 |
| 3 | 120.343 | Variable | | |
| 4 | 91.118 | 0.75 | 1.88300 | 40.76 |
| 5 | 4.500 | 2.36 | | |
| 6 | −22.299 | 0.70 | 1.52542 | 55.78 |
| 7 (Aspheric Surface) | 16.643 | 0.10 | | |
| 8 | 11.204 | 1.24 | 1.94595 | 17.98 |
| 9 | 51.000 | Variable | | |
| 10 (Stop) | ∞ | −0.30 | | |
| 11 (Aspheric Surface) | 4.082 | 2.12 | 1.49700 | 81.61 |
| 12 (Aspheric Surface) | −9.935 | 0.30 | | |
| 13 | 11.164 | 1.43 | 1.92287 | 20.80 |
| 14 (Aspheric Surface) | 4.922 | Variable | | |
| 15 | 9.605 | 1.59 | 1.52542 | 55.78 |
| 16 (Aspheric Surface) | 44.252 | Variable | | |
| 17 | ∞ | 0.30 | 1.51633 | 64.14 |
| 18 | ∞ | 0.50 | | |

-continued

Numerical Example 9
Unit mm

| 19 | ∞ | 0.50 | 1.51633 | 64.14 |
|---|---|---|---|---|
| 20 | ∞ | 0.50 | | |
| Image Plane | ∞ | | | |

Aspheric Data

7th Surface

K = 2.468, A4 = −5.09398E−04, A6 = 1.08408E−07,
A8 = −1.20478E−06
11th Surface

K = −1.082, A4 = 1.03781E−03, A6 = −5.80705E−05
12th Surface

K = 0.000, A4 = 1.63732E−03, A6 = −2.60167E−04, A8 = 1.54732E−05
14th Surface

K = −1.174, A4 = 2.25831E−03, A6 = 3.49404E−04
16th Surface

K = 0.000, A4 = 1.14861E−04, A6 = −5.05049E−06, A8 = 1.15219E−07

Zoom Data (Image Height set at a constant 3.83)

| | Wide-Angle | Transient | Telephoto |
|---|---|---|---|
| Focal Length | 5.07 | 12.85 | 34.21 |
| F-Number | 3.12 | 4.06 | 6.04 |
| Angle of View | 81.60 | 33.14 | 12.53 |
| d3 | 0.30 | 6.21 | 11.68 |
| d9 | 10.92 | 3.86 | 0.70 |
| d14 | 5.36 | 6.60 | 17.86 |
| d16 | 2.57 | 5.90 | 4.05 |
| BF | 4.10 | 7.43 | 5.58 |
| Total Lens Length | 34.78 | 38.20 | 49.92 |

Zoom Lens Group Data

| Group | Start Surface | Focal Length |
|---|---|---|
| 1 | 1 | 29.40 |
| 2 | 4 | −6.00 |
| 3 | 11 | 8.83 |
| 4 | 15 | 22.99 |

Zoom Data (at the time of electrical correction of distortion)

| | Wide-Angle | Transient | Telephoto |
|---|---|---|---|
| Focal Length | 5.07 | 12.85 | 34.21 |
| F-Number | 3.12 | 4.06 | 6.04 |
| Angle of View | 75.87 | 33.14 | 12.53 |
| Image Height | 3.51 | 3.83 | 3.83 |

It should be noted that Numerical Example 10 is identical with Numerical Example 5.

The aberrational diagrams for Examples 6 to 9 upon focusing on an object point at infinity are presented in FIGS. 15 to 18 wherein (a), (b) and (c) are indicative of spherical aberrations SA, astigmatism AS, distortion DT and chromatic aberration of magnification CC at the wide-angle end, in the transient state and at the telephoto end, respectively. FNO and ω are indicative of an F-number and a half angle of view, respectively. The aberrational diagram for Example 10 is the same as that for Example 5.

Tabulated below are the values of Conditions (1B) to (7B) as well as the values of $y_{07}$, fw and $\omega_{07w}$ in the above examples.

| Condition | Example 6 | Example 7 | Example 8 | Example 9 | Example 10 |
|---|---|---|---|---|---|
| (1B) | −1.516 | −1.628 | −1.382 | −1.385 | −1.533 |
| (2B) | 1.144 | 1.151 | 1.1 | 1.104 | 1.188 |
| (3B) | −0.183 | −0.183 | −0.182 | −0.183 | −0.185 |
| (4B) | 4.131 | 4.453 | 3.149 | 2.577 | 4.235 |
| (5B) | 16.8 | 16.8 | 19.3 | 20.8 | 16.8 |
| (6B) | 64.81 | 64.81 | 62.31 | 60.81 | 64.81 |
| (7B) | 6.757 | 6.76 | 6.732 | 6.753 | 6.730 |
| (8B) | 0.983 | 0.930 | 0.929 | 0.927 | 0.935 |
| $y_{07}$ | 2.43 | 2.55 | 2.55 | 2.55 | 2.68 |
| fw | 5.07 | 5.06 | 5.08 | 5.07 | 5.06 |
| $\omega_{07w}$ | 28.24 | 29.67 | 29.57 | 29.69 | 29.5 |

Further, each example may as well be constructed as follows.

To cut off inessential light such as ghosts and flares, a flare stop may be provided in addition to the aperture stop S. That flare stop may then be located somewhere on the object side of the first lens group G1, between the first lens group G1 and the second lens group G2, between the second lens group G2 and the third lens group G3, between the third lens group G3 and the fourth lens group G4, and between the fourth lens group G4 and the image plane I. A frame member or other member may also be located to cut off flare rays. For that purpose, the lenses may be directly printed, coated or sealed on their surfaces in any desired shape inclusive of round, oval, rectangular, polygonal shapes or a shape delimited by a function curve. Further, just only a harmful light beam but also coma flares around the screen may be cut off.

Each lens may be applied with an antireflection coating to reduce ghosts and flares. A multi-coating is then desired because of being capable of effectively reducing ghosts and flares. Each lens, a cover glass or the like may just as well be applied with an infrared cut coating.

Desirously, focusing for adjusting the focus is implemented with the fourth lens group G4. Focusing with the fourth lens group G4 eases off loads on a drive system such as a motor because there is a light lens weight, and works for making the lens barrel compact because there is none of the change in the total length during zooming, and a drive motor is mounted in the lens barrel. As noted just above, it is desired that focusing for adjusting the focus is implemented with the fourth lens group G4; however, it may be implemented with the second lens group G2 or the third lens group G3, or by the movement of multiple lens groups. Moreover, focusing may be implemented by letting out the whole lens system or letting out or in some lenses in the lens groups.

The shading of brightness at the peripheral portion of an image may be reduced by shifting the microlenses of a CCD. For instance, the CCD microlens design may be modified in conformity with the angle of incidence of light rays at each image height, or decreases in the quantity of light at the peripheral portion of the image may be corrected by image processing.

It is also acceptable to intentionally produce distortion at the optical system so as to correct image distortion by implementing electrical processing after taking operation.

In the zoom lens of each example, there is barrel type distortion occurring on a rectangular photoelectric transformation plane at the wide-angle end. On the other hand, the occurrence of distortion is held back in a near-transient focal length state or at the telephoto end. When distortion is electrically corrected, an effective imaging area is varied such that there is a barrel shape at the wide-angle end, a rectangular shape in the near-transient focal length state or at the telephoto end, and so on. And an image at the predetermined imaging area is converted by imaging processing into rectangular image information with much less distortion. An image height $I_{mw}$ at the wide-angle end is then made lower than an image height $I_{ms}$ in the transient focal length state or an image height $I_{mt}$ at the telephoto end.

Figure 19:
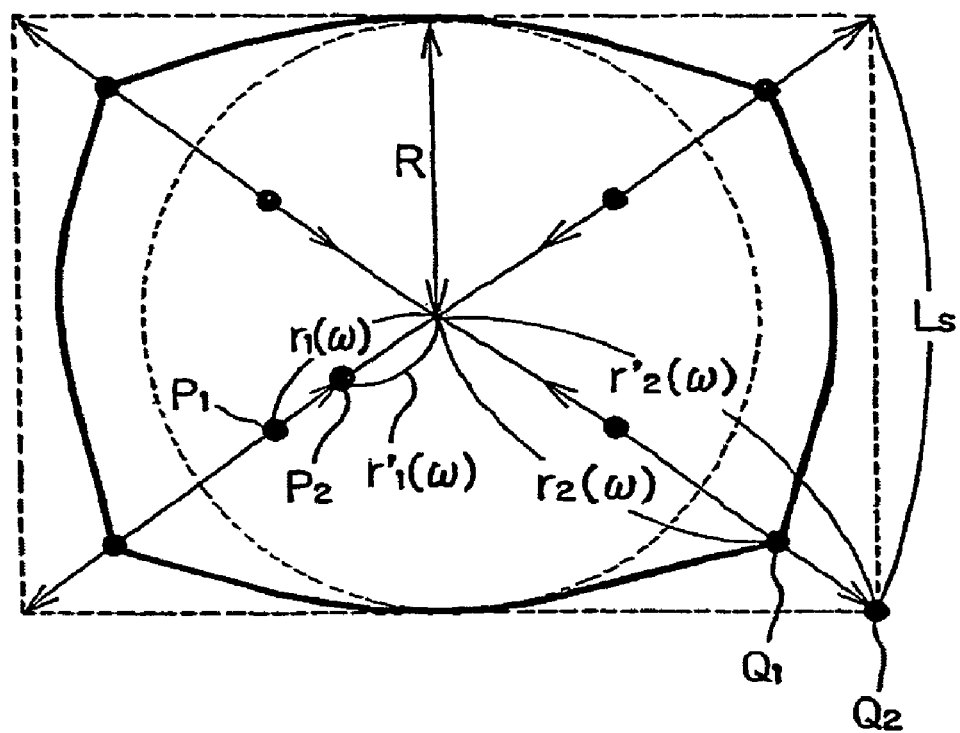
FIG. 19 is illustrative of correction of distortion.

As shown typically in FIG. 19, there is a magnification fixed on the circumference (image height) of a circle of radius R inscribed in the long side of an effective imaging plane with the point of intersection of an optical axis with the imaging plane as a center, and that circumference is used as the reference for correction. And then, points on the circumference of other arbitrary circle of radius r(ω) are moved in substantially radial directions; they are concentrically moved to a radius r (ω) for correction. In FIG. 19 as an example, a point $P_1$ on the circumference of an arbitrary circle of radius $r_1$ (ω) positioned inside the circle of radius R is moved to a point $P_2$ on the circumference of an arbitrary circle of radius $r_2$ to be corrected in a direction toward the center of the circle. On the other hand, a point $Q_1$ on the circumference of an arbitrary circle of radius $r_2$(ω) positioned outside the circle of radius R is moved to a point $Q_2$ on the circumference of a circle of radius $r_2$ (ω) to be corrected in a direction away from the center of the circle. Here, r (ω) may be represented by $$r(\omega) = \alpha f \tan \omega (0 \leq \alpha \leq 1)$$

where ω is a subject half angle of view, and f is the focal length of an imaging optical system (the zoom lens in the invention).

Here let Y be an ideal image height corresponding to on the aforesaid circle (image height) of radius R. Then, $$\alpha = R/Y = R/f \tan \omega$$

The optical system here is ideally rotationally symmetric about the optical axis; distortion occurs rotationally symmetrically about the optical axis, too. Therefore, when optically produced distortion is electrically corrected as described above, it would be favorable in view of the quantities of data and computation to implement correction by fixing, on a reproduced image, a magnification on the circumference (image height) of the circle of radius R inscribed in the long side of an effective imaging plane with the point of intersection of an optical axis with the imaging plane as a center, and moving points on the circumference (image height) of other arbitrary circle of radius r(ω) in substantially radial directions to move them concentrically to radius r(ω).

However, an optical image stops being a continuous quantity (for sampling) at the time of being imaged at an electronic imaging device. Strictly speaking, therefore, the aforesaid circle of radius R drawn on the optical image, too, stops being an accurate circle unless pixels on the electronic imaging device are lined up in a radial way. It follows that when it comes to the shape correction of image data represented per discrete coordinate point, there is none of the circle capable of fixing the aforesaid magnification. It is therefore preferable to make use of a method that determines coordinates $(X_i, Y_j)$ for where the points are to be moved to per each pixel $(X_i, Y_j)$. Note that when two or more points $(X_i, Y_j)$ are moved to the coordinates $(X_i, Y_j)$, there is the average of the values of the respective pixels taken, and when there are no incoming points, interpolation may be implemented using the values of the coordinates $(X_i, Y_j)$ for some neighboring pixels.

Such a method is effective for especially when the aforesaid circle of radius R written on the aforesaid optical image becomes badly distorted and asymmetric with respect to the optical axis for the reason of fabrication errors of the optical system and electronic imaging device of an electronic imaging system the zoom lens has. That method is also effective for correction of geometric distortion or the like occurring at the time of reproduction of signals as an image at the imaging device or various output devices.

With the electronic imaging apparatus of the invention, r(ω), i.e., the relation between the half angle of view and the image height or the relation between the real image height r and the ideal image height r/α may have been recorded in a recording medium built in it for the purpose of figuring out r(ω)-r(ω).

It is here noted that to prevent the image after the correction of distortion from running extremely short of light quantity at both ends in the short side direction, it is preferable for the aforesaid radius R to satisfy the following condition:

$$0 \leq R \leq 0.6 L_s$$

where $L_s$ is the length of the short side of the effective imaging plane.

For the aforesaid radius R it is more preferable to satisfy the following condition.

$$0.3 L_s \leq R \leq 0.6 L_s$$

Most preferably, the aforesaid radius R should be much the same as that of a circle inscribed in the effective imaging plane in the short side direction. Note here that the correction with the magnification fixed at or near the radius R=0, viz., on or near the optical axis is somewhat disadvantageous in terms of the substantial number of images; even in a wide-angle arrangement, however, there is the advantage of compactness still ensured.

It is noted that the focal length interval for which correction is in need is divided into several focal zones. And then, correction may be implemented in the same quantity as there is the result of correction obtained which satisfies substantially r(ω)=αf tan ω at or near the telephoto end within the divided focal zones. In that case, however, there is some barrel distortion remaining at the wide-angle end within the divided focal zones. Too many divided zones are not that preferable because of the need of storing too much intrinsic data necessary for correction in the recording medium. Therefore, one or a few coefficients in association with the focal lengths in the divided focal zones have been figured out in advance. Such coefficients may have been determined on the basis of simulations or measurements using measuring devices. And then, there is the quantity of correction worked out corresponding to the result of correction that satisfies substantially r(ω)=αf tan ω at or near the telephoto end within the divided focal zones, and that amount of correction may be evenly multiplied by the aforesaid coefficients per focal length to obtain the final quantity of correction.

By the way, when there is no distortion in the image obtained by imaging an infinite object, there is $$f = y/\tan \omega$$

Here y is the height (image height) of an image point from the optical axis, f is the focal length of an imaging system (the zoom lens in the invention), and ω is the angle (subject half angle of view) with the optical axis of an object point direction corresponding to an image point formed from the center on the imaging plane to the position of y.

When there is barrel distortion in the imaging system, there is $$f > y/\tan \omega$$

It follows that with both the focal length f of the imaging system and the image height y kept constant, the value of ω grows large.

It is preferable to have an image transformation portion where electrical signals of an image taken through the zoom lens are transformed into image signals where color shifts due to chromatic aberration of magnification are corrected by image processing. Thus, if the chromatic aberration of magnification of the zoom lens is electrically corrected, it is then possible to obtain better images.

Generally, an electronic still camera is designed such that a subject s image is separated into an image composed of the three primaries: the first primary, the second primary and the third primary, and their respective output signals are superposed by computation one upon another, thereby reproducing a color image. When there is chromatic aberration of magnification in a zoom lens, a position where the second primary light and the third primary light are imaged would be off a position where the first primary light is imaged on the basis of that image formed by the first primary light. To electrically correct the image for chromatic aberration of magnification, the quantity of a shift of the imaging position of the second and third primary light with respect to the first primary light is pre-figured out for each pixel of the imaging device on the basis of information on the aberrations of the zoom lens. Coordinate transformation may then be implemented for each pixel of the taken image such that only the quantity of shift from the first primary is corrected.

Referring typically to an image composed of output signals of the three primaries: red (R), green (G) and blue (B), shifts of the imaging positions of R and B with respect to the first primary are first found for each pixel. Then, coordinate transformation for the taken image is implemented such that there is no shift from G. Finally, the signals of R and B are produced out.

Although there is a change in the chromatic aberration of magnification depending zooming, focusing and a stop value, yet it is preferable that for each lens position (zooming, focusing, stop value), the quantities of shifts of the second and third primaries from the first primary are stored as correction data in a storage device. By referring to the correction data depending on the zoom position, it is then possible to produce out the second and third primary signals where the shifts of the second and third primaries with respect to the first primary signals are corrected.

Figure 20:
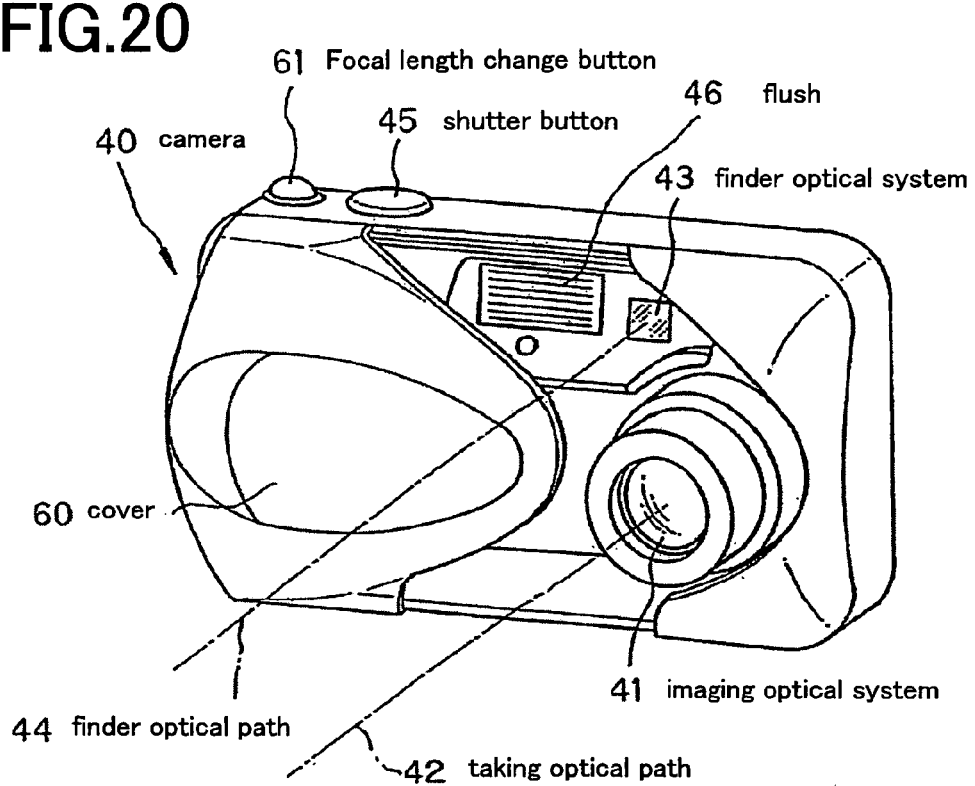
FIG. 20 is a front perspective view of the outside shape of a digital camera according to the invention.
Figure 21:
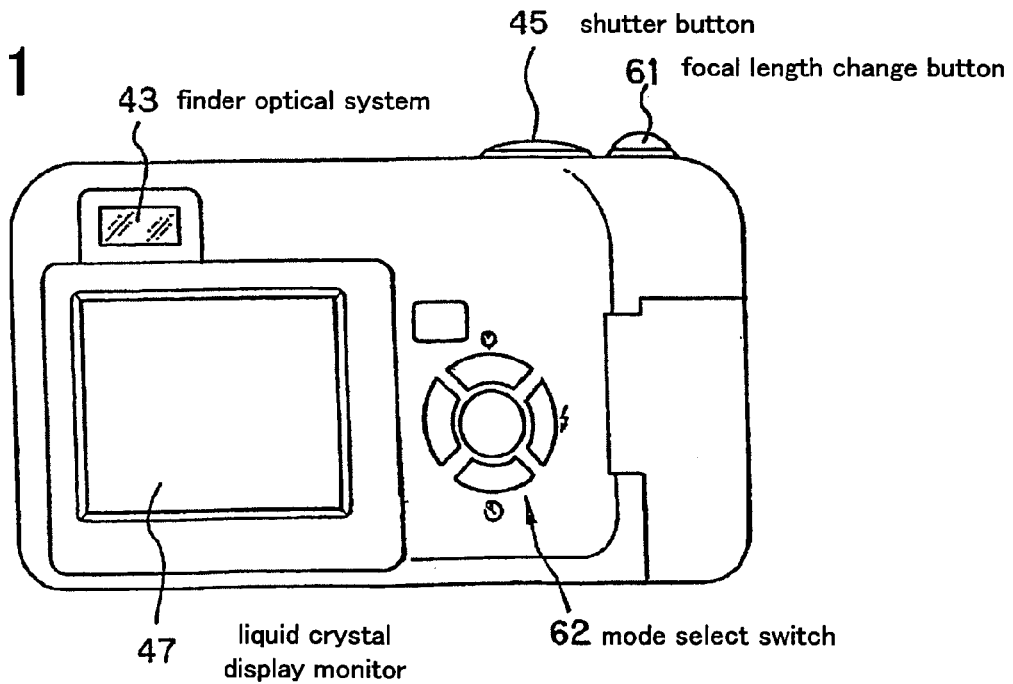
FIG. 21 is a rear perspective view of the digital camera of FIG. 20.
Figure 22:
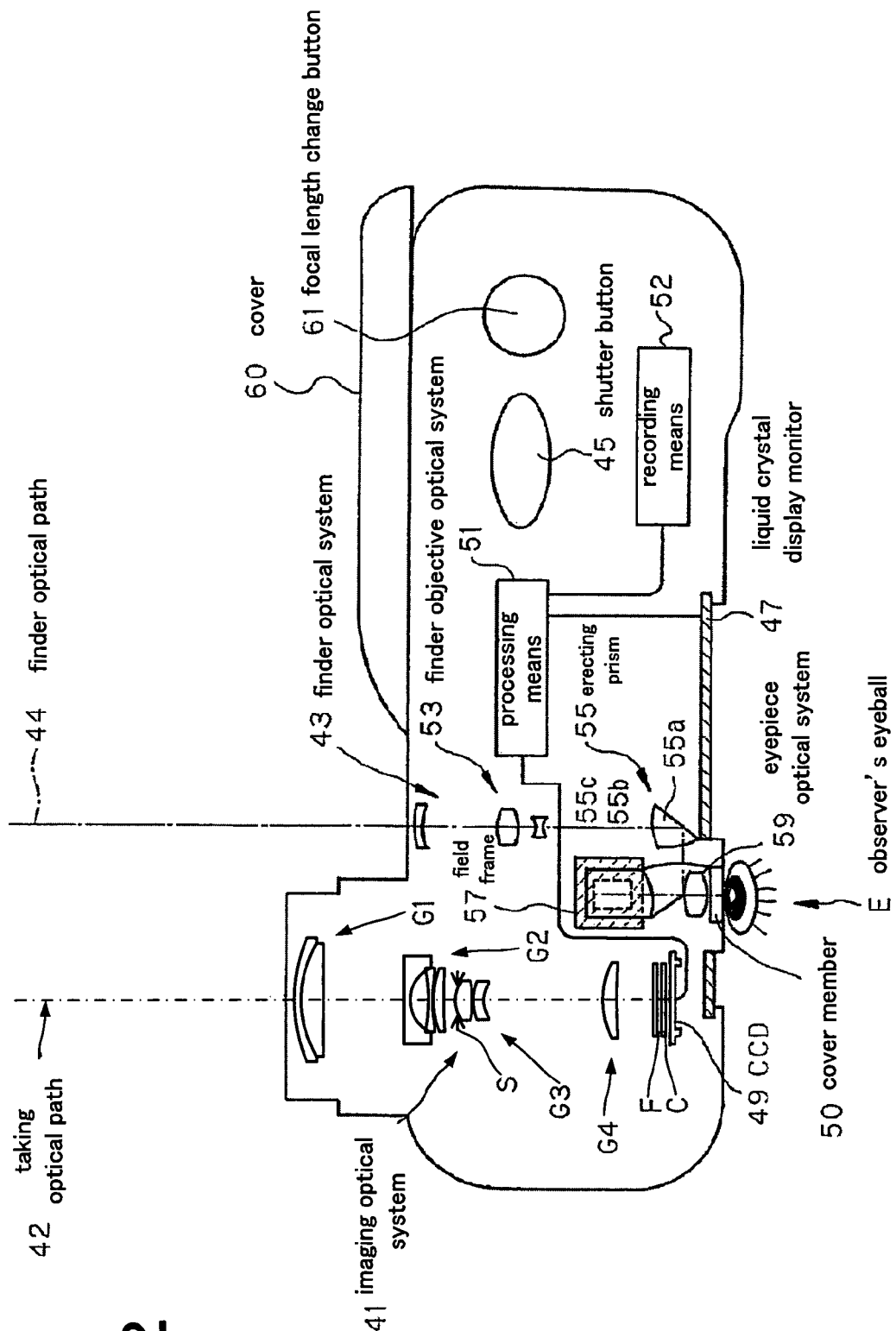
FIG. 22 is a sectional view of the digital camera of FIG. 20.

FIGS. 20, 21 and 22 are conceptual illustrations of a digital camera of the invention in which each such zoom lens as described is incorporated in a taking optical system 41. FIG. 20 is a front perspective view of the appearance of a digital camera 40; FIG. 21 is a rear perspective view of the same; and FIG. 22 is a schematic sectional view of the setup of the digital camera 40. However, FIGS. 20 and 22 show the taking optical system 41 in operation. In this embodiment, the digital camera 40 comprises the taking optical system 41 positioned on a taking optical path 42, a finder optical system 43 positioned on a finder optical path 44, a shutter button 45, a flash 46, a liquid crystal display monitor 47, a focal length change button 61, a mode select switch 62, and so on. With the taking optical system 41 received in a lens mount, a cover 60 is slid over the taking optical system 41, finder optical system 43 and flash 46. And, as the cover 60 is slid open to place the camera 40 in operation, the taking optical system 41 is let out, as depicted in FIG. 22. As the shutter button 45 mounted on the upper portion of the camera 40 is pressed down, it causes an image to be taken through the taking optical system 41, for instance, the zoom lens of Example 1. An object image formed by the taking optical system 41 is formed on the imaging plane (photoelectric transformation plane) of CCD 49 via a low-pass filter F with a wavelength limiting coating applied on it and a cover glass C. An object image received at CCD 49 is shown as an electronic image on the liquid crystal display monitor 47 via processing means 51, which monitor is mounted on the back of the camera. This processing means 51 is connected with recording means 52 in which the taken electronic image may be recorded. It is here noted that the recording means 52 may be separate from the processing means 51 or, alternatively, it may be constructed in such a way that images are electronically recorded and written therein by means of floppy discs, memory cards, MOs or the like. This camera could also be constructed in the form of a silver-halide camera using a silver-halide film in place of CCD 49.

Moreover, a finder objective optical system 53 is located on the finder optical path 44. The finder objective optical system 53 comprises a zoom optical system which is made up of a plurality of lens groups (three in FIGS. 20-22) and an erecting prism system 55 composed of erecting prisms 55a, 55b and 55c, and whose focal length varies in association with the zoom lens that is the taking optical system 41. An object image formed by the finder objective optical system 53 is in turn formed on the field frame 57 of the erecting prism system 55 that is an image-erecting member. In the rear of the erecting prism system 55 there is an eyepiece optical system 59 located for guiding an erected image into the eyeball E of an observer. It is here noted that a cover member 50 is provided on the exit side of the eyepiece optical system 59.

Figure 23:
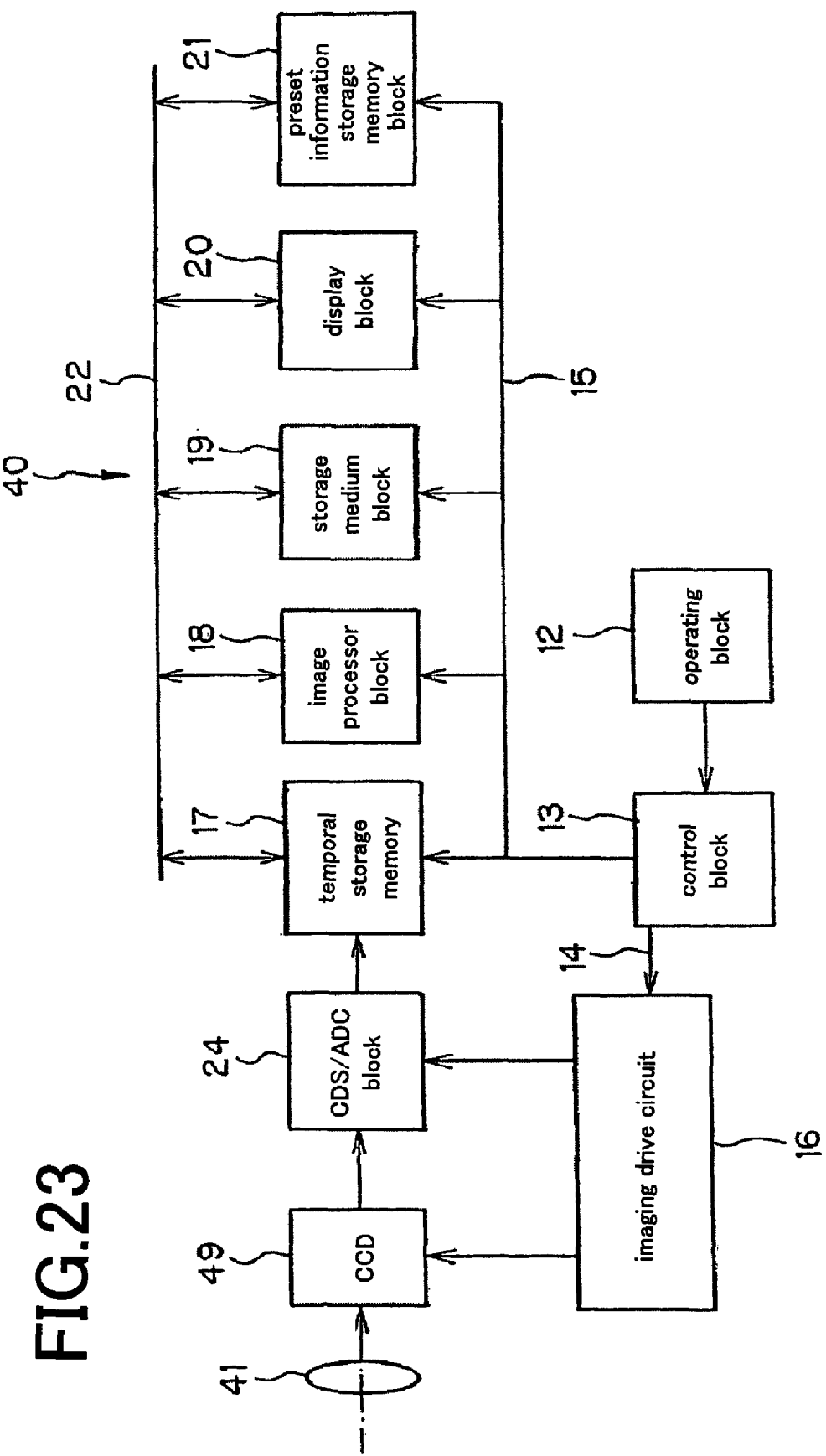
FIG. 23 is a block diagram of an internal circuit in the main part of the digital camera of FIG. 20.

FIG. 23 is a block diagram for the internal circuits of the main part of the aforesaid digital camera 40. In the following explanation, the aforesaid processing means 51 comprises, for instance, a CDS/ADC block 24, a temporal storage memory block 17, an image processor block 18 and so on, and the storage means 52 comprises, for instance, a storage medium block 19 and so on.

As shown in FIG. 23, the digital camera 40 is built up of an operating block 12, a control block 13 connected to the operating block 12 and an imaging drive circuit 16 connected to the control signal output port of the control block 13 via buses 14 and 15 as well as the temporal storage memory 17, image processor block 18, storage medium block 19, a display block 20 and a preset information storage memory block 21.

Data may be entered in or produced out of the aforesaid temporal storage memory block 17, image processor block 18, storage medium block 19, display block 20 and preset information storage memory block 21 via a bus 21, and the imaging drive circuit 16 is connected with CCD 49 and CDS/ADC block 24.

The operating block 12 comprising various input buttons and switches is a circuit through which event information entered from outside (a camera operator) via such input buttons and switches is notified to the control block. The control block 13 is a central processor comprising a CPU as an example: it is a circuit that, according to a program loaded in a program memory (not shown) stored therein, puts the whole digital camera 40 under control in response to the instruction and order entered by the camera operator via the operating block 12.

The CCD 49 receives an object image formed through the inventive taking optical system 41. The CCD 49 is an imaging device that is driven and controlled by the imaging drive circuit 16 to convert the quantity of light of that object image for each pixel into an electric signal and produce it to the CDS/ADC block 24.

The CDS/ADC block 24 is a circuit that amplifies an electric signal entered from CCD 49 and subjects it to analog/digital conversion to produce image raw data (Bayer data:

hereinafter called RAW data) only subjected to such amplification and digital conversion to the temporal storage memory 17.

The temporal storage memory 17 is a buffer comprising SDRAM for instance: it is a memory device that temporarily stores the aforesaid RAW data produced out of the CDS/ADC block 24. The image processor block 18 is a circuit that reads the RAW data stored in the temporal storage memory 17 or the RAW data stored in the storage medium 19 to implement a variety of image processing including distortion correction on the basis of an image quality parameter designated from the control block 13.

The recording medium block 19 is a control circuit that detachably receives a card type or stick type recording medium comprising, for instance, a flash memory or the like so that the RAW data transferred from the temporal storage memory 17 or the image data subjected to image processing at the image processor block 18 are recorded and loaded in the card type or stick type flash memory.

The display block 20 is a circuit that comprises a liquid crystal display monitor 47 to display images, menus or the like on that liquid crystal display monitor 47. The preset information storage memory block 21 comprises a ROM block having various image quality parameters previously loaded in it and a RAM block in which an image quality parameter selected by input operation at the operating block 12 from the image quality parameters read out of that ROM block is stored. The preset information storage memory block 21 is a circuit that puts inputs in and outputs from those memories under control.

With the thus constructed digital camera 40, it is possible to achieve high performance, size reductions and a wide-angle arrangement, because the taking optical system 41 incorporated in it has high zoom capabilities and extremely stable image-formation capabilities all over the zoom zones, albeit having a sufficient wide-angle arrangement and compact construction. And faster focusing operation is achievable on the wide-angle and telephoto sides.

The present invention may be applied to just only the so-called compact digital camera adapted to take images of general subjects but also surveillance cameras required to have wide angles of view and lens interchangeable type cameras.

What is claimed is:

1. A zoom lens, comprising, in order from an object side toward an image side thereof,
   a first lens group having positive refracting power,
   a second lens group having negative refracting power,
   a third lens group having positive refracting power, and
   a fourth lens group having positive refracting power, wherein:
   said zoom lens further comprises an aperture stop located on an image side with respect to said second lens group and on an object side with respect to a lens surface located in said third lens group and nearest to the image side;
   upon zooming from a wide-angle end to a telephoto end,
   a space between said first lens group and said second lens group grows wide,
   a space between said second lens group and said third lens group becomes narrow, and
   a space between said third lens group and said fourth lens group changes;
   said first lens group comprises a positive lens and a negative lens;
   a total number of lenses in said first lens group is 2;
   said second lens group consists of, in order from the object side, a front unit of negative refracting power and a rear unit of positive refracting power;
   said third lens group consists of, in order from the object side, a front unit of positive refracting power and a rear unit of negative refracting power;
   said fourth lens group comprises a positive lens component;
   a total number of lens components in said fourth lens group is 1;
   said front unit of said second lens group comprises a negative lens component;
   a total number of lens components in the front unit of said second lens group is 1;
   said rear unit of said second lens group comprises, in order from the object side toward the image side, a negative lens and a positive lens;
   a total number of lenses in the rear unit of said second lens group is 2; and
   said negative lens component in the front unit of said second lens group and said negative lens in the rear unit of said second lens group satisfy the following condition (1A):

$$2.9 < f_{2GN2}/f_{2GN1} < 30 \quad (1A)$$

where $f_{2GN1}$ is a focal length of said negative lens component in the front unit of said second lens group, and
   $f_{2GN2}$ is a focal length of said negative lens in the rear unit of said second lens group.

2. The zoom lens according to claim 1, wherein said first lens group and said second lens group satisfy the following conditions (2A) and (3A) at the wide-angle end:

$$-1.8 < fnw/fw < -0.5 \quad (2A)$$

$$5 < fp/fw < 500 \quad (3A)$$

where fnw is a focal length of a combined system of said first lens group and the front unit of said second lens group at the wide-angle end,
   fp is a focal length of the rear unit of said second lens group, and
   fw is a focal length of the whole zoom lens system at the wide-angle end.

3. The zoom lens according to claim 1, wherein said negative lens in the rear unit of said second lens group satisfies the following condition (4A):

$$2.38 < f_{2GN2}/f_{2G} < 30 \quad (4A)$$

where $f_{2G}$ is a focal length of said second lens group.

4. The zoom lens according to claim 1, wherein the negative lens component in the front unit of said second lens group satisfies the following condition (5A):

$$-1.23 < f_{2GN1}/fw < -0.1 \quad (5A)$$

where fw is a focal length of the whole zoom lens system at the wide-angle end.

5. The zoom lens according to claim 1, wherein said positive lens in the rear unit of said second lens group satisfies the following condition (6A):

$$-5 < f_{2GP}/f_{2G} < -0.2 \quad (6A)$$

where $f_{2GP}$ is a focal length of said positive lens in the rear unit of the second lens group, and
   $f_{2G}$ is a focal length of said second lens group.

6. The zoom lens according to claim 1, wherein:
said first lens group comprises, in order from the object side, said negative lens and said positive lens;
said negative lens in said first lens group has an image-side surface having an absolute value of paraxial curvature larger than an absolute value of paraxial curvature of an object-side surface; and
said positive lens in said first lens group has an object-side surface having an absolute value of paraxial curvature larger than an absolute value of paraxial curvature of an image-side surface.

7. The zoom lens according to claim 1, wherein:
said negative lens component in the front unit of said second lens group is in a meniscus form convex on its object side; and
said negative lens in the rear unit of said second lens group is in a double-concave form and has an aspheric surface.

8. The zoom lens according to claim 1, wherein said negative lens component in the front unit of said second lens group is a single lens.

9. The zoom lens according to claim 1, wherein said negative lens component in the front unit of said second lens group satisfies the following condition (7A):

$$0.8<(R_{2GN1f}R_{2GN1r})/(R_{2GN1f}-R_{2GN1r})<1.5 \quad (7A)$$

where $R_{2GN1f}$ is a paraxial radius of curvature of an object-side surface of said negative lens component in the front unit of said second lens group, and
$R_{2GN1r}$ is a paraxial radius of curvature of an image-side surface of said negative lens component in the front unit of said second lens group.

10. The zoom lens according to claim 1, wherein said negative lens in the rear unit of said second lens group is a double-concave negative lens that satisfies the following condition (12A):

$$-0.8<(R_{2GN2f}+R_{2GN2r})/(R_{2GN2f}-R_{2GN2r})<0.9 \quad (12A)$$

where $R_{2GN2f}$ is a paraxial radius of curvature of the object-side surface of said negative lens in the rear unit of said second lens group, and
$R_{2GN2r}$ is a paraxial radius of curvature of the image-side surface of said negative lens in the rear unit of said second lens group.

11. The zoom lens according to claim 1, wherein:
said negative lens and said positive lens in the rear unit of said second lens group are each a single lens;
the image-side surface of said negative lens is a concave surface; and
the object-side surface of said positive lens is a convex surface that has a paraxial radius of curvature smaller than a paraxial radius of curvature of said image-side surface of said negative lens.

12. The zoom lens according to claim 1, wherein:
the front unit of said third lens group comprises a positive lens component;
a total number of lens components in the front unit of said third lens group is 1;
the rear unit of said third lens group comprises a negative lens component; and
a total number of lens components in the rear unit of said third lens group is 1.

13. The zoom lens according to claim 1, wherein the rear unit of said third lens group comprises a negative lens component in a meniscus form convex on its object side and concave on its image side, and satisfies the following condition (8A):

$$-0.6<(R_{3GNf}-R_{3GNr})/(R_{3GNf}+R_{3GNr})<0.8 \quad (8A)$$

where $R_{3GNf}$ is a paraxial radius of curvature of the object-side surface of said negative lens component in the rear unit of said third lens group, and
$R_{3GNr}$ is a paraxial radius of curvature of the image-side surface of said negative lens component in the rear unit of said third lens group.

14. The zoom lens according to claim 1, wherein said third lens group satisfies the following condition (9A):

$$15<v3n<35 \quad (9A)$$

where v3n is an Abbe constant of any negative lens in said third lens group.

15. The zoom lens according to claim 1, wherein said third lens group satisfies the following condition (10A):

$$10<v3p_{ave}-v3n_{ave}<70 \quad (10A)$$

where $v3p_{ave}$ is an average of Abbe constants of all positive lenses in said third lens group, and
$v3n_{ave}$ is an average of Abbe constants of all negative lenses in said third lens group.

16. The zoom lens according to claim 1, which satisfies the following condition (11A):

$$4<ft/fw \quad (11A)$$

where fw is a focal length of the whole zoom lens system at the wide-angle end,
ft is a focal length of the whole zoom lens system at the telephoto end.

17. An imaging apparatus, comprising:
a zoom lens, and
an imaging device having an imaging plane located on an image side thereof and adapted to convert an optical image formed through said zoom lens on said imaging plane into electrical signals, wherein:
said zoom lens is a zoom lens as recited in claim 1.

18. The imaging apparatus according to claim 17, which further comprises a signal processing circuit adapted to process image data obtained by said imaging device to produce it as image data with transformed shape, wherein upon focusing on the farthest distance at the wide-angle end, said zoom lens satisfies the following condition (13A):

$$0.7<y_{07}/(f_w \cdot \tan \omega_{o7w})<1.0 \quad (13A)$$

where $f_w$ is a focal length of the whole zoom lens system at the wide-angle end,
$y_{07}$ is defined as $y_{07}=0.7 \times y_{10}$ where $y_{10}$ is a distance from a center to the farthest point in an effective imaging area of the imaging device, and when the effective imaging area changes from the wide-angle end to the telephoto end, $y_{10}$ is the greatest possible value, and
$\omega_{o7w}$ is an angle between the optical axis and an incident light ray in an object space for a chief light ray that is incident from a center on the imaging plane at the wide-angle end onto an image position where an image height becomes $y_{07}$.

19. A zoom lens, comprising, in order from an object side toward an image side thereof,
a first lens group having positive refracting power,
a second lens group having negative refracting power,
a third lens group having positive refracting power, and
a fourth lens group having positive refracting power, wherein:
said zoom lens further comprises an aperture stop located on an image side with respect to said second lens group and on an object side with respect to a lens surface located in said third lens group and nearest to the image side;

upon zooming from a wide-angle end to a telephoto end, a space between said first lens group and said second lens group grows wide, a space between said second lens group and said third lens group becomes narrow, and a space between said third lens group and said fourth lens group changes;

said first lens group comprises a negative lens and a positive lens;

a total number of lenses in said first lens group is 2;

said second lens group has a negative meniscus lens component convex on its object side, which is located nearest to the object side;

said third lens group comprises, in order from the object side, a positive lens and a negative lens;

a total number of lens components in said third lens group is 2;

said fourth lens group comprises a positive lens component; and a total number of lens components in said fourth lens group is 1;

wherein said first lens group is positioned more on the object side at the telephoto end than at the wide-angle end.

20. The zoom lens according to claim 19, wherein said negative lens and said positive lens in said first lens group are cemented together.

21. The zoom lens according to claim 19, wherein said second lens group comprises a positive lens and a negative lens on an image side with respect to said negative meniscus lens.

22. The zoom lens according to claim 21, wherein said second lens group consists of said negative meniscus lens component, said positive lens, and said negative lens.

23. The zoom lens according to claim 21, wherein said negative lens in said second lens group is an aspheric plastic lens.

24. The zoom lens according to claim 19, wherein said second lens group comprises a negative lens that is located on an image side of said negative meniscus lens component and has an aspheric surface.

25. The zoom lens according to claim 19, wherein said aperture stop moves in unison with said third lens group.

26. The zoom lens according to claim 19, wherein said positive lens in said third lens group is in a double-convex form, and said negative lens is in a meniscus form convex on its object side.

27. The zoom lens according to claim 19, wherein said negative meniscus lens component in said second lens group satisfies the following condition (2B):

$$1<(R_{2nf}+R_{2nr})/(R_{2nf}-R_{2nr})<1.4 \quad (2B)$$

where $R_{2nf}$ is a paraxial radius of curvature of an object-side surface of said negative meniscus lens component in said second lens group, and $R_{2nr}$ is a paraxial radius of curvature of an image-side surface of said negative meniscus lens component in said second lens group.

28. The zoom lens according to claim 19, wherein said first lens group, and said negative meniscus lens component in said second lens group satisfies the following condition (3B):

$$-0.3<f_{2n}/f_1<-0.15 \quad (3B)$$

where $f_{2n}$ is a focal length of said negative meniscus lens in said second lens group, and $f_1$ is a focal length of said first lens group.

29. The zoom lens according to claim 19, wherein said negative lens in said third lens group satisfies the following condition (4B):

$$1<(R_{3nf}+R_{3nr})/(R_{3nf}-R_{3nr})<6 \quad (4B)$$

where $R_{3nf}$ is a paraxial radius of curvature of an object-side surface of said negative lens in said third lens group, and $R_{3nr}$ is a paraxial radius of curvature of an image-side surface of said negative lens in said third lens group.

30. The zoom lens according to claim 19, wherein said negative lens in said third lens group satisfies the following condition (5B):

$$15<\nu_{3n}<35 \quad (5B)$$

where $\nu_{3n}$ is an Abbe constant of said negative lens in said third lens group.

31. The zoom lens according to claim 19, wherein said positive lens and said negative lens in said third lens group satisfy the following condition (6B):

$$5<\nu_{3p}\nu_{3n}<70 \quad (6B)$$

where $\nu_{3p}$ is an Abbe constant of said positive lens in said third lens group, and $\nu_{3n}$ is an Abbe constant of said negative lens in said third lens group.

32. The zoom lens according to claim 19, which satisfies the following condition (7B):

$$4<ft/fw \quad (7B)$$

where fw is a focal length of the whole zoom lens system at the wide-angle end, ft is a focal length of the whole zoom lens system at the telephoto end.

33. An imaging apparatus, comprising:

a zoom lens, and an imaging device having an imaging plane located on an image side thereof and adapted to convert an optical image formed through said zoom lens on said imaging plane into electrical signals, wherein:

said zoom lens is a zoom lens as recited in claim 19.

34. A zoom lens, comprising, in order from an object side toward an image side thereof, a first lens group having positive refracting power, a second lens group having negative refracting power, a third lens group having positive refracting power, and a fourth lens group having positive refracting power, wherein:

said zoom lens further comprises an aperture stop located on an image side with respect to said second lens group and on an object side with respect to a lens surface located in said third lens group and nearest to the image side;

upon zooming from a wide-angle end to a telephoto end, a space between said first lens group and said second lens group grows wide, a space between said second lens group and said third lens group becomes narrow, and a space between said third lens group and said fourth lens group changes;

said first lens group comprises a negative lens and a positive lens;

a total number of lenses in said first lens group is 2;

said second lens group has a negative meniscus lens component convex on its object side, which is located nearest to the object side;
said third lens group comprises, in order from the object side, a positive lens and a negative lens;
a total number of lens components in said third lens group is 2;
said fourth lens group comprises a positive lens component; and
a total number of lens components in said fourth lens group is 1;
wherein:
said negative lens in said first lens group is positioned more on the object side than said positive lens in said first lens group;
said negative lens in said first lens group has an image-side surface having an absolute value of a paraxial radius of curvature smaller than an absolute value of a paraxial radius of curvature of an object-side surface; and
said positive lens in said first lens group has an image-side surface having an absolute value of a paraxial radius of curvature larger than an absolute value of a paraxial radius of curvature of an object-side surface.

35. A zoom lens, comprising, in order from an object side toward an image side thereof,
a first lens group having positive refracting power,
a second lens group having negative refracting power,
a third lens group having positive refracting power, and
a fourth lens group having positive refracting power, wherein:
said zoom lens further comprises an aperture stop located on an image side with respect to said second lens group and on an object side with respect to a lens surface located in said third lens group and nearest to the image side;
upon zooming from a wide-angle end to a telephoto end,
a space between said first lens group and said second lens group grows wide,
a space between said second lens group and said third lens group becomes narrow, and
a space between said third lens group and said fourth lens group changes;
said first lens group comprises a negative lens and a positive lens;
a total number of lenses in said first lens group is 2;
said second lens group has a negative meniscus lens component convex on its object side, which is located nearest to the object side;
said third lens group comprises, in order from the object side, a positive lens and a negative lens;
a total number of lens components in said third lens group is 2;
said fourth lens group comprises a positive lens component; and
a total number of lens components in said fourth lens group is 1;
wherein said negative lens and said positive lens in said first lens group are each a meniscus lens convex on its object side.

36. A zoom lens, comprising, in order from an object side toward an image side thereof,
a first lens group having positive refracting power,
a second lens group having negative refracting power,
a third lens group having positive refracting power, and
a fourth lens group having positive refracting power, wherein:
said zoom lens further comprises an aperture stop located on an image side with respect to said second lens group and on an object side with respect to a lens surface located in said third lens group and nearest to the image side;
upon zooming from a wide-angle end to a telephoto end,
a space between said first lens group and said second lens group grows wide,
a space between said second lens group and said third lens group becomes narrow, and
a space between said third lens group and said fourth lens group changes;
said first lens group comprises a negative lens and a positive lens;
a total number of lenses in said first lens group is 2;
said second lens group has a negative meniscus lens component convex on its object side, which is located nearest to the object side;
said third lens group comprises, in order from the object side, a positive lens and a negative lens;
a total number of lens components in said third lens group is 2;
said fourth lens group comprises a positive lens component; and
a total number of lens components in said fourth lens group is 1;
wherein said second lens group consists of said negative meniscus lens component and a rear lens unit located on an image side with respect to said negative meniscus lens and having positive refracting power, wherein said rear lens unit comprises a positive lens and a negative lens.

37. A zoom lens, comprising, in order from an object side toward an image side thereof,
a first lens group having positive refracting power,
a second lens group having negative refracting power,
a third lens group having positive refracting power, and
a fourth lens group having positive refracting power, wherein:
said zoom lens further comprises an aperture stop located on an image side with respect to said second lens group and on an object side with respect to a lens surface located in said third lens group and nearest to the image side;
upon zooming from a wide-angle end to a telephoto end,
a space between said first lens group and said second lens group grows wide,
a space between said second lens group and said third lens group becomes narrow, and
a space between said third lens group and said fourth lens group changes;
said first lens group comprises a negative lens and a positive lens;
a total number of lenses in said first lens group is 2;
said second lens group has a negative meniscus lens component convex on its object side, which is located nearest to the object side;
said third lens group comprises, in order from the object side, a positive lens and a negative lens;
a total number of lens components in said third lens group is 2;
said fourth lens group comprises a positive lens component; and
a total number of lens components in said fourth lens group is 1;

wherein said third lens group is positioned more on the object side at the telephoto end than at the wide-angle end.

38. A zoom lens, comprising, in order from an object side toward an image side thereof,
a first lens group having positive refracting power,
a second lens group having negative refracting power,
a third lens group having positive refracting power, and
a fourth lens group having positive refracting power, wherein:
said zoom lens further comprises an aperture stop located on an image side with respect to said second lens group and on an object side with respect to a lens surface located in said third lens group and nearest to the image side;
upon zooming from a wide-angle end to a telephoto end,
a space between said first lens group and said second lens group grows wide,
a space between said second lens group and said third lens group becomes narrow, and
a space between said third lens group and said fourth lens group changes;
said first lens group comprises a negative lens and a positive lens;
a total number of lenses in said first lens group is 2;
said second lens group has a negative meniscus lens component convex on its object side, which is located nearest to the object side;
said third lens group comprises, in order from the object side, a positive lens and a negative lens;
a total number of lens components in said third lens group is 2;
said fourth lens group comprises a positive lens component; and
a total number of lens components in said fourth lens group is 1;
wherein said first lens group satisfies the following condition (1B):

$$-3<(R_{1f}+R_{1r})/(R_{1f}-R_{1r})<-1 \quad (1B)$$

where $R_{1f}$ is a paraxial radius of curvature of a lens surface located in said first lens group and nearest to the object side, and
$R_{1r}$ is a paraxial radius of curvature of a lens surface located in said first lens group and nearest to the image side.

39. An imaging apparatus, comprising:
a zoom lens, comprising, in order from an object side toward an image side thereof,
a first lens group having positive refracting power,
a second lens group having negative refracting power,
a third lens group having positive refracting power, and
a fourth lens group having positive refracting power, wherein:
said zoom lens further comprises an aperture stop located on an image side with respect to said second lens group and on an object side with respect to a lens surface located in said third lens group and nearest to the image side;
upon zooming from a wide-angle end to a telephoto end,
a space between said first lens group and said second lens group grows wide,
a space between said second lens group and said third lens group becomes narrow, and
a space between said third lens group and said fourth lens group changes;
said first lens group comprises a negative lens and a positive lens;
a total number of lenses in said first lens group is 2;
said second lens group has a negative meniscus lens component convex on its object side, which is located nearest to the object side;
said third lens group comprises, in order from the object side, a positive lens and a negative lens;
a total number of lens components in said third lens group is 2;
said fourth lens group comprises a positive lens component; and
a total number of lens components in said fourth lens group is 1;
an imaging device having an imaging plane located on an image side thereof and adapted to convert an optical image formed through said zoom lens on said imaging plane into electrical signals; and
a signal processing circuit adapted to process image data obtained by said imaging device to produce it as image data with transformed shape, wherein upon focusing on the farthest distance at the wide-angle end, said zoom lens satisfies the following condition (8B):

$$0.65<y_{07}/(f_w \cdot \tan \omega_{o7w})<0.99 \quad (8B)$$

where $f_w$ is a focal length of the whole zoom lens system at the wide-angle end,
$y_{07}$ is defined as $y_{07}=0.7 \times y_{10}$ where $y_{10}$ is a distance from a center to the farthest point in an effective imaging area of the imaging device, and when the effective imaging area changes from the wide-angle end to the telephoto end, $y_{10}$ is the greatest possible value, and
$\omega_{o7w}$ is an angle between the optical axis and an incident light ray in an object space for a chief light ray that is incident from a center on the imaging plane at the wide-angle end onto an image position where an image height becomes $y_{07}$.

* * * * *